US012651177B2

(12) United States Patent
Dembo et al.

(10) Patent No.: US 12,651,177 B2
(45) Date of Patent: Jun. 9, 2026

(54) SYSTEMS AND METHODS WITH CLASSIFICATION STANDARD FOR COMPUTER MODELS TO MEASURE AND MANAGE RADICAL RISK USING MACHINE LEARNING AND SCENARIO GENERATION

(71) Applicant: RISKTHINKING.AI INC., Toronto (CA)

(72) Inventors: Ron Samuel Dembo, Toronto (CA); John Howard Andrew Wiebe, Toronto (CA)

(73) Assignee: RISKTHINKING.AI INC., Toronto (CA)

( * ) Notice: Subject to any disclaimer, the term of this patent is extended or adjusted under 35 U.S.C. 154(b) by 558 days.

(21) Appl. No.: 18/265,069

(22) PCT Filed: Jun. 1, 2021

(86) PCT No.: PCT/CA2021/050743
§ 371 (c)(1),
(2) Date: Jun. 2, 2023

(87) PCT Pub. No.: WO2022/115938
PCT Pub. Date: Jun. 9, 2022

(65) Prior Publication Data
US 2024/0104401 A1 Mar. 28, 2024

Related U.S. Application Data

(60) Provisional application No. 63/147,016, filed on Feb. 8, 2021, provisional application No. 63/121,187, filed on Dec. 3, 2020.

(51) Int. Cl.
*G06N 5/022* (2023.01)
*G06Q 10/0635* (2023.01)
*G06Q 40/06* (2012.01)

(52) U.S. Cl.
CPC ......... *G06N 5/022* (2013.01); *G06Q 10/0635* (2013.01); *G06Q 40/06* (2013.01)

(58) Field of Classification Search
CPC .... G06N 5/022; G06N 20/00; G06Q 10/0635; G06Q 40/06; G06F 40/20
See application file for complete search history.

(56) References Cited

U.S. PATENT DOCUMENTS

| | | | |
|---|---|---|---|
| 2017/0286622 A1 | 10/2017 | Cox et al. | |
| 2018/0218299 A1* | 8/2018 | Chang | .................... G06N 5/022 |

(Continued)

FOREIGN PATENT DOCUMENTS

| | | |
|---|---|---|
| WO | 2020061562 A1 | 3/2020 |

OTHER PUBLICATIONS

PCT—WIPO; Written Opinion and International Search Report of International Application No. PCT/CA2021/050743 dated Sep. 7, 2021.

*Primary Examiner* — Pei Yong Weng
(74) *Attorney, Agent, or Firm* — Norton Rose Fulbright Canada LLP

(57) ABSTRACT

Embodiments relate to computer systems and methods for computer models and scenario generation. The system involves generating integrated climate risk data using a Climate Risk Classification Standard hierarchy that maps climate data and multiple risk factors to geographic space and time. A computer model involves risk factors modeled as graphs of nodes, each node corresponding to a risk factor and connected by edges or links. The nodes of the graph create scenario paths for the model. A hardware processor populates the graphs of nodes using a machine learning, natural language processing and expert judgement systems. The system automatically generates multifactor scenario sets using the scenario paths for the climate model to (Continued)

compute the likelihood of different scenario paths for the computer model.

20 Claims, 50 Drawing Sheets

(56)     References Cited

U.S. PATENT DOCUMENTS

| | | |
|---|---|---|
| 2019/0066217 A1 | 2/2019 | Stoner, Jr. et al. |
| 2019/0096212 A1 | 3/2019 | Pourmohammad et al. |
| 2019/0197442 A1 | 6/2019 | Lu |
| 2019/0340548 A1 | 11/2019 | Bhattacharjya et al. |

* cited by examiner

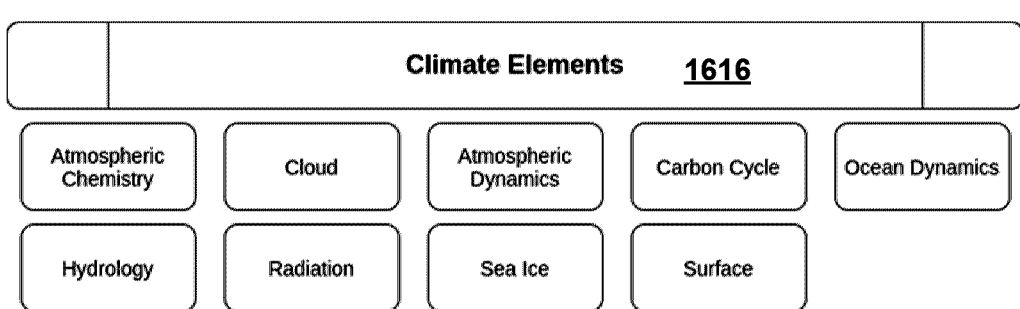
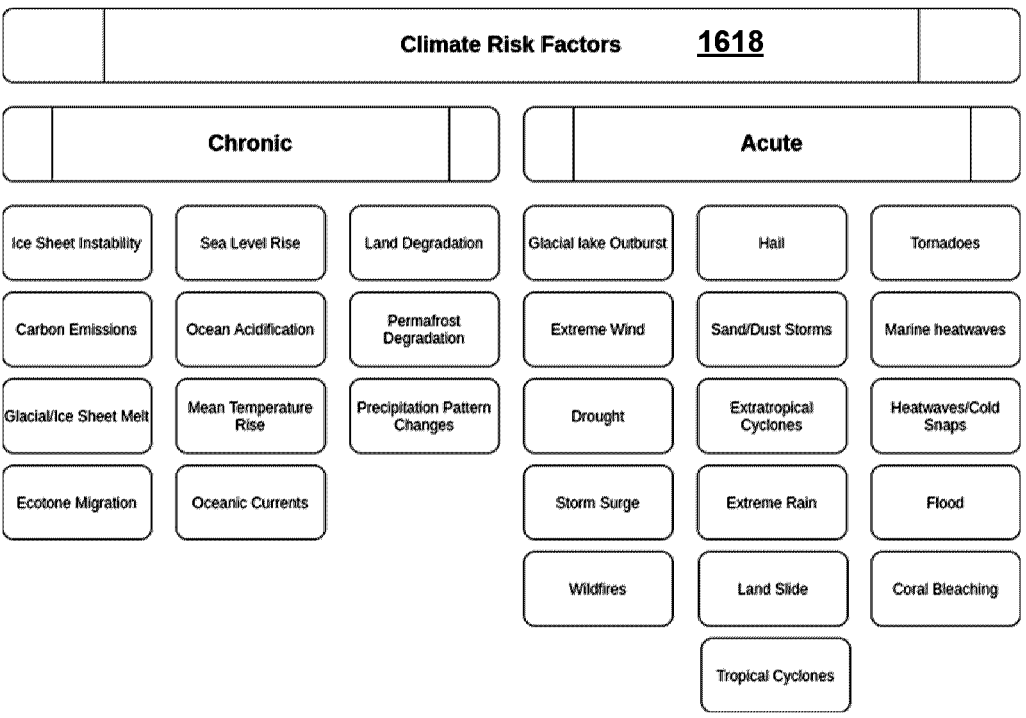
FIG. 1C

| Xxxxxxx | | | | | | | | |
|---|---|---|---|---|---|---|---|---|
| Xxxxxxxx | Xxxx | Xxxxxxxx | Xxxxxxxx | Xxxxxxxx | Xxxxxxxx | Xxxx | Xxxxxxxxxx | Xxxxxxx |
| Xxxxxxxxx | XX | XX | XXXXX | XXX | XXX | XXX | XXXXX | XXXXX |
| Xxxxxxxxx | XX | XX | XXXXX | XXX | XXX | XXX | XXXXX | XXXXX |
| Xxxxxxxxx | XX | XX | XXXXX | XXX | XXX | XXX | XXXXX | XXXXX |
| Xxxxxxxxx | XX | XX | XXXXX | XXX | XXX | XXX | XXXXX | XXXXX |
| Xxxxxxxxx | XX | XX | XXXXX | XXX | XXX | XXX | XXXXX | XXXXX |
| Xxxxxxxxx | XX | XX | XXXXX | XXX | XXX | XXX | XXXXX | XXXXX |
| Xxxxxxxxx | XX | XX | XXXXX | XXX | XXX | XXX | XXXXX | XXXXX |
| Xxxxxxxxx | XX | XX | XXXXX | XXX | XXX | XXX | XXXXX | XXXXX |
| Xxxxxxxxx | XX | XX | XXXXX | XXX | XXX | XXX | XXXXX | XXXXX |
| Xxxxxxxxx | XX | XX | XXXXX | XXX | XXX | XXX | XXXXX | XXXXX |
| Xxxxxxxxx | XX | XX | XXXXX | XXX | XXX | XXX | XXXXX | XXXXX |
| Xxxxxxxxx | XX | XX | XXXXX | XXX | XXX | XXX | XXXXX | XXXXX |
| Xxxxxxxxx | XX | XX | XXXXX | XXX | XXX | XXX | XXXXX | XXXXX |
| Xxxxxxxxx | XX | XX | XXXXX | XXX | XXX | XXX | XXXXX | XXXXX |
| Xxxxxxxxx | XX | XX | XXXXX | XXX | XXX | XXX | XXXXX | XXXXX |
| Xxxxxxxxx | XX | XX | XXXXX | XXX | XXX | XXX | XXXXX | XXXXX |
| Xxxxxxxxx | XX | XX | XXXXX | XXX | XXX | XXX | XXXXX | XXXXX |
| Xxxxxxxxx | XX | XX | XXXXX | XXX | XXX | XXX | XXXXX | XXXXX |
| Xxxxxxxxx | XX | XX | XXXXX | XXX | XXX | XXX | XXXXX | XXXXX |
| Xxxxxxxxx | XX | XX | XXXXX | XXX | XXX | XXX | XXXXX | XXXXX |
| Xxxxxxxxx | XX | XX | XXXXX | XXX | XXX | XXX | XXXXX | XXXXX |

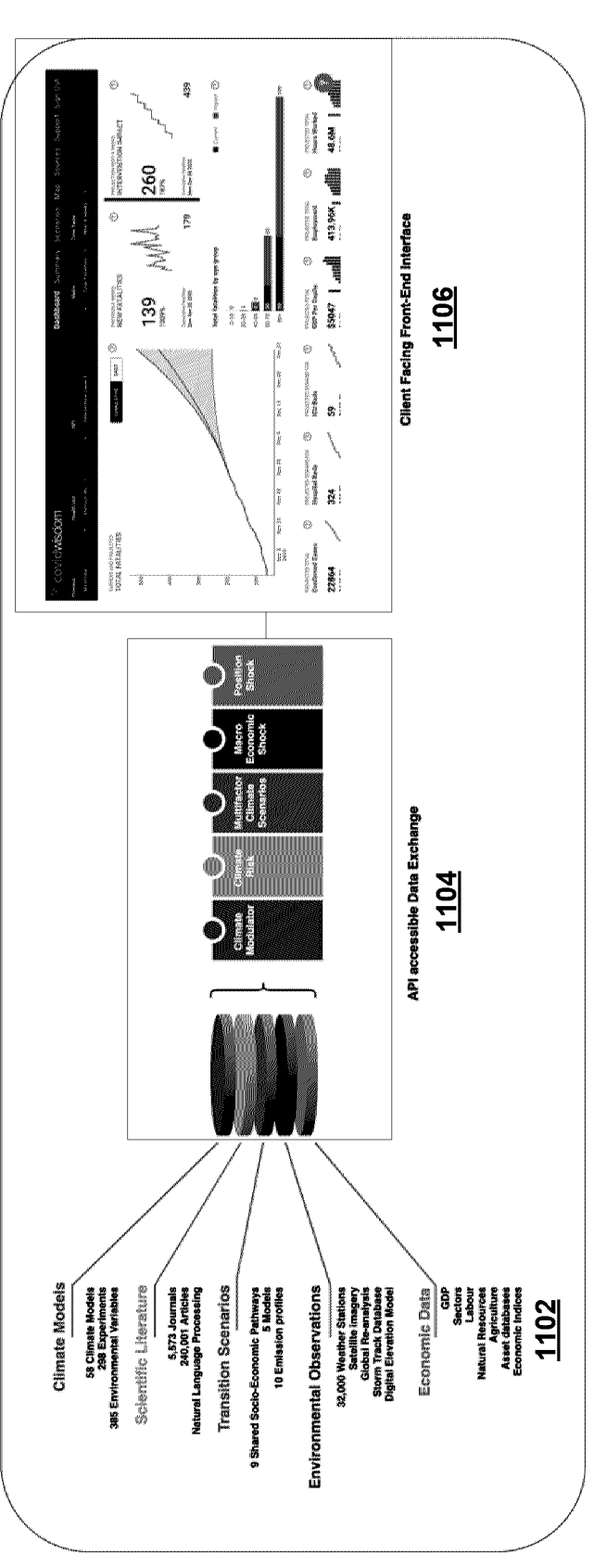

Client Facing Front-End Interface 1106

API accessible Data Exchange 1104

Climate Models
58 Climate Models
258 Experiments
385 Environmental Variables

Scientific Literature
5,673 Journals
240,001 Articles
Natural Language Processing Transition Scenarios
9 Shared Socio-Economic Pathways
5 Models
10 Emission profiles Environmental Observations
32,000 Weather Stations
Satellite Imagery
Global Re-analysis
Storm Track Database
Digital Elevation Model Economic Data
GDP
Sectors
Labour
Natural Resources
Agriculture
Asset databases
Economic Indices

Table 1400

| Scenario | Time to Vaccine | EUR_USD | CDX_IG | SP500 | UST10yr | US_GDP | Likelihood |
|---|---|---|---|---|---|---|---|
| Scenario 17 | 1 | 33 | 50 | -34 | -0.5 | -30.5 | 5.83% |
| Scenario 13 | 1 | 41 | 30 | -30 | -2.6 | 0.0 | 5.76% |
| Scenario 12 | 1 | -29 | 50 | -45 | -1.7 | -28.0 | 5.39% |
| Scenario 2 | 2 | -25 | 30 | -35 | -0.2 | 0.0 | 5.33% |
| Scenario 18 | 1 | 20 | -33 | -31 | -1.2 | 25.0 | 4.60% |
| Scenario 25 | 1 | 28 | -45 | -36 | -0.5 | 2.0 | 4.55% |
| Scenario 6 | 1 | -75 | -61 | -68 | -2.4 | -33.5 | 4.26% |
| Scenario 8 | 1 | -58 | -49 | -64 | -0.5 | 0.0 | 4.21% |
| Scenario 9 | 4 | 27 | 40 | -45 | -1.0 | -25.0 | 2.94% |
| Scenario 15 | 5 | 43 | 100 | -49 | 0.5 | 0.0 | 2.90% |
| Scenario 3 | 2 | 17 | 20 | 15 | -0.3 | -15.0 | 2.79% |
| Scenario 21 | 1 | 17 | 59 | 41 | -0.9 | 2.5 | 2.76% |
| Scenario 24 | 5 | -21 | 43 | -36 | -1.2 | -23.5 | 2.72% |
| Scenario 37 | 5 | -41 | 20 | -25 | 0.5 | -5.0 | 2.69% |
| Scenario 26 | 2 | -40 | 30 | 20 | -2.0 | -20.0 | 2.58% |
| Scenario 19 | 1 | -15 | 79 | 15 | -1.3 | 2.0 | 2.55% |
| Scenario 16 | 5 | 15 | -20 | -20 | 0.0 | -35.0 | 2.32% |
| Scenario 5 | 5 | 14 | -9 | -14 | -0.2 | 0.0 | 2.29% |
| Scenario 10 | 1 | 75 | -20 | 20 | -0.4 | -30.0 | 2.21% |
| Scenario 30 | 1 | 33 | -37 | 50 | -1.0 | 2.0 | 2.18% |
| Scenario 28 | 5 | -40 | -45 | -38 | -0.7 | -23.0 | 2.15% |

Xxxxxxx

| Xxxxxxxx | Xxxx | Xxxxxxxx | Xxxxxxxx | Xxxxxxxx | Xxxx | Xxxxxxxxx | Xxxxxxx |
|---|---|---|---|---|---|---|---|
| Xxxxxxxxxx | xx | xx | XXXX | XXX | XXX | XXXXXXXX | XXXXX |
| Xxxxxxxxxx | xx | xx | XXXX | XXX | XXX | XXXX | XXXXX |
| Xxxxxxxxxx | xx | xx | XXXX | XXX | XXX | XXXX | XXXXX |
| Xxxxxxxxxx | xx | xx | XXXX | XXX | XXX | XXXX | XXXXX |
| Xxxxxxxxxx | xx | xx | XXXX | XXX | XXX | XXXX | XXXXX |
| Xxxxxxxxxx | xx | xx | XXXX | XXX | XXX | XXXX | XXXXX |
| Xxxxxxxxxx | xx | xx | XXXX | XXX | XXX | XXXX | XXXXX |
| Xxxxxxxxxx | xx | xx | XXXX | XXX | XXX | XXXX | XXXXX |
| Xxxxxxxxxx | xx | xx | XXXX | XXX | XXX | XXXX | XXXXX |
| Xxxxxxxxxx | xx | xx | XXXX | XXX | XXX | XXXX | XXXXX |
| Xxxxxxxxxx | xx | xx | XXXX | XXX | XXX | XXXX | XXXXX |
| Xxxxxxxxxx | xx | xx | XXXX | XXX | XXX | XXXX | XXXXX |
| Xxxxxxxxxx | xx | xx | XXXX | XXX | XXX | XXXX | XXXXX |
| Xxxxxxxxxx | xx | xx | XXXX | XXX | XXX | XXXX | XXXXX |
| Xxxxxxxxxx | xx | xx | XXXX | XXX | XXX | XXXX | XXXXX |
| Xxxxxxxxxx | xx | xx | XXXX | XXX | XXX | XXXX | XXXXX |
| Xxxxxxxxxx | xx | xx | XXXX | XXX | XXX | XXXX | XXXX |
| Xxxxxxxxxx | xx | xx | XXXX | XXX | XXX | XXXX | XXXXX |

C $$CaR = \frac{UPSIDE}{DOWNSIDE}$$

CaR < 1:    UPSIDE < DOWNSIDE

CaR > 1:    UPSIDE > DOWNSIDE

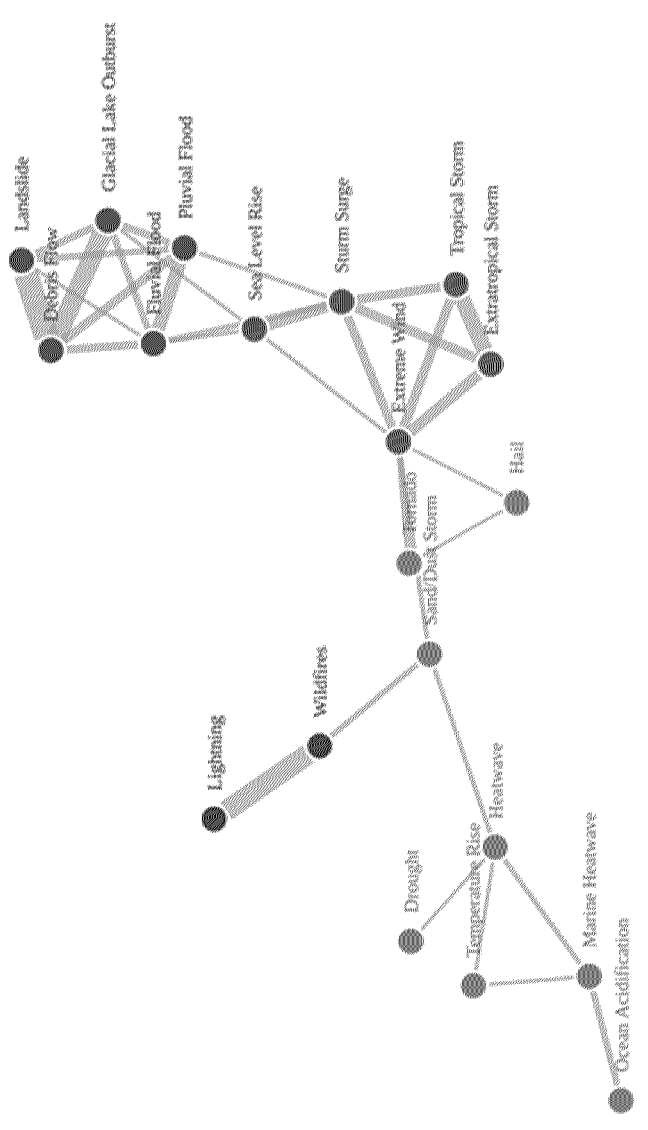
FIG. 20

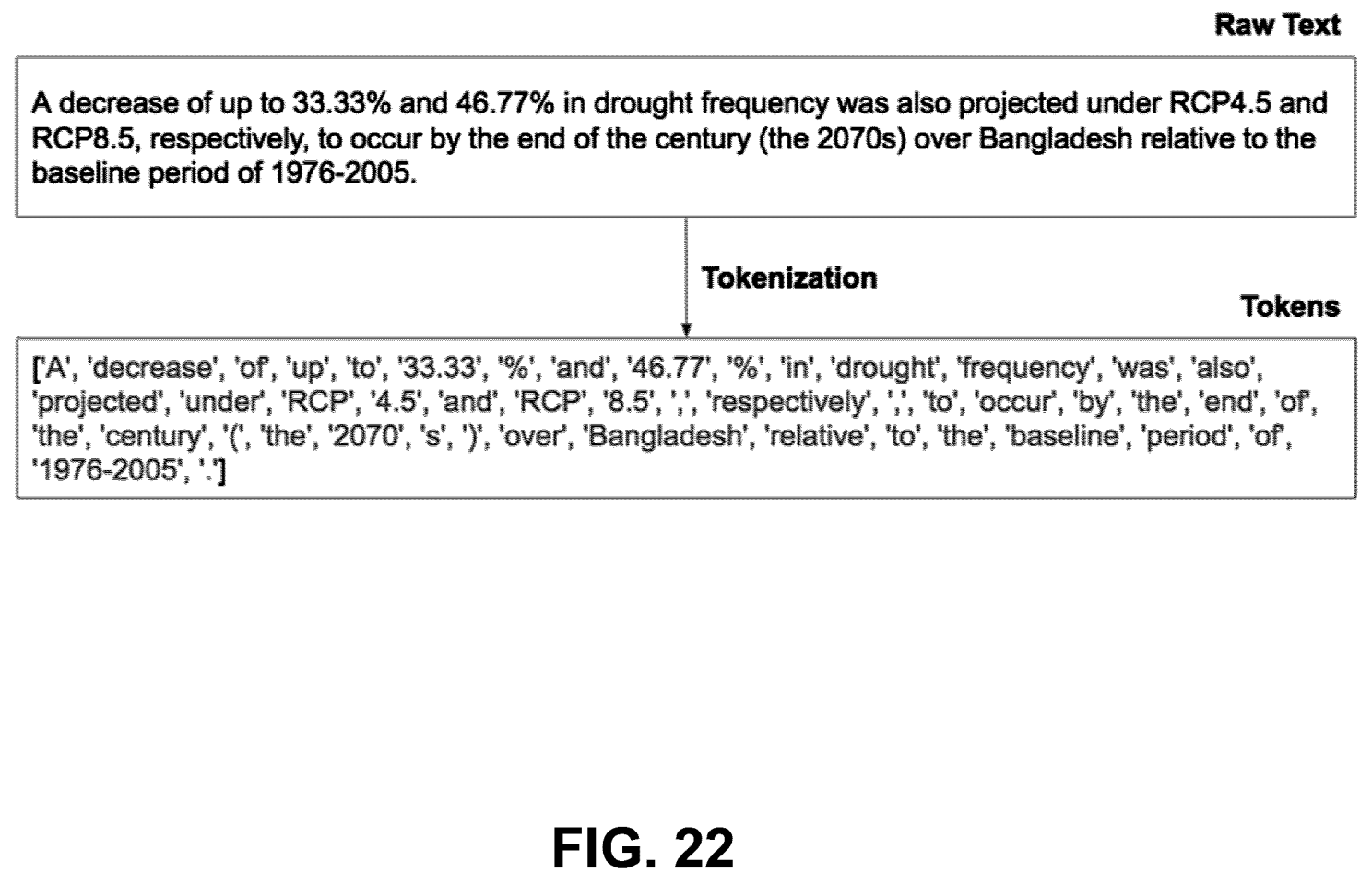

Raw Text

A decrease of up to 33.33% and 46.77% in drought frequency was also projected under RCP4.5 and RCP8.5, respectively, to occur by the end of the century (the 2070s) over Bangladesh relative to the baseline period of 1976-2005.

Tokenization →

Tokens

['A', 'decrease', 'of', 'up', 'to', '33.33', '%', 'and', '46.77', '%', 'in', 'drought', 'frequency', 'was', 'also', 'projected', 'under', 'RCP', '4.5', 'and', 'RCP', '8.5', ',', 'respectively', ',', 'to', 'occur', 'by', 'the', 'end', 'of', 'the', 'century', '(', 'the', '2070', 's', ')', 'over', 'Bangladesh', 'relative', 'to', 'the', 'baseline', 'period', 'of', '1976-2005', '.']

FIG. 22

A decrease of 33.33% PERCENT in drought frequency was projected under RCP4.5 RCP.

FIG. 24

SYSTEMS AND METHODS WITH CLASSIFICATION STANDARD FOR COMPUTER MODELS TO MEASURE AND MANAGE RADICAL RISK USING MACHINE LEARNING AND SCENARIO GENERATION

CROSS REFERENCE TO RELATED APPLICATIONS

The present application claims priority to and the benefit of U.S. provisional patent application 63/121,187 filed Dec. 3, 2020 and U.S. provisional patent application 63/147,016 filed Feb. 8, 2021, the entire contents of which are hereby incorporated by reference.

FIELD

The improvements generally relate to the field of computer modelling, classification standards, simulations, scenario generation, risk management, taxonomies, and machine learning. The improvements relate to computer systems that automatically generate scenarios for risk data. The computer systems implement automated testing of estimated impacts of scenarios in a scalable, consistent, auditable and reproducible manner.

INTRODUCTION

Embodiments described herein relate to computer systems that generate scenarios and computer models for risk factors consistently and at scale using machine learning, natural language processing, and expert systems. The computer system derives data representing the uncertainty of risk factors in the future; and uses this information as input for scenario generation, testing and computing metrics, and generating interfaces with visual elements for the results.

Embodiments described herein apply to different types of risk factors. Embodiments described herein relate to computer systems with a consistent framework for generating and using scenarios, to stress test and calculate risk of an organization under radical uncertainty.

Climate change is an example risk under radical uncertainty. Classification standards can classify data for transition and physical risk related to climate change. For example, there is a lack of consistent climate data and analytics, making it difficult to manage and plan for extreme uncertainty of our future under climate change. This problem has been recognized by TCFD1 and NGFS2. Regulators are attempting to build on TCFD and NGFS initiatives as a broad-based requirement for asset managers, financial institutions and large companies. Mitigating climate risk may occur when markets can price climate risk properly and ubiquitously.

A Climate Risk Classification Standard (CRCS™) hierarchy can be used by embodiments described herein to consistently classify transition and physical risk related to climate change. The CRCS provides a robust, consistent and scalable computing hierarchy for understanding and comparing exposure to climate-related risk. The CRCS can be used by embodiments described herein to respond to the global financial community's need for a globally comprehensive, accurate, and auditable approach to defining and classifying climate risk factors and determining their economic impact. The CRCS can be used by embodiments described herein to quantify both risks and opportunities presented by climate change, climate-related policy, and emerging technologies in an uncertain world.

Other example risks are pandemics, cyber risk, and stress testing of financial portfolios.

Embodiments described herein relate to computer systems that generate data structures using classification standards and scenarios for climate and financial risk consistently and at scale, based on the latest climate science, epidemiological science, finance and extracted data elements from expert opinion. The computer system derives data representing the uncertainty of these factors in the future; and uses this information as input for scenario generation.

Embodiments described herein relate to computer systems and methods for generating ontologies of climate related risk (e.g. as knowledge graphs or data structures) from unstructured text using a natural language processing pipeline to extract information from unstructured text, classify the risk, the multitude of dimensions that define a risk, quantify the interconnectedness of risk factors, and return a structured, codified and accessible data structure that can be queried by a client application.

SUMMARY

In accordance with an aspect, there is provided a computer system for computer models for risk factors and scenario generation to query and aggregate impact, cost, magnitude and frequency of risk for different geographic locations. The system has a n-transitory memory storing a risk model comprising a causal graph of nodes for risk factors and a knowledge graph defining an extracted relationship of the nodes, each node corresponding to a risk factor and storing a quantitative uncertainty value derived for the risk factor for a time horizon, the causal graph having edges connecting the nodes to create scenario paths for the risk model, the knowledge graph of the nodes defining a network structure of the risk factors and n-grams with links between nodes having weight values based on shared use of n-grams by risk factors corresponding to the nodes, the n-grams being domain specific keywords.

The system has a hardware processor with a communication path to the non-transitory memory to: generate integrated risk data structures using a natural language processing pipeline to extract information from unstructured text, classify risk and a plurality of risk dimensions to define the risk, quantify interconnectedness of risk factors for the associated link values, and return structured, codified and accessible data structures, wherein the integrated risk data structures map multiple risk factors to geographic space and time; populate the knowledge graph and the causal graph of nodes in the memory by computing values for the risk factor for the time horizon using the integrated climate risk data structures; generate multifactor scenario sets using the scenario paths for the climate model to compute the likelihood of different scenario paths for the climate model; generate risk metrics for stress tests using the multifactor scenario sets and the knowledge graph; transmit at least a portion of the risk metrics and the multifactor scenario sets in response to queries by a client application; and store the integrated risk data structures and the multifactor scenario sets in the non-transitory memory.

The system has a computer device with a hardware processor having the client application to transmit queries to the hardware processor and an interface to generate visual elements at least in part corresponding to the multifactor scenario sets and the risk metrics received in response to the queries.

In some embodiments, the hardware processor, for each risk factor, merges relevant text data into a risk-specific corpus for the risk factor to populate the knowledge graph in memory.

In some embodiments, the hardware processor, for each risk factor, creates a link between a node for the risk factor and a respective n-gram extracted from the risk-specific corpus for the risk factor based on a frequency rate for the n-gram and a relevance rate to the respective risk factor determined by keyword extraction.

In some embodiments, the hardware processor generates the knowledge graph by computing a bipartite network of risk factors and n-grams, and projecting the bipartite network into a single mode network of risk factors connected by edges corresponding to shared n-grams.

In some embodiments, the hardware processor computes edge weights between risk factors based on the term frequency—inverse document frequency for overlapping keywords In some embodiments, the knowledge graph of the nodes defining the network structure of the risk factors and the n-grams having a set of links between nodes to indicate that a respective n-gram is relevant to a plurality of risk factors to form a connection and dependency between the plurality of risk factors.

In some embodiments, the hardware processor extracts the n-grams using a highest pooled score to generate a set of n-grams for each risk factor to populate the knowledge graph in memory.

In some embodiments, an expert pipeline refines candidate keywords to generate the n-grams as the domain-specific keywords.

In some embodiments, the hardware processor processes the unstructured text to replace each word with a syntactic form lemma to populate the knowledge graph in memory.

In some embodiments, the hardware processor computes the associated values of the links in the knowledge graph using tf-idf score to link the risk factors based on shard use of n-grams.

In some embodiments, the hardware processor preprocesses the unstructured text to remove removing punctuation, special characters, and some common stopwords.

In some embodiments, the hardware processor continuously populates the knowledge graph of nodes by re-computing the nodes, the links, and the weight values by processing additional text data using the natural language processing pipeline.

In some embodiments, the hardware processor defines risk-specific queries to extract raw text data from relevant articles, processes the raw text data to generate a list of tokens and predict a named entity for each token, detect and classify relationships between different entities, and defines a query to traverse the knowledge graph in an order based on a set of rules, so that only entities associated with a value of interest will be returned, wherein the hardware processor assigns a unique identifier for each entity.

In accordance with an aspect, there is provided a computer system for computer models and scenario generation. The system has non-transitory memory storing a risk model as a causal graph of nodes for risk factors, each node corresponding to a risk factor and storing a quantitative value (uncertainty) for a forward-frequency distribution of possible values for the risk factor at the time horizon, the causal graph having edges connecting the nodes to create scenario paths for the risk model. The system has a hardware processor with a communication path to the non-transitory memory to: generate integrated climate risk data using a Climate Risk Classification Standard hierarchy that maps climate data and multiple risk factors to geographic space and time, the Climate Risk Classification Standard hierarchy defining climate transition scenarios, climate regions, climate modulators, climate elements and climate risks; populate the causal graph of nodes by computing the forward-frequency distribution of possible values for the risk factor at different points in time using machine learning and structured expert judgement data to link the model to macro financial variables to encode a relationship between shocks and financial impact; generate multifactor scenario sets using the scenario paths for the risk model to compute the likelihood of different scenario paths for the risk model; transmit the multifactor scenario sets to a valuation engine to provide a causal map of risk factors to micro shocks for the valuation engine to translate the macro financial variables to micro shocks and output portfolio reports; and store the multifactor scenario sets in the non-transitory memory. The system has a computer device with a hardware processor having an interface to provide visual elements by accessing the multifactor scenario sets in the non-transitory memory.

The system can generate risk factors based on a risk hierarchy. The risk hierarchy can map risk conditions, risk modulators, risk elements, risk factors, and scenario sets.

In some embodiments, the hardware processor populates the causal graph of nodes using extremes of the distributions and a weight of the distributions above and below accepted values.

In some embodiments, the hardware processor generates the causal graph having forward edges connecting the nodes to create the scenario paths for the risk model.

In some embodiments, the hardware processor identifies macro risk factors in response to a request and generates the causal graph of nodes for the risk factors using the identified macro risk factors and dependencies between the risk factors.

In some embodiments, the hardware processor continuously populates the causal graph of nodes by re-computing the frequency distribution of possible values for the risk factor at different points in time by continuously collecting data using the machine learning system and the expert judgement system.

In some embodiments, the hardware processor computes the forward-frequency distribution of possible values for the risk factor for the time horizon to extract upward and downward extreme values, and likelihoods of upward and downward movement from the forward-frequency distribution.

In some embodiments, the hardware processor filters outlier data using the structured expert judgement system before computing the forward-frequency distribution.

In some embodiments, the hardware processor populates the causal graph of nodes by computing the frequency distribution of possible values for the risk factor at different points in time using machine learning and structured expert judgement data to collect the possible values representing estimates of future uncertain values.

In some embodiments, the hardware processor generates the multifactor scenario sets using the scenario paths for the computer model and generates scenario values using the frequency distribution of possible values for the risk factors.

Example risk factors include climate risk factors. Other example risk factors include pandemic risk factors.

Embodiments described herein relate to computer systems and methods for machine generating scenarios automatically, without bias.

Many further features and combinations thereof concerning embodiments described herein will appear to those skilled in the art following a reading of the instant disclosure.

DESCRIPTION OF THE FIGURES

In the figures,

FIG. 8 shows an example API connecting to a front-end interface.

FIG. 10 are graphs of distributions for pandemic data collected by the structured expert judgement system.

FIG. 11 shows an example table of scenario data.

FIG. 20 is a view of an example interface with visual elements representing a network of risk factors and keywords.

FIG. 22 is a view of an example of tokenization.

FIG. 24 is a view of an example of named entities within a sentence.

DETAILED DESCRIPTION

Figure 1:
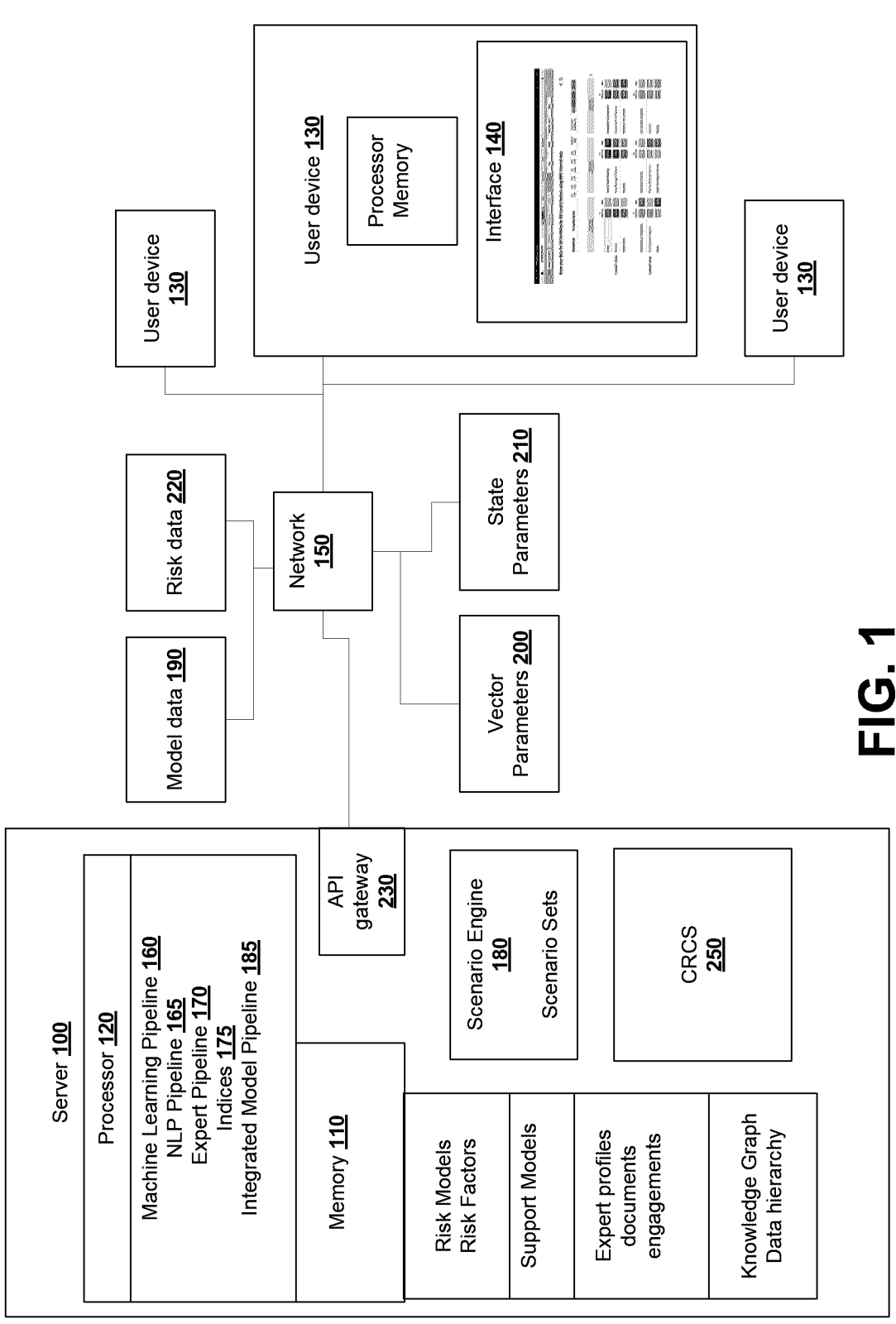
FIG. 1 is a view of an example of the system with servers and hardware components.

Embodiments described herein provide a computer system for a classification standard to generate integrated climate risk data for computer models and scenario generation.

Embodiments described herein provide computer hardware executing instructions to generate scenarios on mixed risk factors. For example, risk factors can relate to climate risk factors. Embodiments described herein provide a computer system with a classification standard that defines a taxonomy or ontology for mapping climate data received from different data sources. Embodiments described herein provide a computer process for generating integrated climate risk data by processing climate data using the taxonomy to map climate data received from different data sources to different climate regions.

The computer system selects a group of portfolios and identifies the key material macro economic factors affecting these portfolios.

Embodiments described herein relate to computer systems and methods for generating an ontology of climate related risk as knowledge graphs or data structures. The systems and methods process unstructured text using a natural language processing pipeline to extract information from unstructured text, classify the risk, the multitude of dimensions that define a risk, quantify the interconnectedness of risk factors, and return a structured, codified and accessible data structure that can be queried by a client application.

Embodiments described herein provide a Climate Risk Classification Standard (CRCS™) system to map input data for computer models and scenario generation. Embodiments described herein use the CRCS system to generate integrated climate risk data using an electronic taxonomy or ontology to automatically map climate data received from different data sources to different climate regions. The CRCS hierarchy maps climate data and multiple risk factors to geographic space and time. The CRCS hierarchy defines climate transition scenarios, climate regions, climate modulators, climate elements and climate risks. Embodiments described herein provide a computer process for generating integrated climate risk data by processing climate data using the taxonomy to map climate data to climate transition scenarios, climate regions, climate modulators, climate elements and climate risks. Embodiments described herein provide an automated rating mechanism for processing data from a variety of different sources using a consistent taxonomy. The integrated climate data can be used for scenario generation to measure the financial impact of climate change, uniformly, at some horizon, on different business units across geographies or climate regions. A business unit can operate in multiple regions and the data can be mapped to those regions.

The CRCS system can enable the proper pricing of climate financial risks; this will inform different financial strategies and help measure transition risks.

Transition scenarios are encoded files defining estimates of future evolution of the world economies and their impact on greenhouse gas emissions. For example, Transition Regimes are standards used for analyzing future impacts due to climate change. CRCS creates the causal links from Transitions to risk in a particular geography. The standards can divide the world into homogeneous climate regions and these have been integrated into CRCS. The CRCS system can encode causality to enable the computing components to understand the radical risks associated with climate change. The CRCS system can start by selecting a transition scenario (carbon pathway). The transition scenario impacts climate modulators, which affects all regions in the world. The transition scenario impacts the climate modulators and these affect all regions in the world, but only certain geographic regions or locations are of interest to business units, for example. These points of interest intersect with a subset of climate regions. The points of interest impact climate risk, chronic and acute risks in the regions of interest. This in turn leads to the climate risk factors in the regions of interest. This process can be repeated for every transition scenario.

Embodiments described herein provide a computer process for generating integrated climate risk data to generate a set of climate stress scenarios to measure or estimate impact on a business unit. The output data can be used to generate visualizations that aggregate gains and losses and forms a distribution of the gains (Upside) and losses (Downside).

Embodiments described herein provide a computer process for generating integrated climate risk data rating metrics. An example metric can be referred to as CaR, the Climate-risk adjusted Return. CaR is computed by dividing the Upside by the Downside as a measure of the risk-adjusted upside. Embodiments described herein can be used to generate visualizations of bar graphs for the distribution of the gains (Upside) and losses (Downside). The Upside can be given by an area covered by a first section of bars and the Downside can be given by an area covered by another section of bars.

A CaR of less that one implies a likely financial impact on profitability under these stresses.

The CRCS system identifies integrated climate risk factors by selecting a climate region. The CRCS system selects the transition scenario, climate modulators, climate elements and climate risks to compute integrated climate risk factors.

The CRCS system is a codified standard to map data for computing integrated climate risk factors. For example, the CRCS system can codify climate regions to cover the world. The CRCS system can codify Climate Modulators that impact different climate regions. The CRCS system can codify links between the Climate Modulators to both chronic and acute risks in the climate regions. The CRCS system can codify climate indices such as the freeze/thaw cycles, number of heat wave events, etc. To measure the financial risk of a portfolio, a physical asset or a business line in a radically uncertain future (such as climate change), embodiments described herein can determine how the portfolio performs under various scenarios that describe the uncertainty in the future. An example way of summarizing this is the future profit and loss frequency distribution under these scenarios.

The CRCS system is designed to consistently classify transition and physical risk related to climate change to generate input data for computer models. The CRCS provides a robust, consistent and scalable hierarchy for understanding and comparing exposure to climate-related risk. The CRCS is designed to respond to the need for a globally comprehensive, accurate, and auditable approach to defining and classifying climate risk factors and determining their economic impact. The CRCS universal approach sheds light on both risks and opportunities presented by climate change, climate-related policy, and emerging technologies in an uncertain world.

Embodiments described herein provide a computer system to automatically test the impact of radical uncertainty on financial portfolios. Radical uncertainty can be represented by events or combinations of events that are unprecedented in historical data or are historically unlikely. Financial stress tests have relied on historical correlations and regression analysis of past events to foretell future impacts. However, underlying macro factors of the risk potential, defined by their frequency distribution, are changing beyond their historical bounds. The impact of changes is unaccounted for as methods traditionally have no recourse to deal with radical uncertainty.

Embodiments described herein provide a computer system that addresses the radical uncertainty inherent in the world by automatically generating a set of scenarios that account for a wide range of risk potentials, including extreme events. The computer system accounts for the tail end of the uncertainty distribution explicitly and provides a measure of the likelihood that a particular path within the set is realised in the real world. The ultimate goal is stress testing to understand the risk reward trade-offs and the stability of institutions and markets.

As an illustrative example, the impacts associated with risks are geospatial by nature, floods occur within a catchment, pandemics begin as regional epidemics, and so on. To address this, embodiments described herein provide a computer system with a geospatial partitioning engine that segments world data into climate regions following the IPCC CLIMATE CHANGE ATLAS definition of climate regions. These are large areas of land and sea that experience similar climatic conditions. These regions are further divided into climate geo-zones characterized by sub-tiles at a higher spatial resolution.

FIG. 1 shows an example computer system with a hardware server 100 for computer models and scenario generation that includes CRCS 250. The CRCS 250 involves a computer hardware processor configured to consistently classify transition and physical risk related to climate change to generate input data for computer models. The CRCS 250 integrates with a machine learning pipeline 160 (with a natural language processing pipeline 165) to extract information from unstructured text, classify the risk, the multitude of dimensions that define a risk, quantify the interconnectedness of risk factors, and return a structured, codified and accessible data structure that can be queried.

In accordance with an aspect, the server 100 generates computer models for risk factors and scenario generation to query and aggregate impact, cost, magnitude and frequency of risk for different geographic locations.

Figure 21:
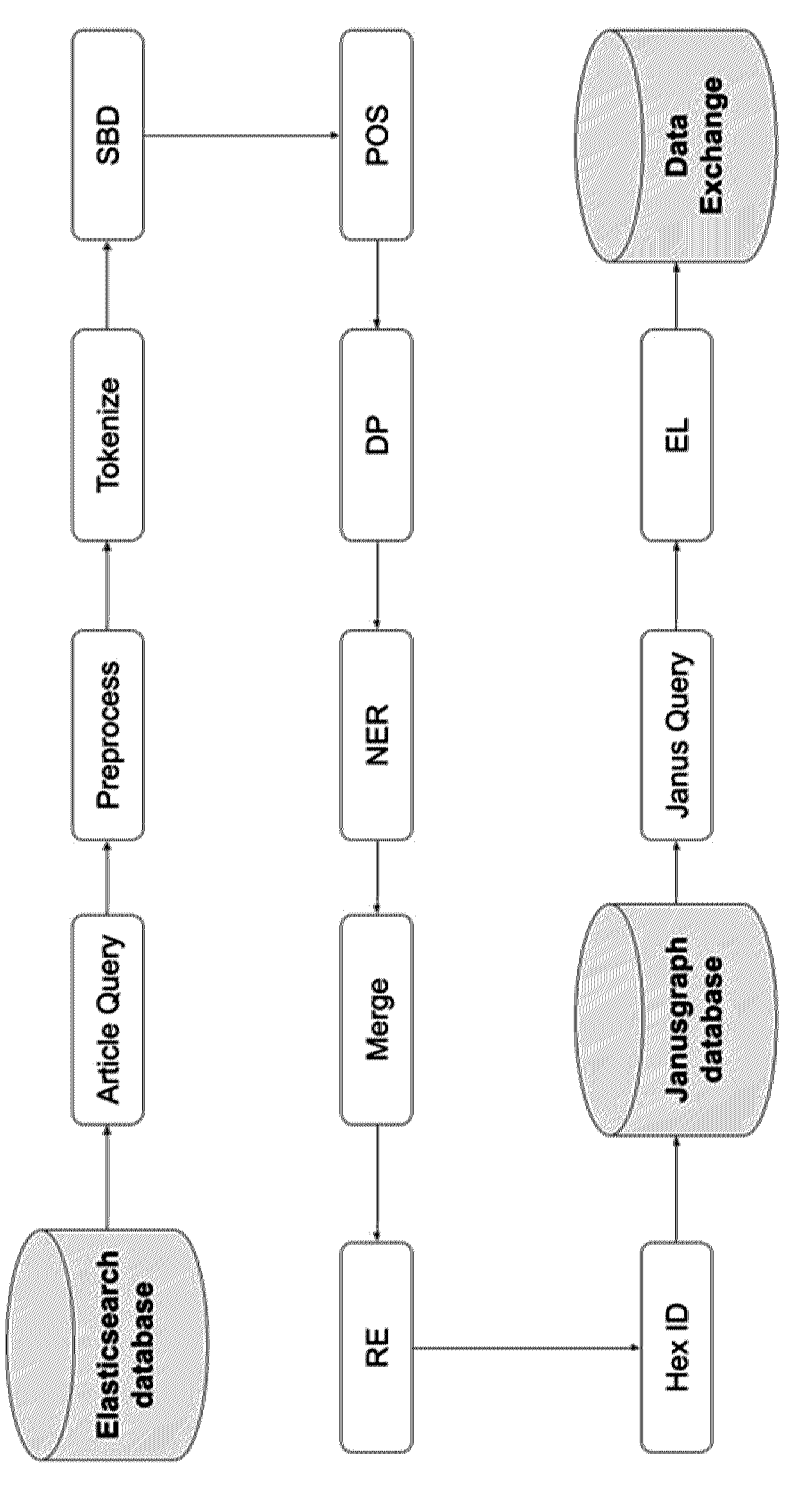
FIG. 21 is a view of an example process for natural language processing pipeline.

The server 100 has a machine learning pipeline 160 with a natural language processing (NLP) pipeline 165, structured expert pipeline 170, indices 175, and an integrated model pipeline 185 to generate a knowledge graph from unstructured data. The processor 120 uses the machine learning pipeline 160 and expert pipeline 170 to link the computer model to macro financial variables to encode a relationship between risk shocks and financial impact. The processor 120 can respond to queries using the knowledge graph. The processor 120 uses the NLP pipeline 165 to extract information from unstructured text, classify the risk, the multitude of dimensions that define a risk, quantify the interconnectedness of risk factors, and return a structured, codified and accessible data to update the knowledge graph. The knowledge graph can be queried by server 100 in response to queries received from a client application (e.g. interface 140) via API gateway 230. Further details of the NLP pipeline 165 are provided herein in relation to FIGS. 7, 19 to 27. For example, FIG. 21 is a view of an example workflow of NLP pipeline 165 to process unstructured text and return a structured, codified and accessible data structure (knowledge graph).

As shown in FIG. 1, the server 100 has a non-transitory memory 110 storing a knowledge graph defining extracted relationships of nodes corresponding to risk factors. The knowledge graph of the nodes defines a network structure of the risk factors and n-grams with links between nodes having weight values based on shared use of n-grams by risk factors corresponding to the nodes. The n-grams can be domain specific keywords.

The server 100 has a hardware processor 129 with a communication path to the non-transitory memory 110 to generate integrated risk data structures using a natural language processing pipeline 165 to extract information from unstructured text, classify risk and a plurality of risk dimensions to define the risk, quantify interconnectedness of risk factors for the associated link values. The server 100 returns structured, codified and accessible data structures to update the knowledge graphs in memory 110. The integrated risk data structures map multiple risk factors to geographic space and time. The server 100 populates the knowledge graph and the causal graph of nodes in the memory 110 by computing values for the risk factor for the time horizon using the integrated climate risk data structures. The server 100 generates multifactor scenario sets using the scenario paths for the climate model to compute the likelihood of different scenario paths for the climate model. The server 100 generates risk metrics for stress tests using the multifactor scenario sets and the knowledge graph. The server 100 transmits at least a portion of the risk metrics and the multifactor scenario sets in response to queries. The server 100 stores the integrated risk data structures and the multifactor scenario sets in the non-transitory memory 100.

The server 100 connects to a computer device 130 with a hardware processor having a client application to transmit queries to the hardware processor 120, and an interface 140 to generate visual elements at least in part corresponding to the multifactor scenario sets and the risk metrics received in response to the queries.

In some embodiments, the hardware processor 120, for each risk factor, merges relevant text data into a risk-specific corpus for the risk factor to populate the knowledge graph in memory.

In some embodiments, the hardware processor 120, for each risk factor, creates a link between a node for the risk factor and a respective n-gram extracted from the risk-specific corpus for the risk factor based on a frequency rate for the n-gram and a relevance rate to the respective risk factor determined by keyword extraction.

In some embodiments, the hardware processor 120 generates the knowledge graph by computing a bipartite network of risk factors and n-grams, and projecting the bipartite network into a single mode network of risk factors connected by edges corresponding to shared n-grams. In some embodiments, the hardware processor 120 computes edge weights between risk factors based on overlapping keywords.

In some embodiments, the knowledge graph of the nodes indicates that a respective n-gram is relevant to a plurality of risk factors to form a connection and dependency between the plurality of risk factors. In some embodiments, the hardware processor 120 uses the natural language pipeline 165 to extract the n-grams using a highest pooled score to generate a set of n-grams for each risk factor to populate the knowledge graph in memory.

In some embodiments, an expert pipeline 170 refines candidate keywords to generate the n-grams as the domain-specific keywords.

In some embodiments, the hardware processor 120 processes the unstructured text to replace each word with a syntactic form lemma to populate the knowledge graph in memory.

In some embodiments, the hardware processor 120 computes the associated values of the links in the knowledge graph using tf-idf score to link the risk factors based on shard use of n-grams. In some embodiments, the hardware processor 120 preprocesses the unstructured text to remove removing punctuation, special characters, and some common stopwords. In some embodiments, the hardware processor 120 uses the natural language pipeline 165 to continuously populate the knowledge graph of nodes by re-computing the nodes, the links, and the weight values by processing additional text data.

In some embodiments, the hardware processor 120 uses the natural language pipeline 165 to define risk-specific queries to extract raw text data from relevant articles, processes the raw text data to generate a list of tokens and predict a named entity for each token, detect and classify relationships between different entities, and defines a query to traverse the knowledge graph in an order based on a set of rules, so that only entities associated with a value of interest will be returned, wherein the hardware processor assigns a unique identifier for each entity.

In some embodiments, the server 100 has non-transitory memory 110 storing computer models as causal graphs of nodes for risk factors. Each node corresponds to a risk factor and stores a quantitative value (uncertainty) derived by a forward-frequency distribution of possible values for the risk factor at a point in time. The causal graph has forward edges connecting the nodes to create scenario paths for the computer models. The edges encode dependencies between the nodes of the causal graph. Example risk factors include climate risk factors and the server 100 can store computer risk models for climate models. Other example risk factors include pandemic risk factors and the server 100 can store computer risk models for pandemic models including epidemiological models, economics models, distance models, and so on.

The causal graph can be a directed acyclic graph or Bayesian Network, for example. The causal graph can be referred to as a scenario tree for illustrative purposes. Each node of the graph corresponds to a risk factor and stores a quantitative value corresponding to radical uncertainty. The graph provides forward-frequency distribution data of possible values for the risk factor at the time horizon. The causal graph has edges connecting the nodes to create scenario paths for the risk model. The server 100 populates the causal graph of nodes by computing the forward-frequency distribution of possible values for the risk factor at different points in time using machine learning and structured expert judgement data to link the model to macro financial variables to encode a relationship between shocks and financial impact. The server 100 generates multifactor scenario sets using the scenario paths for the risk model to compute the likelihood of different scenario paths for the risk model.

The CRCS 250 collects large datasets from different data sources (risk data 220, model data 190) and uses machine learning pipeline 160 to process the large datasets to generate structured input data for computer models and scenario engine 180. The CRCS 250 is implemented by computer hardware executing instructions to generate integrated climate risk data for scenarios on mixed risk factors. In order for the large datasets of different data formats and types to be usable for computer systems, the CRCS 250 implements processing operations to align the data to different geographic locations in a way that is scalable. CRCS 250 can change the resolutions of the data views. CRCS 250 generates a causal based hierarchy that maps climate data and multiple risk factors in space and time. CRCS 250 can enable different resolutions of data based on different geographic locates. CRCS 250 can scale back to a location (city, region) over time and spatially. CRCS 250 can encode the casualty of the changes. CRCS 250 encodes the chain of impacts on factors, when a trigger to a factor in turn triggers another factor. CRCS 250 generates a hierarchy of mapping for the data. CRCS 250 creates a computing structure of understanding for the data. The data can be in different formats and needs to be mapped or aligned or structured to be usable for computing models. The data can be input into transition scenario models for scenario engine 180 to generate forward looking prediction models.

CRCS 250 is designed to consistently classify transition and physical risk related to climate change. CRCS 250 provides a robust, consistent and scalable hierarchy for understanding and comparing exposure to climate-related risk. CRCS 250 is designed to respond to the need for a globally comprehensive, accurate, and auditable approach to defining and classifying climate risk factors and determining their economic impact. The CRCS 250 universal approach sheds light on both risks and opportunities presented by climate change, climate-related policy, and emerging technologies in an uncertain world.

CRCS 250 uses a physically consistent causal data hierarchy of measurable earth system variables and climate related phenomena covering any location (land and sea) on earth. The CRCS 250 implements a globally consistent geospatial standard that scales from climate risk regions down to the individual assets. The geospatial nature of the CRCS 250 means that any asset class or group of assets can be mapped by the CRCS 250 based on their geographic location. The standard provides a robust and consistent method for linking distributed assets at a global scale including their intermediary dependencies via supply chain disruptions.

The CRCS 250 provides a geospatial reference following the Intergovernmental Panel on Climate Change (IPCC) climate regions defined in the Climate Change Atlas. These regions are linked to climate transition scenarios (SSP and NGFS), climate elements and climate risks (chronic, acute and compound), through the climate modulators (for example ENSO, IOD, Monsoon). The climate modulators are the causal link defined by climate science, through direct and indirect (teleconnections) influence of temperature and precipitation patterns to the global atmosphere, ocean and cryosphere.

As an illustrative example embodiment, the CRCS 250 structure can consist of different climate transition scenarios, climate regions, climate modulators, climate elements and climate risks, covering chronic, acute and compound climate risks (integrated climate risk factors generated dynamically from user interaction). The CRCS 250 defines a electronic mapping to represent a causal link between transition scenarios, modulators, elements and risks to a geographic region in a consistent and science driven methodology.

The server 100 can respond to requests from interface 140 for different use cases and risk factors. The CRCS 250 processes data from the different sources to generate input for the models.

The server 100 can implement a computer process for generating integrated climate risk data by processing climate data using the taxonomy to map climate data to climate transition scenarios, climate regions, climate modulators, climate elements and climate risks. The server 100 can implement an automated rating mechanism for processing data from a variety of different sources using a consistent taxonomy. The integrated climate data can be used for scenario generation to measure the financial impact of climate change, uniformly, at some horizon, on different business units across geographies or climate regions. A business unit can operate in multiple regions and the data can be mapped to those regions.

The server 100 can implement a computer process for generating integrated climate risk data to generate a set of climate stress scenarios to measure or estimate impact on a business unit. The output data can be used to generate visualizations that aggregate gains and losses and forms a distribution of the gains (Upside) and losses (Downside). T The server 100 can provide a computer process for generating integrated climate risk data rating metrics. An example metric can be referred to as CaR, the Climate-risk adjusted Return. CaR is computed by dividing the Upside by the Downside as a measure of the risk-adjusted upside. The server 100 can generate visualizations of bar graphs for the distribution of the gains (Upside) and losses (Downside). A CaR of less that one implies a likely financial impact on profitability under these stresses. In this example, there is a section for material positive impact, a section for non-material impact, and a section for minor impact.

The server 100 generates and manages climate models, pandemic models, and other example models to respond to different types of requests. The server 100 uses CRCS 250 to generate input data for the models in response to requests. For example, the server 100 uses CRCS to generate data to query existing climate models from different computer models and calculates climate risk indices. As another example, the server 100 queries existing pandemic/epidemiological model outputs from different computer models and calculates pandemic risk indices. Other models can be incorporated as third-party input via application passing interface (API).

The server 100 has a hardware processor 120 with a communication path to the non-transitory memory 110 to process data from different data sources using the CRCS 250 and to populate the causal graph of nodes by computing the forward-frequency distribution of possible values for the risk factor at different points in time. The multifactor scenario sets are generated using the scenario paths for the computer model and scenario values are computed using the frequency distribution of possible values for the risk factors. In some embodiments, the hardware server 100 identifies macro risk factors in response to a request received from the user device 130 and generates the causal graph of nodes for the risk factors using the identified macro risk factors and dependencies between the risk factors encoded by the graph structure. The hardware server 100 generates the causal graph having forward edges connecting the nodes to create the scenario paths for the computer model. The causal relationship between risk factors are defined for each climate region. The encoding can seed the tree and arrange the nodes. In some embodiments, the relationships are updated by a named entity recognition (NER) optimiser that measures the distance between the stem words of risk factors in the scientific literature. The shorter the distance the closer the stems are to each other and the stronger the relationship between risk factors, for example.

The server 100 can use the CRCS 250 to generate input data to automatically generate scenario sets using scenario engine 180 by identifying macro factors and generating a scenario tree for the factors. The server 100 can use the scenario engine 180 to generate forward distributions of possible values for each factor at the time horizon. The server 100 can generate a set of scenarios on the combinations of macro risk factors. The server 100 can identify the extreme values and the corresponding likelihoods for each factor. A scenario is a path in the scenario tree, the scenario engine 180 having computed its likelihood as the product of the likelihoods along the path and the value associated with the scenario is the sum of the values along the path.

The server 100 can use API gateway 230 to exchange data and interact with different devices 130 and data sources, including model data 190, risk data 220, vector parameters 200, and state parameters 210. The server can receive input data from model data 190, risk data 220, vector parameters 200, and state parameters 210 to populate the computer risk models, nodes, and the scenario sets.

The server 100 can identify the micro financial factors or effects that are impacted by a set of the macro climate risk factors. The server 100 can compute valuations using a macro to micro climate conversion for each scenario.

The processor 120 has a machine learning pipeline 160 with a natural language processing (NLP) pipeline 165, structured expert pipeline 170, indices 175 (e.g., climate indices), and an integrated model pipeline 185 to generate an ontology of risk (knowledge graph) from unstructured data. The processor 120 uses the machine learning pipeline 160 and expert pipeline 170 to link the computer model to macro financial variables to encode a relationship between risk shocks and financial impact. The processor 120 can respond to queries using the knowledge graph. The processor 120 uses the NLP pipeline 165 to extract information from unstructured text, classify the risk, the multitude of dimensions that define a risk, quantify the interconnectedness of risk factors, and return a structured, codified and accessible data structure (knowledge graph) that can be queried by a client application (e.g. interface 140) via API gateway 230. Further details of the NLP pipeline 165 are provided herein in relation to FIGS. 19 to 27. For example, FIG. 21 is a view of an example workflow of NLP pipeline 165 to process unstructured text and return a structured, codified and accessible data structure (knowledge graph).

The processor 120 implements a scenario engine 180 and generates multifactor scenario sets using the scenario paths for the computer models to compute the likelihood of different scenario paths for the computer models. The processor 120 transmits the multifactor scenario sets to a valuation engine to provide a causal map of computer risk to micro shocks for the valuation engine to translate the macro financial variables to micro shocks and output portfolio reports. The processor 120 stores the multifactor scenario sets in the non-transitory memory 110. The server 100 connects to a computer device 130 via a network 150.

The computer device 130 has a hardware processor having an interface 140 to provide visual elements by accessing the multifactor scenario sets. The computer device 130 can access the scenario data from its non-transitory memory by a processor executing code instructions. The interface updates in real-time in response to computations and data at server 100.

The hardware server 100 populates the causal graph of nodes with values (estimates) for the risk factors. In some embodiments, the hardware server 100 populates the causal graph of nodes using extremes of the distributions and a weight of the distributions above and below accepted values. In some embodiments, the hardware server 100 computes the forward-frequency distribution of possible values for the risk factor for the time horizon to extract upward and downward extreme values, and likelihoods of upward and downward movement from the forward-frequency distribution. The server 100 can used structured expert pipeline 170 to collect data for computing distributions. In some embodiments, The hardware server 100 can filter outlier data using the structured expert pipeline 170 before computing the forward-frequency distribution. That way, the extreme values are more likely to be accurate representations and not outliers or noisy data. In some embodiments, outliers are not filtered to represent the entire distribution. The outliers are valid data points just at an exceedingly rare probability. The server 100 can apply data management techniques to normalise units and formats.

In some embodiments, the hardware server 100 continuously populates the causal graph of nodes by re-computing the frequency distribution of possible values for the risk factor at different points in time by continuously collecting data using the machine learning system and the structured expert pipeline 170.

In some embodiments, the hardware processor populates the causal graph of nodes by computing the frequency distribution of possible values for the climate risk factor at different points in time using machine learning pipeline 160 (with NLP pipeline 165 and structured expert pipeline 170) to collect the possible values representing estimates of future uncertain values.

The server 100 provides a scalable automated process for generating scenarios that link different types of risk factors. For example, the server 100 can generate output to stress test the financial impacts of climate change in a scalable, consistent, auditable and reproducible manner.

The server 100 assembles a comprehensive knowledge graph or database including the most updated data on risk factors and economic drivers covering all regions around the world. The dataset contains a dynamic collection of recent, trusted, peer reviewed articles that can be updated regularly. The server 100 uses machine learning pipeline 160 (and NLP pipeline) to read these papers and summarize the uncertainty in risk factors at future points in time. The server 100 uses the structured expert pipeline 170 to exchange data with communities of experts using interface 140 and assess the sentiment on the future. The server 100 maintains complete and most current data on scientific experiments with a large number of the major models and their view on the future, month by month or over other times periods.

From all these data sources, the server 100 generates knowledge graphs or derived data that captures uncertainty in a set of related risk factors at numerous future horizons. The server 100 uses the data for generating scenarios and visual elements for interface 140 of user device 130.

As an example, risk factors can relate to pandemic risk factors. The server 100 can store computer risk models for pandemic models including epidemiological models, economics models, distance models, and so on. The server 100 can use API gateway to receive data from different data sources, including model data 190, risk data 220, vector parameters 200, and state parameters 210. The server can receive input data from model data 190, risk data 220, vector parameters 200, and state parameters 210 to populate the computer risk models, nodes, and the scenario sets.

The server 100 can generate visual elements, decisions and policies for interface 140 relating to the pandemic risk factors based on computations by scenario engine 180 with input from different data sources. For example, model data 190 and risk data 220 can include community and distancing model data from camera feeds, video input and video files. For example, vector parameters 200 can include epidemiological vector parameters (transmission rate, duration care facility, duration illness, illness probabilities, measures, effects) and economic vector parameters (household expenditure, income consumption, unemployment benefit uptake, imported input restrictions, shutdown, timing, labour productivity, export demand, wage subsidy update, government programs). For example, state parameters 210 can include epidemiological state parameters (current state infected, hospital, death, recovered, geography regions) and economic state parameters (time required to reopen, labour force, demographics, geographic controls). The server 100 uses the data to populate the computer risk models, nodes, and the scenario sets.

As another example, risk factors can relate to climate risk factors. The server 100 has computer models for climate risk models. The server 100 receives climate data from different types of data sources. The CRCS 250 processes the data from different types of data sources to generate input data and scenarios.

The CRCS 250 structure can consist of different climate transition scenarios, climate regions, climate modulators, climate elements and climate risks, covering chronic, acute and compound climate risks (integrated climate risk factors generated dynamically from user interaction). The CRCS 250 processes the data from different types of data sources to define an electronic mapping to represent a causal link between data elements for transition scenarios, modulators, elements and risks to data elements for geographic regions.

The server 100 manages risk factors for different types of risk. The server 100 can categorize different macro risks that define a risk potential can be categorised into five hierarchical frameworks:

Climate Risk
Pandemic/Epidemic Risk
Political/GeoPolitical Risk
Cyber Security Risk
Macroeconomic Risk
Each of these risk areas can be defined by following risk hierarchy:
Risk Conditions
Risk Modulators
Risk Elements
Risk Factors
Multi-Factor Scenario The server 100 can define the different types of risk factors using the risk hierarchy. The path to a multi-factor scenario can be conditioned on the realisation of one or multiple macro risk hierarchies.

Figure 1A:
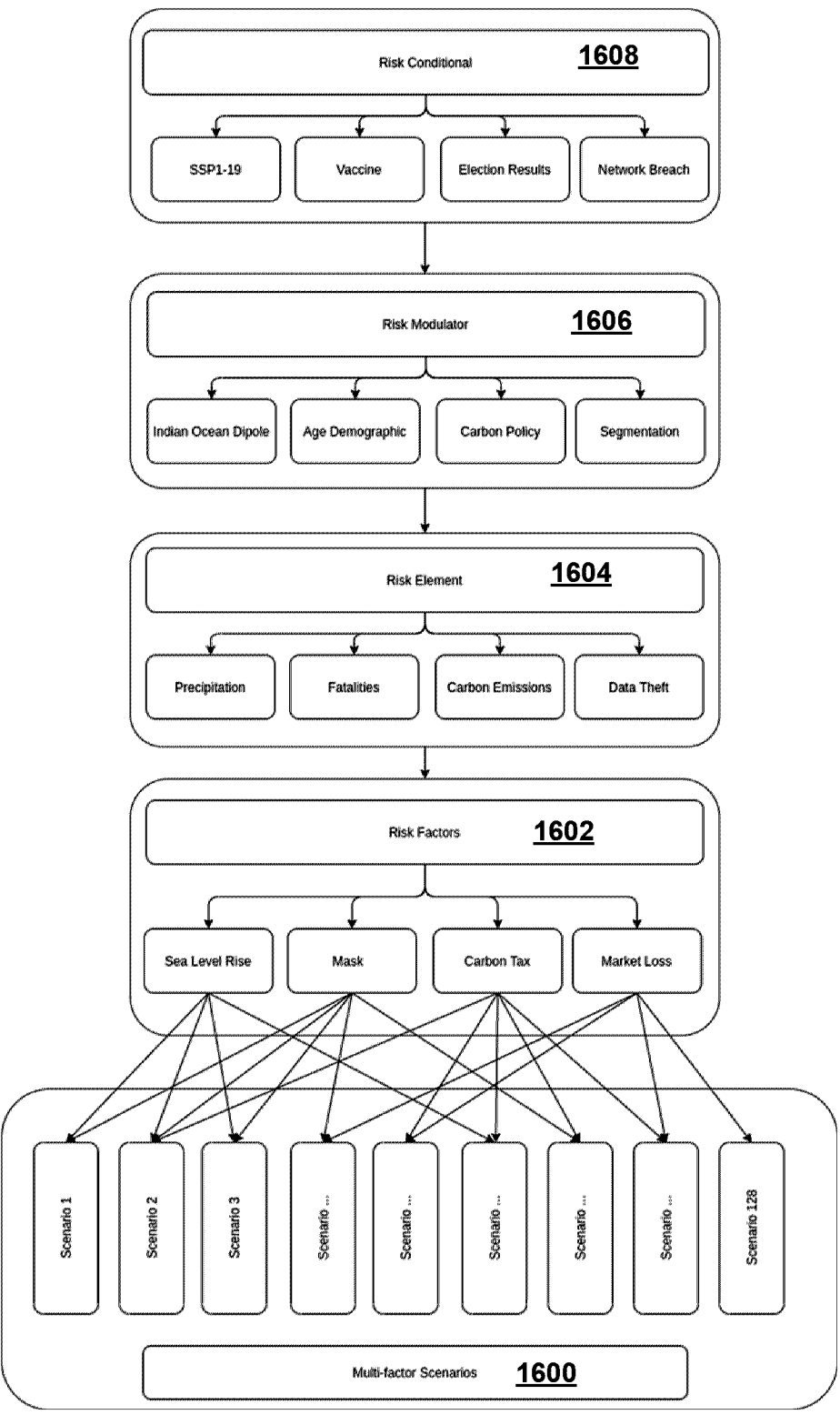
FIG. 1A is a view of an example risk hierarchy.

FIG. 1A shows an example risk hierarchy for generating multi-factor scenarios 1600 with risk conditions 1608, risk modulators 1606, risk elements 1604, risk factors 1602. The server 100 defines the risk hierarchy by encoding links from the risk conditions 1608 to the risk modulators 1606. The server 100 defines the risk hierarchy by encoding links from risk modulators 1606 to the risk elements 1604. The server 100 defines the risk hierarchy by encoding links from the risk elements 1604 to the risk factors 1602. The server 100 generates the multi-factor scenarios 1600 based on the different paths of the risk factors 1602.

Accordingly, server 100 can define different risk factors 1602 for scenario generation using the risk hierarchy of risk conditions 1608, risk modulators 1606, risk elements 1604, risk factors 1602.

For example; climate risk can be conditioned on the world following one of the Shared-Socioeconomic Pathways (SSPs) defined by the Intergovernmental panel on climate change (IPCC). These SSP's define the configuration of energy production and demand, population growth, economic growth and carbon emissions that lead to a specific warming potential in watts per meter squared globally over the next 80 years. Under a specific SSP trajectory, changes to the global climate are uncertain as are their impacts and the response of a portfolio to the realisation of those changes at multiple geographical locations. Such that the climate risks associated with western North America are different from Central and eastern North America, as are the macroeconomic drivers of these climatic regions including the economic/political/administrative boundaries within the climate regions.

Figure 1B:
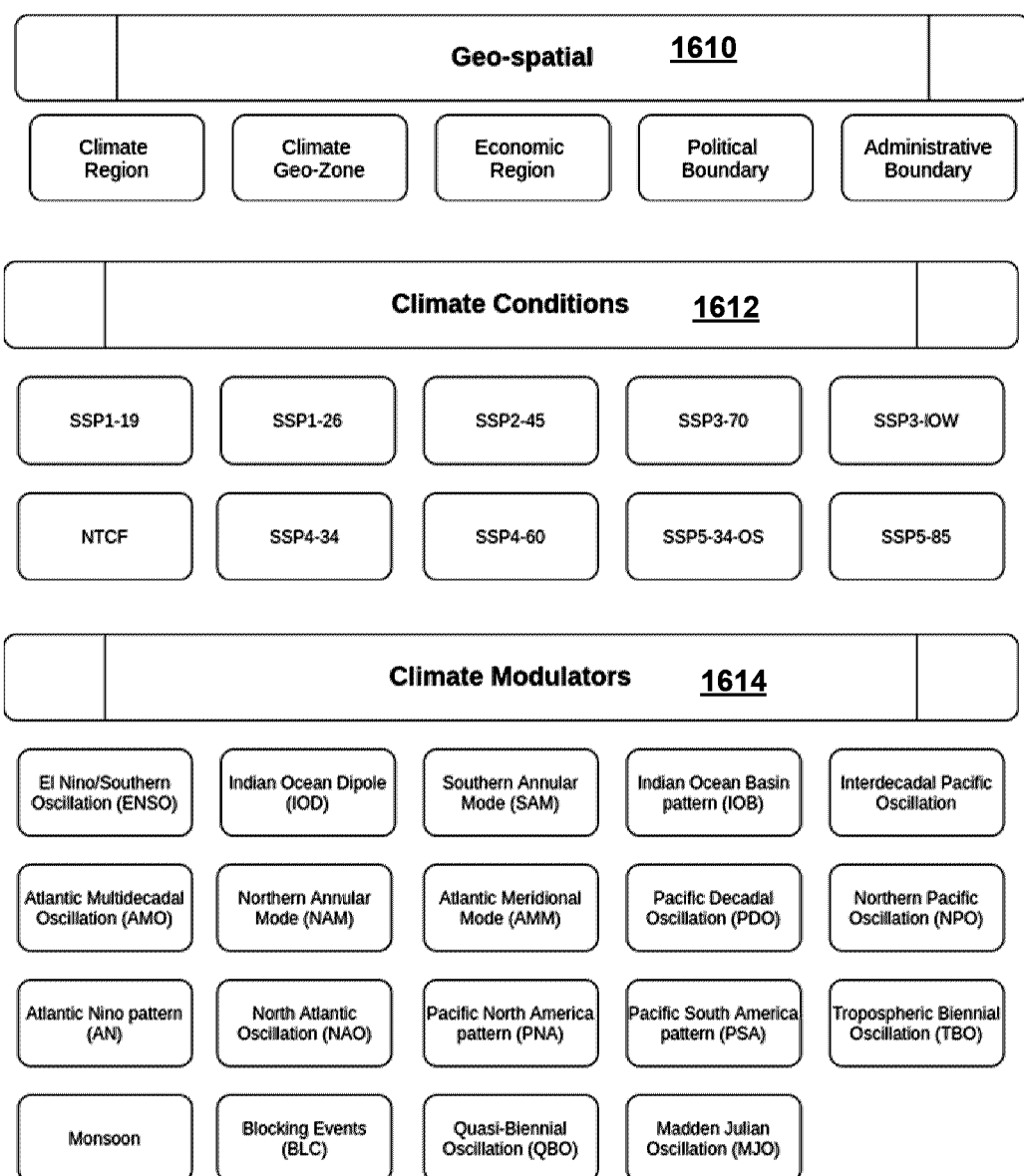
FIG. 1B is a view of example components of a climate risk hierarchy.

FIGS. 1B and 1C show the cascade of risk potentials conditioned for climate risk. The end result is a set of multi-factor climate risk scenarios that are used as input stressors to a macroeconomic model for stress testing. For this example, server 100 can define different geo-spatial regions 1610. The server 100 defines a risk hierarchy of climate risk conditions 1612, climate risk modulators 1614, climate risk elements 1616, and climate risk factors 1612. In this example, chronic and acute factors are shown.

Figure 1D:
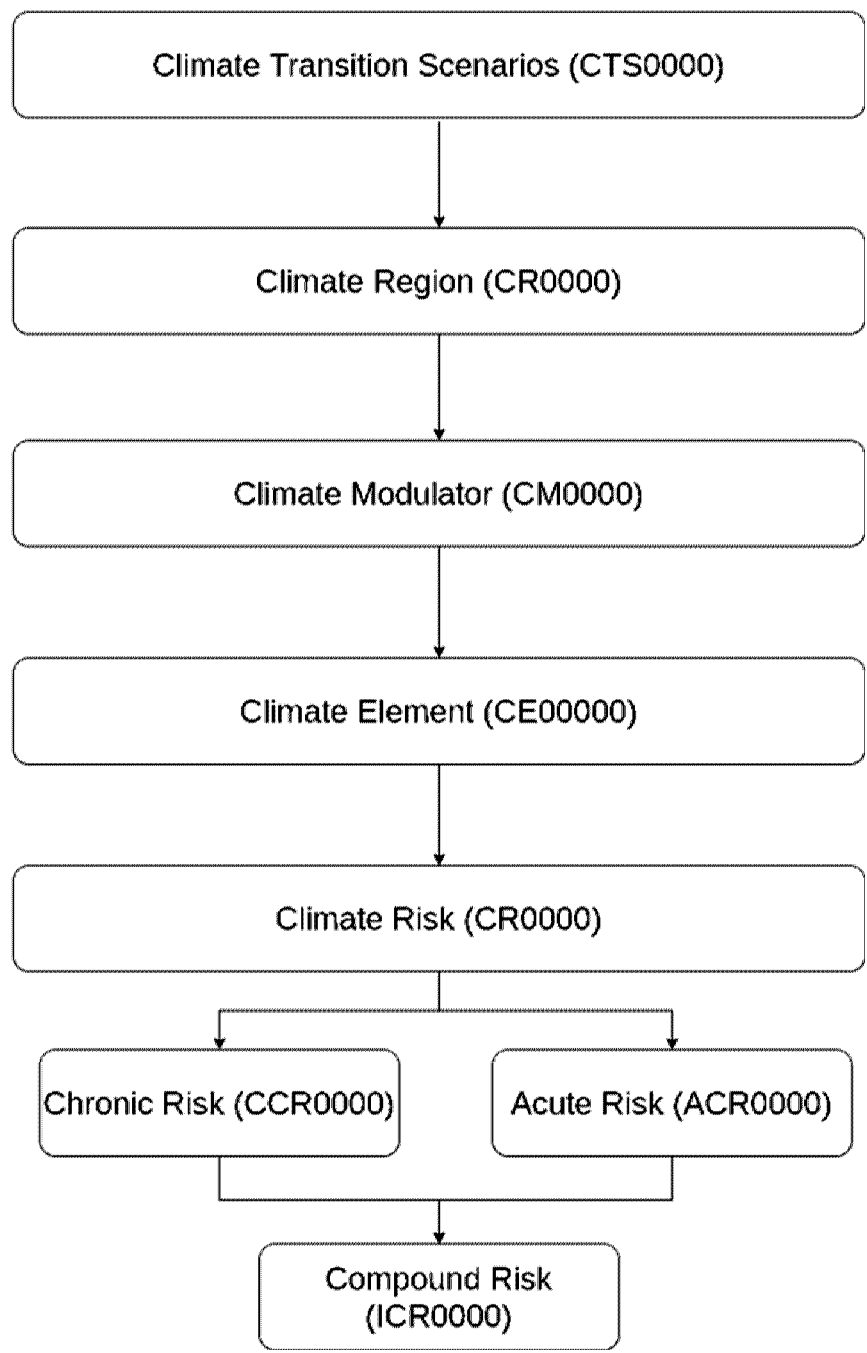
FIG. 1D is a view of example components of a CRCS hierarchy.

FIG. 1D is a view of example components of a CRCS 250 hierarchy. The example CRCS 250 structure consists of 37 climate transition scenarios (CTS0000), 62 climate (land and sea) regions (CR0000), 27 climate modulators (CM0000), 13 climate elements (CE0000) and 28 climate risks, covering chronic (CCR0000), acute (ACR0000) and compound (ICR0000) risks (integrated climate risk factors generated dynamically from user interaction). The CRCS 250 defines the causal link between transition scenarios, modulators, elements and risks to a region.

The CRCS 250 can encode causality to enable the computing components to understand the radical risks associated with climate change. The CRCS 250 can start by selecting a transition scenario (carbon pathway). The transition scenario impacts climate modulators. which affects all regions in the world. The transition scenario impacts the climate modulators and these affect all regions in the world, but only certain geographic regions or locations are of interest to business units, for example. These points of interest intersect with a subset of climate regions. The points of interest impact climate risk, chronic and acute risks in the regions of interest. This in turn leads to the climate risk factors in the regions of interest. This process can be repeated by CRCS 250 for every transition scenario.

Figure 1E:
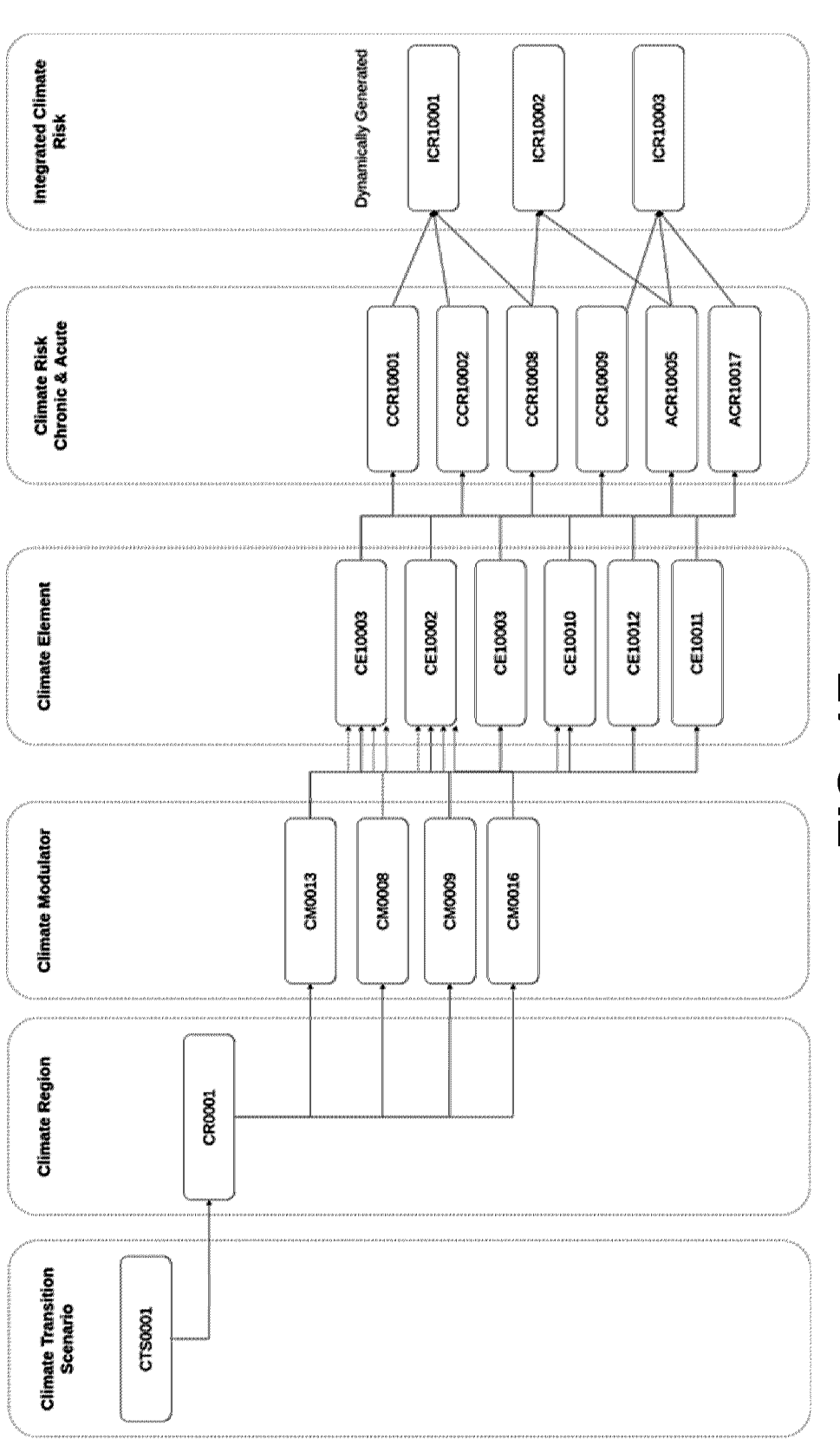
FIG. 1E is another view of example components of a CRCS hierarchy.

FIG. 1E is another view of example components of a CRCS 250 hierarchy to generate integrated climate risk for scenarios.

The example CRCS 250 hierarchy shows of a climate transition scenario (CTS0001) with a link to a climate (land and sea) region (CR0001). The climate region (CR0001) has a link to climate modulators (CM0013, CM0008, CM0009, CM0016). The climate modulators have links to climate elements (CE10003, CE10002, CE10003, CE10010, CE10012, CE10011). The climate elements have links to climate risks, including chronic, acute, and compound risks. The CRCS 250 dynamically generates climate risk data corresponding to integrated climate risk for scenario generation. The CRCS 250 defines the causal link between transition scenarios, modulators, elements and risks to a region.

The CRCS 250 encodes causality to enable the computing components to understand the radical risks associated with climate change. The CRCS 250 selects a transition scenario (CTS0001). The transition scenario impacts climate modulators. which affects all regions in the world. These points of interest intersect with a subset of climate regions. The transition scenario impacts the climate modulators and these impact climate elements. The points of interest impact climate risk, chronic and acute risks in the regions of interest. This in turn leads to the climate risk factors in the regions of interest. This process can be repeated by CRCS 250 for different transition scenarios.

CRCS 250 encodes physically-consistent, causal hierarchy. CRCS 250 encodes different locations or regions, and the geospatial standard scales from climate risk regions down to a physical asset. Any asset class or group of assets can be mapped by CRCS 250, based on its geographic location. CRCS 250 encodes a robust and consistent method, for linking distributed assets, at a global scale. CRCS 250 encodes a geospatial reference consistent with global standard climate regions.

The CRCS 250 can be reviewed periodically to ensure it keeps pace with the evolving climate change field and continues to deliver value to users, while maintaining the constancy required of a standard. When new information becomes available, modifications, additions or removals of a given risk factor or index from the CRCS 250 may be undertaken. To ensure transparency and quality of the standard, there can be a CRCS Committee of expert data communities.

Table 1 shows example Climate Change Regimes (greenhouse gas concentration trajectories) that can be used by the CRCS 250.

| Climate Transition Scenarios | Code_name | Code |
|---|---|---|
| Hothouse world | NGFS1 | CTS00001 |
| Hothouse alt | NGFS1a | CTS00002 |
| Orderly | NGFS2 | CTS00003 |
| Orderly alt | NGFS2a | CTS00004 |

-continued

| Climate Transition Scenarios | Code_name | Code |
|---|---|---|
| Orderly alt 1.5 | NGFS2b | CTS00005 |
| Disorderly | MGFS3 | CTS00006 |
| Disorderly alt | NGFS3a | CTS00007 |
| Disorderly alt 1.5 | NGFS3b | CTS00008 |
| Sustainability RCP1.9 | SSP1-19 | CTS00009 |
| Sustainability RCP2.6 | SSP1-26 | CTS00010 |
| Sustainability RCP3.4 | SSP1-34 | CTS00011 |
| Sustainability RCP4.5 | SSP1-45 | CTS00012 |
| Sustainability RCP6.0 | SSP1-60 | CTS00013 |
| Sustainability RCP8.5 | SSP1-Baseline | CTS00014 |
| Middle of the Road RCP1.9 | SSP2-19 | CTS00015 |
| Middle of the Road RCP2.6 | SSP2-26 | CTS00016 |
| Middle of the Road RCP3.4 | SSP2-34 | CTS00017 |
| Middle of the Road RCP4.5 | SSP2-45 | CTS00018 |
| Middle of the Road RCP6.0 | SSP2-60 | CTS00019 |
| Middle of the Road RCP8.5 | SSP2-Baseline | CTS00020 |
| Regional Rivalry RCP3.4 | SSP3-34 | CTS00021 |
| Regional Rivalry RCP4.5 | SSP3-45 | CTS00022 |
| Regional Rivalry RCP6.0 | SSP3-60 | CTS00023 |
| Regional Rivalry RCP8.5 | SSP3-Baseline | CTS00024 |
| Inequality RCP1.9 | SSP4-19 | CTS00025 |
| Inequality RCP2.6 | SSP4-26 | CTS00026 |
| Inequality RCP3.4 | SSP4-34 | CTS00027 |
| Inequality RCP4.5 | SSP4-45 | CTS00028 |
| Inequality RCP6.0 | SSP4-60 | CTS00029 |
| Inequality RCP8.5 | SSP4-Baseline | CTS00030 |
| Fossil-fueled Development RCP1.9 | SSP5-19 | CTS00031 |
| Fossil-fueled Development RCP2.6 | SSP5-26 | CTS00032 |
| Fossil-fueled Development RCP3.4 | SSP5-34 | CTS00033 |
| Fossil-fueled Development RCP4.5 | SSP5-45 | CTS00034 |
| Fossil-fueled Development RCP6.0 | SSP5-60 | CTS00035 |
| Fossil-fueled Development RCP8.5 | SSP5-Baseline | CTS00036 |
| SEJ derived regime | RT3.0 | CTS00037 |

Table 2 shows example Global climate regions and their classification codes.

| Climate Region | Name | Code_Name | Sphere | Code |
|---|---|---|---|---|
| GLOBAL | Global | GLD | Land-Ocean | CR1001 |
| GLOBAL-LAND | Global-land | GLDI | Land | CR1002 |
| GLOBAL-OCEAN | Global-ocean | GLDs | Ocean | CR1003 |
| POLAR | Greenland/Iceland | GIC | Land | CR0001 |
| NORTH-AMERICA | N.W. North-America | NWN | Land | CR0002 |
| NORTH-AMERICA | N.E. North-America | NEN | Land | CR0003 |
| NORTH-AMERICA | W. North-America | WNA | Land | CR0004 |
| NORTH-AMERICA | C. North-America | CNA | Land | CR0005 |
| NORTH-AMERICA | E. North-America | ENA | Land | CR0006 |
| CENTRAL-AMERICA | N. Central-America | NCA | Land | CR0007 |
| CENTRAL-AMERICA | S. Central-America | SCA | Land | CR0008 |
| CENTRAL-AMERICA | Caribbean | CAR | Land-Ocean | CR0009 |
| SOUTH-AMERICA | N.W. South-America | NWS | Land | CR0010 |
| SOUTH-AMERICA | N. South-America | NSA | Land | CR0011 |
| SOUTH-AMERICA | N.E. South-America | NES | Land | CR0012 |
| SOUTH-AMERICA | South-American-Monsoon | SAM | Land | CR0013 |
| SOUTH-AMERICA | S.W. South-America | SWS | Land | CR0014 |
| SOUTH-AMERICA | S.E. South-America | SES | Land | CR0015 |
| SOUTH-AMERICA | S. South-America | SSA | Land | CR0016 |
| EUROPE | N. Europe | NEU | Land | CR0017 |
| EUROPE | West&Central-Europe | WCE | Land | CR0018 |
| EUROPE | E. Europe | EEU | Land | CR0019 |
| EUROPE-AFRICA | Mediterranean | MED | Land-Ocean | CR0020 |
| AFRICA | Sahara | SAH | Land | CR0021 |
| AFRICA | Western-Africa | WAF | Land | CR0022 |
| AFRICA | Central-Africa | CAF | Land | CR0023 |

-continued

| Climate Region | Name | Code_Name | Sphere | Code |
|---|---|---|---|---|
| AFRICA | N. Eastern-Africa | NEAF | Land | CR0024 |
| AFRICA | S. Eastern-Africa | SEAF | Land | CR0025 |
| AFRICA | W. Southern-Africa | WSAF | Land | CR0026 |
| AFRICA | E. Southern-Africa | ESAF | Land | CR0027 |
| AFRICA | Madagascar | MDG | Land | CR0028 |
| ASIA | Russian-Arctic | RAR | Land | CR0029 |
| ASIA | Russian-Arctic | RAR* | Land | CR0030 |
| ASIA | W. Siberia | WSB | Land | CR0031 |
| ASIA | E. Siberia | ESB | Land | CR0032 |
| ASIA | Russian-Far-East | RFE | Land | CR0033 |
| ASIA | W.C. Asia | WCA | Land | CR0034 |
| ASIA | E.C. Asia | ECA | Land | CR0035 |
| ASIA | Tibetan-Plateau | TIB | Land | CR0036 |
| ASIA | E. Asia | EAS | Land | CR0037 |
| ASIA | Arabian-Peninsula | ARP | Land | CR0038 |
| ASIA | S. Asia | SAS | Land | CR0039 |
| ASIA | S.E. Asia | SEA | Land-Ocean | CR0040 |
| OCEANIA | N. Australia | NAU | Land | CR0041 |
| OCEANIA | C. Australia | CAU | Land | CR0042 |
| OCEANIA | E. Australia | EAU | Land | CR0043 |
| OCEANIA | S. Australia | SAU | Land | CR0044 |
| OCEANIA | New-Zealand | NZ | Land | CR0045 |
| POLAR | E. Antarctica | EAN | Land | CR0046 |
| POLAR | W. Antarctica | WAN | Land | CR0047 |
| ARCTIC | Arctic-Ocean | ARO | Ocean | CR0048 |
| PACIFIC | N. Pacific-Ocean | NPO | Ocean | CR0049 |
| PACIFIC | N. Pacific-Ocean | NPO* | Ocean | CR0050 |
| PACIFIC | Equatorial. Pacific-Ocean | EPO | Ocean | CR0051 |
| PACIFIC | Equatorial. Pacific-Ocean | EPO* | Ocean | CR0052 |
| PACIFIC | S. Pacific-Ocean | SPO | Ocean | CR0053 |
| PACIFIC | S. Pacific-Ocean | SPO* | Ocean | CR0054 |
| ATLANTIC | N. Atlantic-Ocean | NAO | Ocean | CR0055 |
| ATLANTIC | Equatorial. Atlantic-Ocean | EAO | Ocean | CR0056 |
| ATLANTIC | S. Atlantic-Ocean | SAO | Ocean | CR0057 |
| INDIAN | Arabian-Sea | ARS | Ocean | CR0058 |
| INDIAN | Bay-of-Bengal | BOB | Ocean | CR0059 |
| INDIAN | Equatorial Indian-Ocean | EIO | Ocean | CR0060 |
| INDIAN | Southern Indian-Ocean | SIO | Ocean | CR0061 |
| SOUTHERN | Southern-Ocean | SOO | Ocean | CR0062 |

Table 3 shows example Global climate modulators and their classification codes.

| Climate Modulators | Code_name | Code |
|---|---|---|
| Indian Ocean Dipole[4] | IOD | CM0001 |
| Atlantic Nino Pattern[5] | AN | CM0002 |
| Southern Annular Mode[6] | SAM | CM0003 |
| Indian Ocean Basin pattern[7] | IOB | CM0004 |
| El Nino/Southern Oscillation[8] | ENSO | CM0005 |
| Interdecadal Pacific Oscillation[9] | IPO | CM0006 |
| Madden-Julian Oscillation[10] | MJO | CM0007 |
| Pacific Decadal Oscillation[11] | PDO | CM0008 |
| Northern Pacifc Oscillation[12] | NPO | CM0009 |
| Tropospheric Biennial Oscillation[13] | TBO | CM0010 |
| Pacific North America pattern[14] | PNA | CM0011 |
| Pacific South America pattern[15] | PSA | CM0012 |
| North Atlantic Oscillation[16] | NAO | CM0013 |
| Northern Annular Mode[17] | NAM | CM0014 |
| Atlantic Meridional Mode[5] | AMM | CM0015 |
| Atlantic Multidecadal Oscillation[18] | AMO | CM0016 |
| Quasi-Biennial Oscillation[19] | QBO | CM0017 |
| Asian-Australian Monsoon[13] | AAM | CM0018 |
| Indian Monsoon[20] | IMn | CM0019 |
| NW Pacific Monsoon[21] | WNPM | CM0020 |
| North American Monsoon[22] | NAMS | CM0021 |
| South American Monsoon[23] | SAMn | CM0022 |
| African Monsoon[24] | AFMn | CM0023 |

-continued

| Climate Modulators | Code_name | Code |
|---|---|---|
| Inter-tropical Convergence Zone[25] | ITCZ | CM0024 |
| South Pacific Convergence Zone[26] | SPCZ | CM0025 |
| South Atlantic Convergence Zone[27] | SACZ | CM0026 |

Table 4 shows example Global climate elements and their classification codes.

| Climate Elements | Code_name | Code |
|---|---|---|
| Precipitation | Pr | CE10001 |
| Air Temperature | Ta | CE10002 |
| Water Vapour | Wv | CE10003 |
| Horizontal motion in the atmosphere | UV | CE10004 |
| Vertical motion in the atmosphere | W | CE10005 |
| Wind speed | Wspd | CE10006 |
| Atmospheric pressure | Pa | CE10007 |
| Ocean surface temperature | Ost | CE10008 |
| Ocean heat content | Ohc | CE10009 |
| Ocean salinity | Os | CE10009 |
| Sea ice | SEi | CE10010 |
| Blocking Events | BLC | CE10011 |
| Extra Tropical Cyclone | ETC | CE10012 |
| Tropical Cyclones | TC | CE10013 |

Table 5 shows example Global climate risks (chronic and acute) and their classification codes.

| | Code__name | Code |
|---|---|---|
| Chronic Climate Risk | | |
| Sea level rise | SLR | CCR10001 |
| Ocean acidification | Oa | CCR10002 |
| Glacier melt & instability | IGm | CCR10003 |
| Ice sheet melt & instability | ISm | CCR10004 |
| Permafrost melt | Pm | CCR10005 |
| Soil degradation | Dst | CCR10006 |
| Carbon emissions | Ce | CCR10007 |
| Mean Temperature | Mt | CCR10008 |
| Precipitation pattern changes | Ppc | CCR10009 |
| Ecotone migration | Ecm | CCR10010 |
| Biodiversity Loss | Bdl | CCR10011 |
| Deforestation | Df | CCR10012 |
| Acute Climate Risk | | |
| Drought | Dt | ACR10001 |
| Wildfire | Wf | ACR10002 |
| Heat wave | Hs | ACR10003 |
| Cold snap | Cs | ACR10004 |
| Extreme precipitation | Exp | ACR10005 |
| Extreme wind | Exw | ACR10006 |
| Cyclone/Hurricanes/Typhoons | CHT | ACR10007 |
| Storm surge | Ss | ACR10008 |
| Fluvial flood | Ff | ACR10009 |
| Pluvial flood | Pf | ACR10010 |
| Hail | Hl | ACR10011 |
| Lightning | Ln | ACR10012 |
| Marine heatwave | Mh | ACR10013 |
| Tornadoes | Tx | ACR10014 |
| Slope instability | Si | ACR10015 |
| Glacial Lake Outburst | GLO | ACR10016 |
| Sand/Dust Storms | SDS | ACR10017 |

The server 100 can implement a microservice event driven architecture that stores data in a data warehouse (memory 110) accessible over a network via secure API gateway 230. The input data is retrieved automatically and preprocessed before insertion into the data warehouse. Pre-processing of input data by server 100 can involve dedupli-cation, unit normalisation and format alignment. The input data is called via a microservice over the network 150 to a modelling pipeline where data analytics and machine learn-ing techniques are applied to the data to derive risk indices and develop risk models. The modelling processes are actuated on multiple computer processing units (CPU) working in unison and/or on multiple graphical processing units (GPU) working in unison, which can be referred to as processor 120 for illustrative purposes. The data derived from these processes are returned to the data warehouse and made available via application programming interface (API) gateway 230 to the front end user interface 140 (at user device 130), as raw data streams or back into the platform for integration into the scenario generation engine 180.

Figure 2:
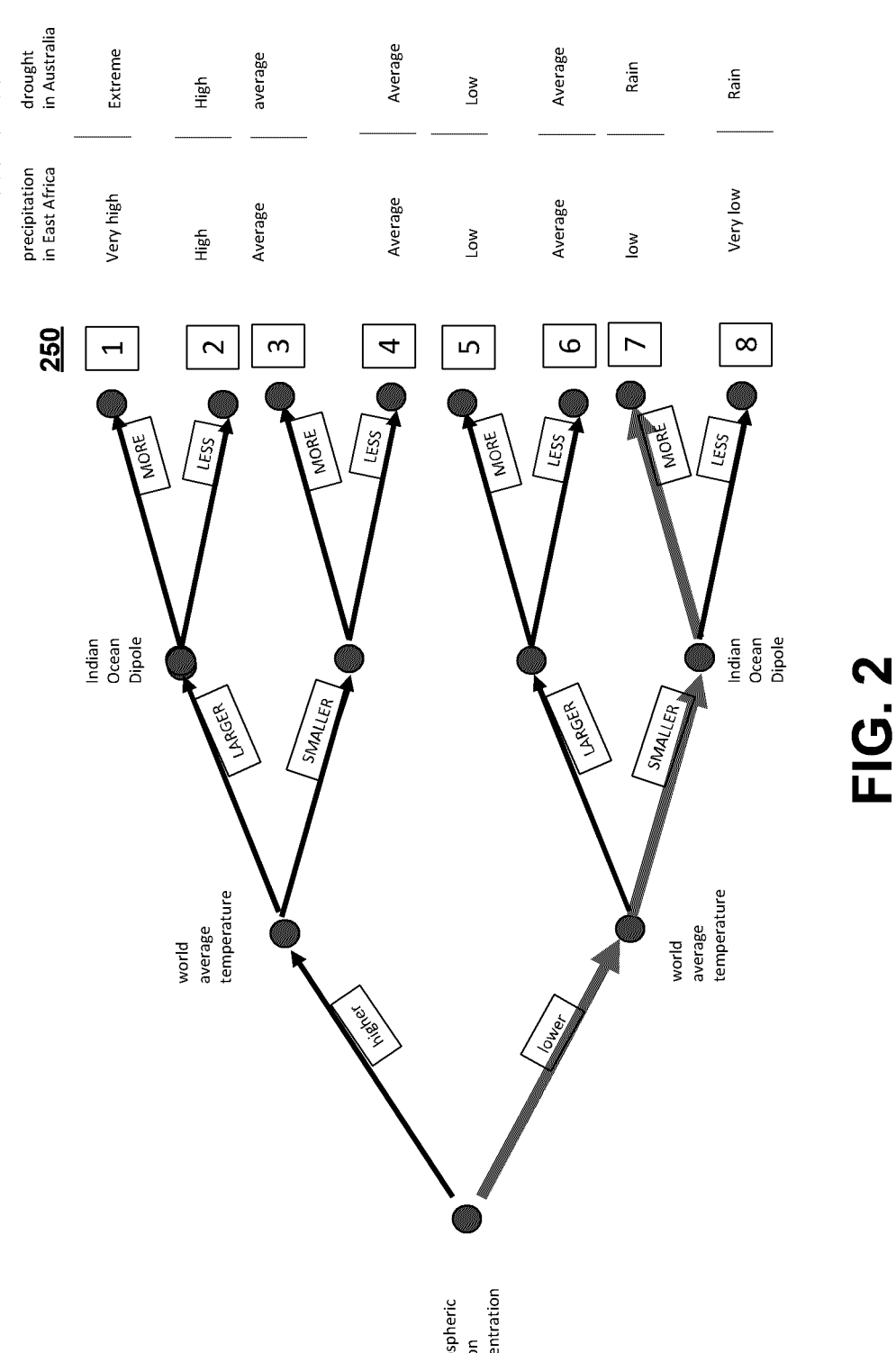
FIG. 2 is an example graph of nodes for climate risk factors.

FIG. 2 shows an example diagram for example scenarios 250 defined by scenario paths for the climate models. The server 100 has non-transitory memory 110 storing climate models as causal graphs of nodes for climate risk factors. Each node corresponds to a climate risk factor. The server 100 generates multifactor scenario sets using the scenario paths for the climate models to compute the likelihood of different scenario paths for the climate models. The server 100 stores the multifactor scenario sets in the non-transitory memory 110. The example diagram shows scenario paths for example scenarios 250 and associated states and values for the models.

The server 100 uses the climate models and the causal graphs of nodes for climate risk factors to store quantitative values (uncertainty) for frequency distributions of possible values for the climate risk factors at different points in time. The causal graph has forward edges connecting the nodes to create scenario paths for the climate models. The server 100 populates the causal graph of nodes by computing the frequency distribution of possible values for the climate risk factor at different points in time.

The computer device 130 has an interface 140 to provide visual elements corresponding to the different scenario paths for the climate models by accessing the multifactor scenario sets at server 100 or its internal memory. The computer device 130 can access the scenario data from its non-transitory memory and generate the visual elements corre-sponding to the different scenario paths for climate models using its processor executing code instructions.

In this example, the interface 140 can display visual elements corresponding to causal graphs of nodes for cli-mate risk factors. The interface 140 can display visual elements corresponding to different scenario paths of cli-mate risk factors and display a scenario set as a collection of scenario paths of the causal graph or tree structure.

Example climate risk factors include: resulting atmo-spheric carbon concentration, world average temperature, the Indian Ocean Dipole, precipitation in East Africa, drought in Australia, and carbon emissions. These are examples and there are many climate drivers that affect the risk factors of climate change. Using the Indian Ocean Dipole as an example, the dipole is the difference in tem-peratures between the Eastern and Western areas of the Indian Ocean. As the world average temperature rises, the dipole may become more pronounced. As the sea heats up in the East, more evaporation occurs, making the air above East Africa more prone to precipitation and extreme weather. In contrast, as the water cools in the ocean bordering Northern Australia, the precipitation over Australia drops causing drought conditions coupled with high temperatures. The climate risk factors and process may be represented by a causal graph. Conditioned on a transition pathway for carbon, the visual elements can depict how carbon emissions can affect the concentration of greenhouse gases in the atmosphere, which, in turn, can affect the world average temperature rise in the future which, in turn, may exaggerate the Indian Ocean Dipole. As the Indian Ocean Dipole grows so might the precipitation in East Africa and drought in Australia.

In this example, the interface 140 can display visual elements corresponding to different scenario paths for the climate risk factors. The interface 140 can be used to visually represent relationships between the climate risk factors, and the impact a climate risk factor can have on another climate risk factor. Example queries include: Will carbon concentration grow more than scientists think? or less? If CO2 is more than expected what will happen to the world average temperature rise? If world average tempera-ture grows, will the Indian Ocean Dipole be larger or smaller than what scientists think?

This is an illustrative example and the interface 140 can display visual elements corresponding to different scenario paths for the other types of risk factors. The interface 140 can be used to visually represent relationships between the risk factors, and the impact a risk factor can have on another risk factor.

The example scenario tree shown in FIG. 2 is a graph of nodes conditioned on a transition pathway for carbon emissions. Each path is a scenario made up of 3 risk factors: carbon concentration, world average temperature and Indian Ocean Dipole.

An example scenario path is the following scenario: Carbon concentration in the atmosphere grows less than scientist data indicates, and the world average temperature rise is lower than scientist data indicates; however the Indian Ocean Dipole is larger than was anticipated by scientist data. The structure can generate additional values for responding to queries: how much higher or how much lower? how likely is higher? how likely is lower?

The server 100 can generate scenarios and values that capture possible extreme climate risks. The values can be generated based on estimations of the radical uncertainty in the future of the climate risk factors at the nodes of the scenario tree. The example shows 8 different scenario paths as illustrative visual elements.

The server 100 can generate climate data sets stored at memory 110. The server 100 can define climate drivers and climate risk factors.

There can be different climate drivers, and in particular, global regional climate drivers. The server 100 can generate data values for different global regional climate drivers. The server 100 can generate nodes of the graph for different climate drivers. The server 100 can model different classifications or categories of climate risk factors or different types of risk. The server 100 can model climate risk factors with continuous risk, phase risk, emergent risk, chronic risk, acute risk, and compound risk, for example. In some embodiments, the different classifications of risk can be chronic, acute and compound.

The server 100 can generate an ontology of climate related risk as knowledge graphs or data structures. The server 100 can use machine learning pipeline 160 (and NLP pipeline 165) to process unstructured text and extract information from unstructured text, classify the risk, the multitude of dimensions that define a risk, quantify the interconnectedness of risk factors, and return a structured, codified and accessible data structure that can be queried by a client application. The NLP pipeline 165 can use NLP classifiers. The server 100 can train the NLP classifiers separately for chronic and acute risks. The NER optimiser output is also used to group risks into compound potentials. Continuous risk can correspond to persistent/chronic environmental change. Phase risk can correspond to intensity/duration/frequency, acute events limited in space and time. Emergent risk can correspond to compounding risks, coincident in space and time, coincident in space but not time, distributed effects (i.e. supply chain impacts), tipping points and feedback loops.

The interface 140 can provide an annotation guide aligned with different risk classifications. The server 100 can generate annotations using climate risk data. The server 100 can train NLP classifiers (for NLP pipeline 165) on continuous and phase risk factors, for example. The server 100 can use different models to cover all risk factor classifications or types.

Macro factors can be directly linked to climate drivers and risk factors. The structured expert pipeline 170 can collect data to fill in the knowledge gaps around the magnitude of these relationships quantifying the uncertainty in the global climate models.

The server 100 collects data from global and regional data sources on climate and climate extremes to compute values to quantify climate extremes. For example, the server 100 can process climate extreme indices recommended by the CCl/WCRP/JCOMM Expert Team on Climate Change Detection and Indices (ETCCDI). The data can be related to temperature (e.g., extreme heat or cold events, prolonged heat or cold spells) and precipitation (e.g., extreme rainfall, prolonged droughts). As other examples, Climdex provides historical data on these indexes for >32,000 weather stations across the globe, SPEI/SPI provides drought indices, IBtRACS provides data for global tropical storm tracks, intensity, duration, CMIP6 datasets, and FFDI/FWI provides forest fire Indices.

The server 100 can be used for different types of risk factors.

The server 100 uses a machine learning pipeline 160 and structured expert pipeline 170 to link the computer models to macro financial variables to encode a relationship between risk shocks and financial impact.

The server 100 uses machine learning pipeline 160 to extract data elements from different sources to populate the data sets at memory 110. The server 100 uses structured expert pipeline 170 to extract data elements from expert sources to populate the data sets at memory 110. The server 100 defines economic or financial macro factors or variables, and stores values for the financial macro factors or variables at memory 110. The system 100 use macro-economic modelling to generate values for the macro factors or variables. The system 100 translates the macro factors or variables to micro factors for client profiles and portfolios. The server generates the scenario sets and computes values using data at memory 110.

For example, the server 100 uses machine learning pipeline 160 to extract climate data elements from different sources to populate the climate data sets at memory 110. The server 100 uses structured expert pipeline 170 to extract climate data elements from expert sources to populate the climate data sets at memory 110. The server 100 defines economic or financial macro factors or variables, and stores values for the financial macro factors or variables at memory 110. The server generates the climate scenario sets and computes climate risk values using data at memory 110.

The server 100 uses machine learning pipeline 160 for text mining of articles. The server 100 can have article keywords to capture different ways that risk factors are described as in the literature. This can be done by processing articles and recording all the ways that a given risk stressor is mentioned. The machine learning pipeline 160 can implement term frequency-inverse document frequency (Tf-Idf) to automatically extract relevant keywords for the various risk factors. The machine learning pipeline 160 can optimise the Named Entity Recognition pipeline of the NLP pipeline 165. The server 100 speeds up the annotation process to cover different types of risk factors.

For example, the server 100 can have ~250,000 article keywords to capture different ways that climate risk factors are described as in the literature. This can be done by processing articles and recording all the ways that a given climate stressor is mentioned (e.g., global warming, temperature increase, heat wave, extreme temperature, etc.). The machine learning pipeline 160 can implement term frequency-inverse document frequency (Tf-Idf) to automatically extract relevant keywords for the various climate risk factors (e.g., sea level rise, ocean acidification, drought, etc.). The machine learning pipeline 160 can optimise the Named Entity Recognition pipeline of the NLP pipeline 165.

The server 100 encodes a relationship between risk shocks and financial impact using data from the machine learning pipeline 160 and structured expert pipeline 170 to link the computer risk model to macro financial variables. The interface 140 can also be used to collect expert data for the structured expert pipeline 170. The server 100 can compute probability distributions from expert data captured using interface 140 to populate the nodes of the causal graphs for risk factors.

Figure 3:
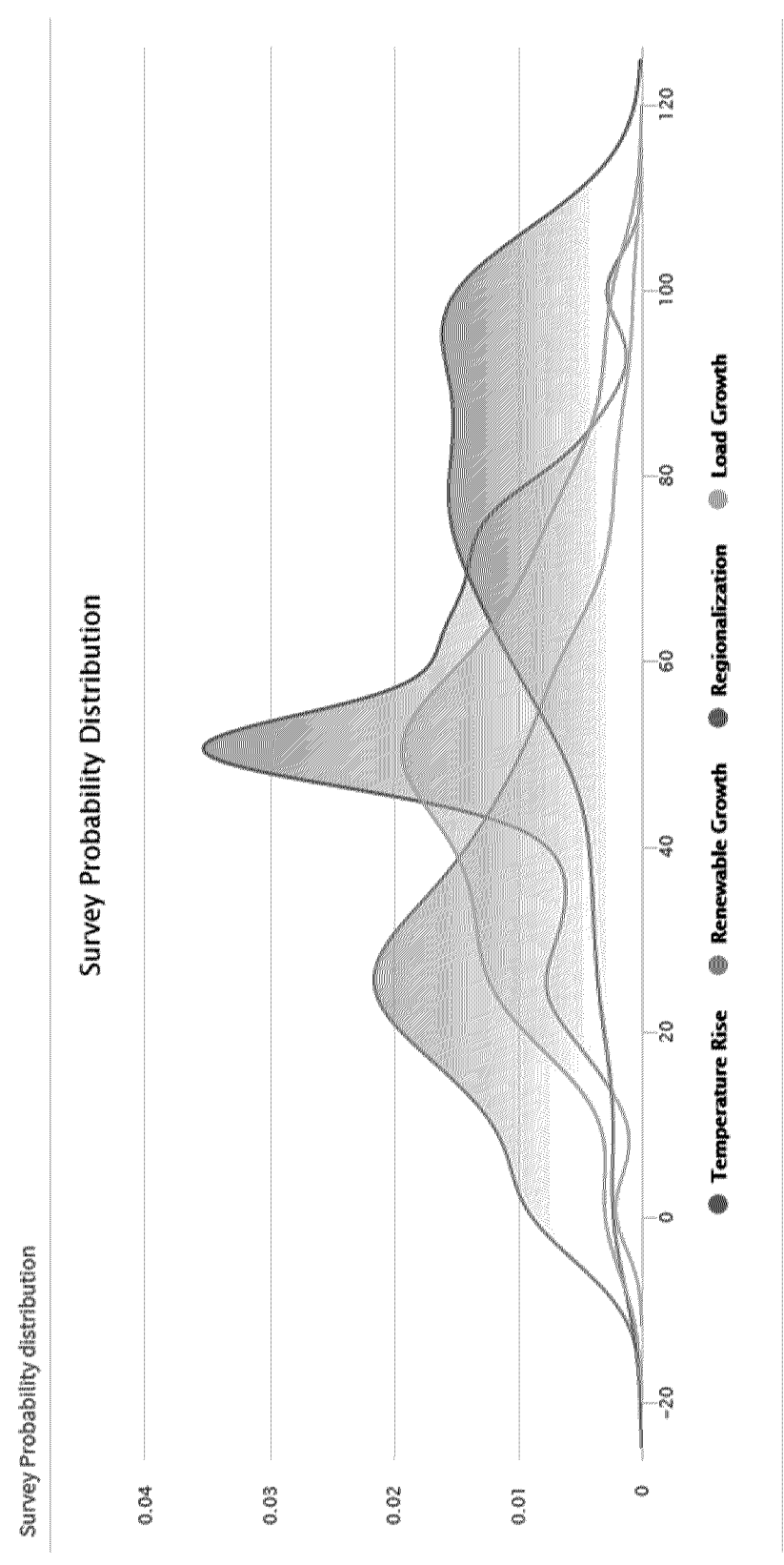
FIG. 3 is a graph of distributions for data collected by the structured expert judgement system.

FIG. 3 is a graph of distributions for data collected by the structured expert pipeline 170. The graph shows probability distributions from data captured using survey fields of interface 140. The server 100 can compute the frequency distribution of possible values for the risk factors captured by the interface 140 and structured expert pipeline 170. The values captured by the interface 140 can map to different points in time to add time to the values of the nodes. The structured expert pipeline 170 collects input data as estimates of future uncertainty for individual risk factors. For example, the structured expert pipeline 170 can use interface 140 to poll for estimates of future uncertainty for individual risk factors.

The server 100 can also generate estimates of future uncertainty for individual risk factors using the machine learning pipeline 160. The server 100 uses the machine learning pipeline 160 to process data sources to generate expected values for the risk factors. The server 100 derives these data values by examining the latest trusted scientific data sources and other data on these factors using machine learning. The server 100 uses the machine learning pipeline 160 for automated extraction of risk data from scientific journals. For example, on the climate risk factor 'Sea Level Rise', the machine learning system 160 can process 25,000 documents for data extraction.

The server 100 represents estimates of future uncertainty for individual risk factors by its distribution of possible values collected by the machine learning pipeline 160 and structured expert pipeline 170. The server 100 uses the distributions to compute values for the nodes of risk factors for some future point in time. The server 100 collects data that embodies the full range of uncertainty in the factors. The server computes scenarios on combinations of related risk factors, or any other radically uncertain variables using individual distributions of possible values for each of the factors at some future point in time (the time horizon).

The server 100 uses the structured expert pipeline 170 to link the computer risk model to macro financial variables to encode a relationship between risk shocks and financial impact.

The server 100 uses the structured expert pipeline 170 to collect data representing the collective wisdom of a large group of experts. The server 100 can collect extreme values as estimations as discrete sets of possible scenarios for combinations of factors. The server 100 uses the structured expert pipeline 170 to obtain distributions of possible outcomes that can span the range of possible values for the risk factors. The distributions can provide estimates for the possible range of upside and downside movements in the risk factors and likelihood of occurrence of the upside and downside range.

The server 100 can combine the data in the forward distributions with scenario trees to get both scenarios for the combinations of factors as well as estimates of the likelihood of these scenarios occurring. The values for the up and down ranges and the likelihoods of the up and down movements are used by the server 100 to complete the data required to evaluate the tree. The extremes and odd combinations span the range of possible outcomes for the scenario space. The server 100 can use the collected data to identify extreme values. The server 100 can estimate the unknown future values periodically and continuously.

The server 100 can represent a spanning set of scenarios of risk factors as different causal graphs of nodes. The ordering of the nodes in the tree can map to dependencies between factors. For example, the server 100 can represent a spanning set of scenarios of risk factors as a tree of nodes with each factor exhibiting states with corresponding probabilities. The server 100 computes the forward distribution of each climate risk factor at the time horizon for a spanning set of scenarios of risk factors.

The server 100 can automatically generate scenario sets by identifying macro factors and generating a scenario tree for the factors. The server 100 can generate forward distributions for each factor at the time horizon. The server 100 can identify the extreme values and the corresponding likelihoods for each factor. A scenario is a path in the scenario tree, its likelihood is the product of the likelihoods along the path and the value associated with the scenario is the sum of the values along the path.

The server 100 can continuously collect expert data using the structured expert pipeline 170. There can be a large number of expert engagements over days, weeks, months to continuously provide expert data to compute values for the distributions. The server 100 can represent the uncertainty at a node by a frequency distribution of possible values that factor might assume in the future. The graph represents the possible range of values captured by interface 140 of user device 130, and their frequencies. The server 100 can focus on the extremes of these distributions and the weight of the distribution above and below the commonly accepted values to generate quantitative values for nodes of the tree and likelihoods for these scenarios. The server 100 can generate reports, such as the best and worst-case scenarios in the scenario set that it generates. The data can be stored in a nested hierarchical database. New data is appended to the hierarchy and timestamped. The server 100 can traverse the database in both directions pulling data points for various points in time. The default is to always reference the latest time stamped data point in some examples.

In some embodiments, the hardware processor 102 populates the causal graph of nodes using extremes of the distributions and a weight of the distributions above and below accepted values. The distributions are derived from different sources. Examples include: numerical model outputs, NLP of scientific literature and structured expert judgement (SEJ). The server 100 can use different sources and combinations of sources. They are also hierarchical with model output being the baseline data that is refined by the NLP and SEJ.

| Climate Regions | Code_name | Code |
|---|---|---|
| Alaska/N.W. Canada | ALA | ICR0001 |
| Amazon | AMZ | ICR0002 |
| Central America/Mexico | CAM | ICR0003 |
| small islands regions Caribbean | CAR | ICR0004 |
| Central Asia | CAS | ICR0005 |
| Central Europe | CEU | ICR0006 |
| Canada/Greenland/Iceland | CGI | ICR0007 |
| Central North America | CNA | ICR0008 |
| East Africa | EAF | ICR0009 |
| East Asia | EAS | ICR0010 |
| East North America | ENA | ICR0011 |
| South Europe/Mediterranean | MED | ICR0012 |
| North Asia | NAS | ICR0013 |
| North Australia | NAU | ICR0014 |
| North-East Brazil | NEB | ICR0015 |
| North Europe | NEU | ICR0016 |
| Southern Africa | SAF | ICR0017 |
| Sahara | SAH | ICR0018 |

-continued

| Climate Regions | Code_name | Code |
|---|---|---|
| South Asia | SAS | ICR0019 |
| South Australia/New Zealand | SAU | ICR0020 |
| Southeast Asia | SEA | ICR0021 |
| Southeastern South America | SSA | ICR0022 |
| Tibetan Plateau | TIB | ICR0023 |
| West Africa | WAF | ICR0024 |
| West Asia | WAS | ICR0025 |
| West North America | WNA | ICR0026 |
| West Coast South America | WSA | ICR0027 |
| Antarctica | ANT | ICR0028 |
| Arctic | ARC | ICR0029 |
| Pacific Islands region | NTP | ICR0030 |
| Southern Topical Pacific | STP | ICR0031 |
| Pacific Islands region | ETP | ICR0032 |
| West Indian Ocean | WIO | ICR0033 |

| Climate Modulators | Code_name | Code |
|---|---|---|
| Indian Ocean Dipole | IOD | C0000001 |
| Atlantic Nino pattern | AN | C0000002 |
| Southern Annular Mode | SAM | C0000003 |
| Indian Ocean Basin pattern | IOB | C0000004 |
| El Nino/Southern Oscillation | ENSO | C0000005 |
| Interdecadal pacific Oscillation | IPO | C0000006 |
| Madden-Julian Oscillation | MJO | C0000007 |
| Pacific Decadal Oscillation | PDO | C0000008 |
| Northern Pacifc Oscillation | NPO | C0000009 |
| Tropospheric Biennial Oscillation | TBO | C0000010 |
| Pacific North America pattern | PNA | C0000011 |
| Pacific South America pattern | PSA | C0000012 |
| North Atlantic Oscillation | NAO | C0000013 |
| Northern Annular Mode | NAM | C0000014 |
| Atlantic Meridional Mode | AMM | C0000015 |
| Atlantic Multidecadal Oscillation | AMO | C0000016 |
| Quasi-Biennial Oscillation | QBO | C0000017 |
| Monsoon | Mn | C0000018 |

| Chronic Climate Risk | Code_name | Code |
|---|---|---|
| Sea level rise | SLR | RFC10001 |
| Ocean acidification | Oa | RFC10002 |
| Glacier melt & instability | IGm | RFC10003 |
| Ice sheet melt & instability | ISm | RFC10004 |
| Permafrost melt | Pm | RFC10005 |
| Land degradation | Lnd | RFC10006 |
| Carbon emissions | Ce | RFC10007 |
| Mean Temperature | Mt | RFC10008 |
| Precipitation pattern changes | Ppc | RFC10009 |
| Ecotone migration | Ecm | RFC10010 |

| Acute Climate Risk | Code_name | Code |
|---|---|---|
| Drought | Dt | RFP10002 |
| Wildfire | Wf | RFP10003 |
| Heat Stress | Hs | RFP10004 |
| Water Stress | Ws | RFP10005 |
| Cold Stress | Cs | RFP10006 |
| Extreme precipitation | Exp | RFP10007 |
| Extreme wind | Exw | RFP10008 |
| Cyclone/Hurricanes/Typhoons | CHT | RFP10009 |
| Storm surge | Ss | RFP10010 |
| Fluvial flood | Ff | RFP10011 |
| Pluvial flood | Pf | RFP10012 |
| Hail | Hl | RFP10013 |
| Lightning | Ln | RFP10014 |
| Marine heatwave | Mh | RFP10015 |
| Tornadoes | Tx | RFP10016 |
| Slope instability | Si | RFP10017 |

-continued

| Acute Climate Risk | Code_name | Code |
|---|---|---|
| Glacial Lake Outburst | GLO | RFP10018 |
| Sand/Dust Storms | SDS | RFP10019 |
| Coral bleaching | Crb | RFP10020 |

Figure 4:
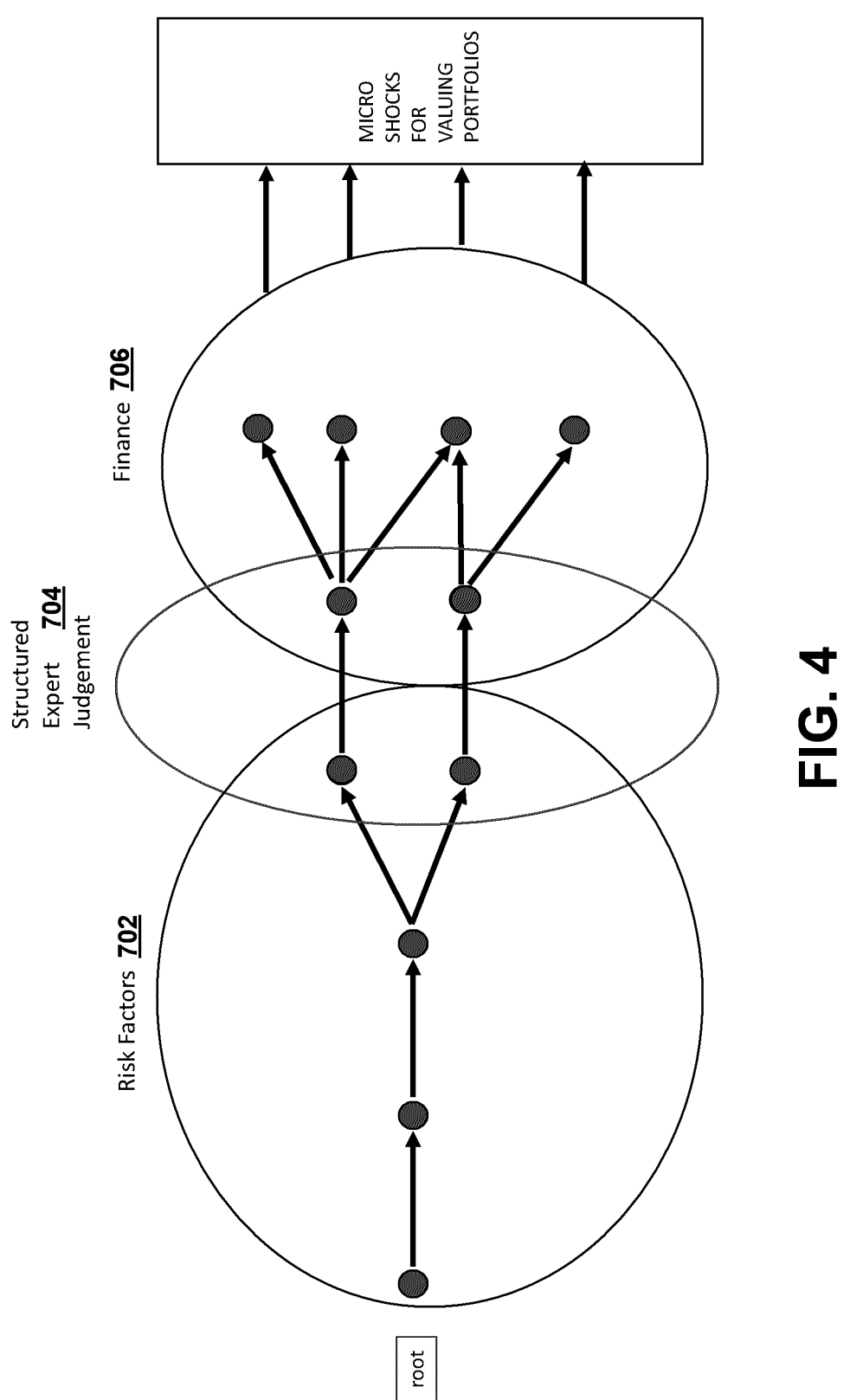
FIG. 4 is a diagram of the expert system and scenario sets for the valuation engine.

FIG. 4 is a diagram of the expert system (structure expert judgement system 704 in this example), risk factors 702, scenario sets, and financial variables 706 for valuation engine. The structured expert judgement system 704 links the computer models (risk factors 702) to macro financial variables to encode the financial variables 706 as a relationship between risk shocks and financial impact. The scenario sets include values for risk factors and macro financial variables 706. The server 100 can link risk scenarios to financial impacts to generate values for portfolios or institutions.

The processor 120 transmits the multifactor scenario sets to a valuation engine to provide a causal map of risk factors to micro shocks for the valuation engine to translate the macro financial variables to micro shocks and output portfolio reports. In some embodiments, the server 100 connects to a computer device 130 via a network 150 to generate updated visual elements at the interface 140 based on the valuation engine results.

For example, The server 100 can encode the relationship between climate shocks and their corresponding financial impacts. For example, how do drought and high temperatures in Australia affect the AUS dollar and interest rates. The structured expert pipeline 170 can collect this information at interface 140. The interface 140 can prompt Australian traders, economists and policy makers for input data on how a drought might affect macro financial factors in Australia such as AUS GDP, the Aussie dollar, Interest rates, and so on. This data can give the server 100 input to compute the uncertainty distributions to populate node values. The server 100 can translate macro financial variables to micro shocks for different client profiles and portfolios.

The server 100 computes the full causal map between carbon emission regimes and impact on specific portfolios. From this causal map, the server 100 can generate a scenario tree (graph) and compute uncertainty distributions on all the risk factors involved. This is how server 100 computes multifactor scenarios for the future that link climate and financial impacts. In this example of FIG. 7, there is shown a transition scenario corresponding to the IPCC regime of RCP8.5. as the root. This is how the server 100 can link Transition and Physical risk in a consistent manner (TCFD).

Figure 5:
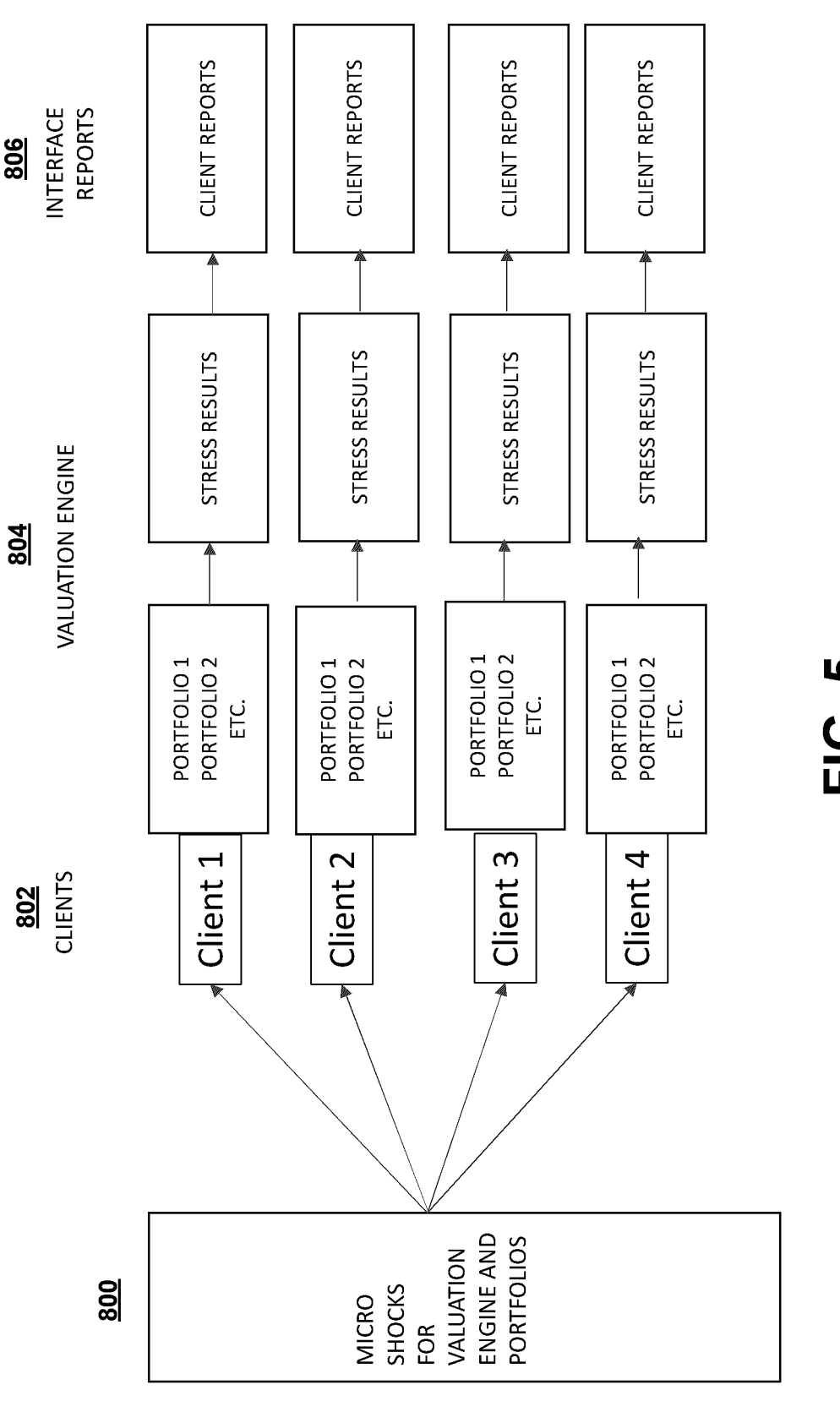
FIG. 5 is a diagram of the valuation engine and reports for interface.

FIG. 5 is a diagram of valuation engine 804 and report generation 806 for interface 140. The server 100 can connect with the valuation engine 804 to use output data 800 of the multifactor scenario sets to connect with client computer systems 802 to generate client output and portfolio valuations. The interface 140 can be used for different client profiles. The output results can include stress results and client reports for the scenario sets with climate risk factors, financial macro variables and micro shocks.

The server 100 can apply the micro shocks of the output data 800 to all the portfolios managed by a fund, for example. Different subsets of micro shocks might apply to each portfolio. The valuation can be done for every scenario on every portfolio. One set of micro stress shocks can be valid for all portfolios. This high level of consistency allows for the creation of benchmark output results. An example client can see how each and every portfolio will compare to the average of exposure by other groups.

Figure 6:
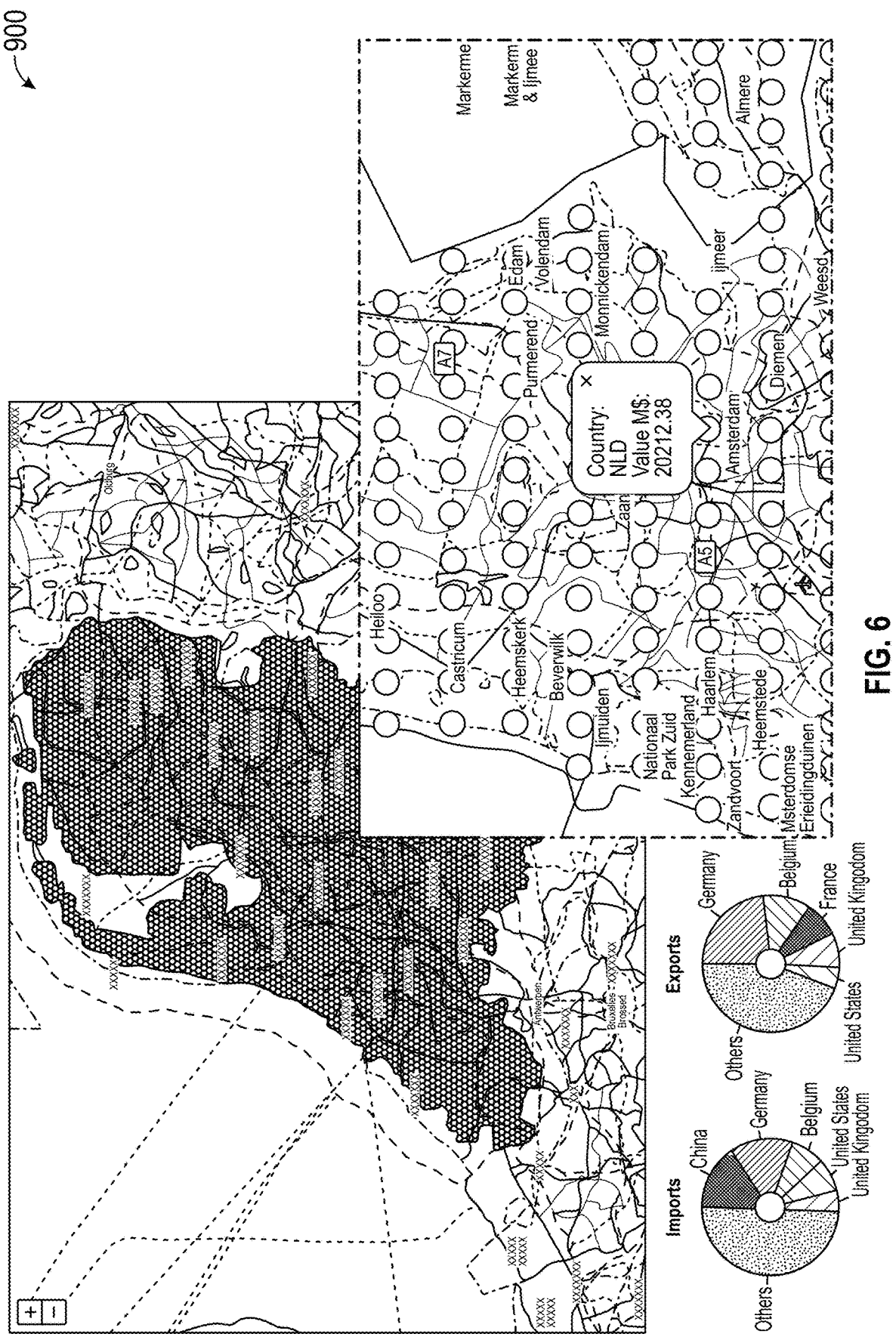
FIG. 6 is an example display of visual elements for an interface.

FIG. 6 is an example display of visual elements for an interface 140 of user device 130 that interacts with server 100 to generate updates for the visual elements using climate models and scenario data as an illustrative example.

The example interface 140 shows visual elements mapping to economic risk. The visual elements can depict physical assets at risk (GAR 2015 economic exposure). The interface 140 can show different classifications of risk. The visual elements can depict portfolio risk, sector risk (industrials, energy, materials), and sector trade between nations (China for materials, Netherlands for industrials), for example. The server 100 can map climate risk values to economic risk. The interface 140 can: indicate georeferenced physical risk; identify risk profile to assets, sectors, supply chains; and identify transition risk factors (i.e. geopolitical instability, policy changes, regulation, social license to operate).

The server 100 uses the components 1000 to systematize the generation of scenarios so the scenario sets can be generated automatically without prior assumptions on underlying probability distributions. The server 100 can receive future macro events as input data to trigger a request for forward-looking generation of spanning scenario sets to populate the front-end interface 140. The worst and best scenarios are included in the generated set. The server 100 can minimize bias introduced by human input.

Figure 7:
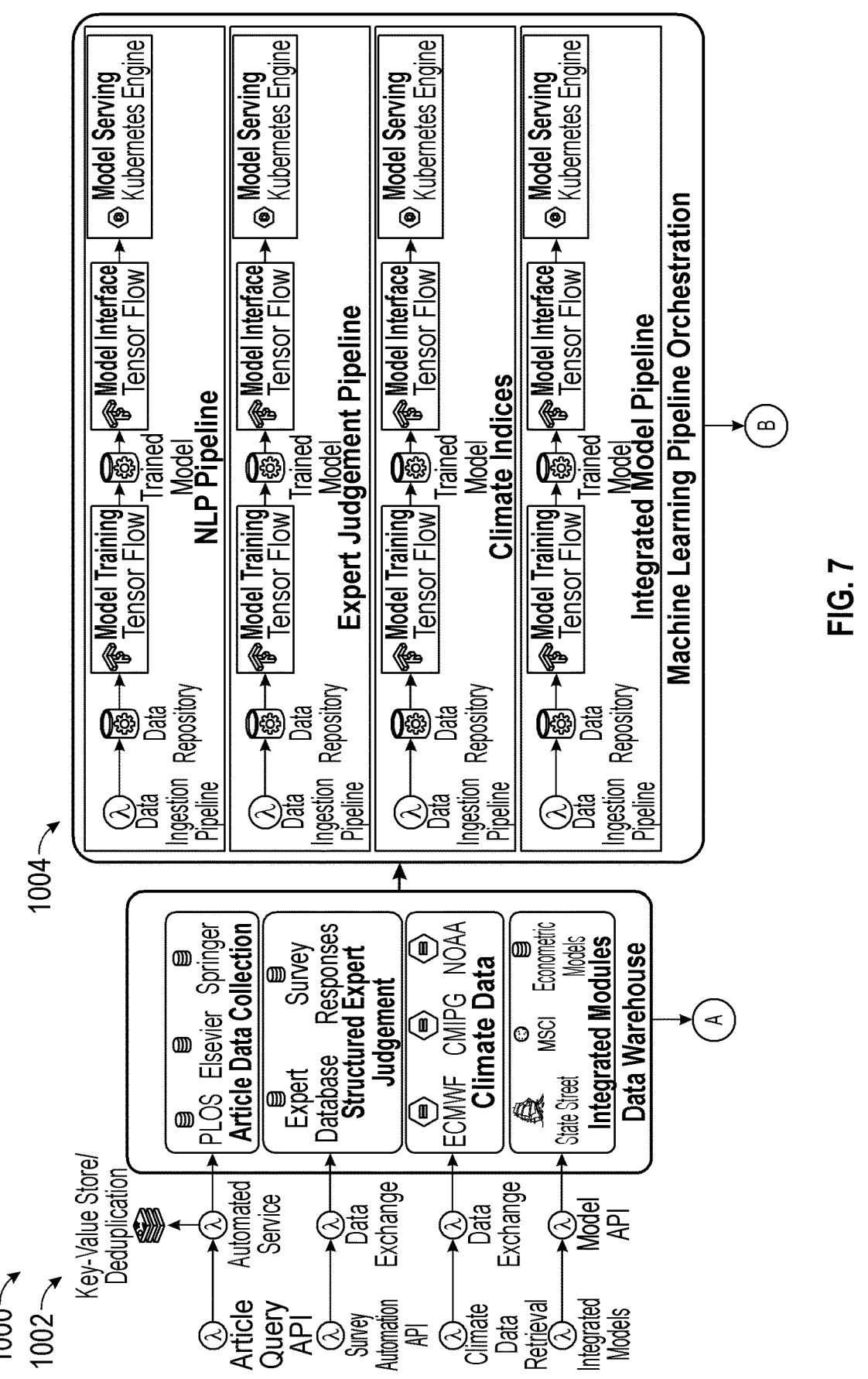
FIG. 7 is a data flow diagram showing data exchange between different hardware components of server.
Figure 7:
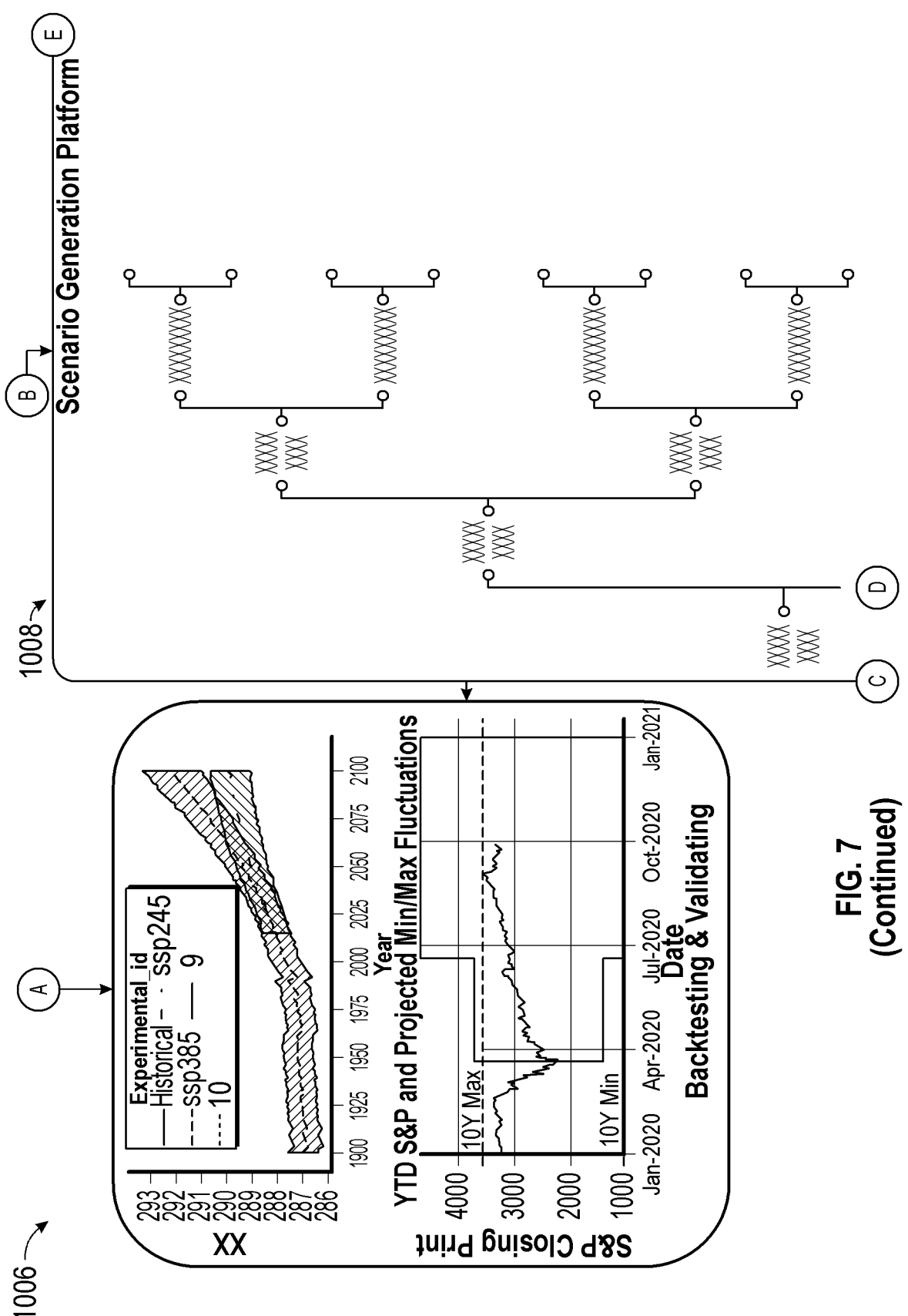
Figure 7:
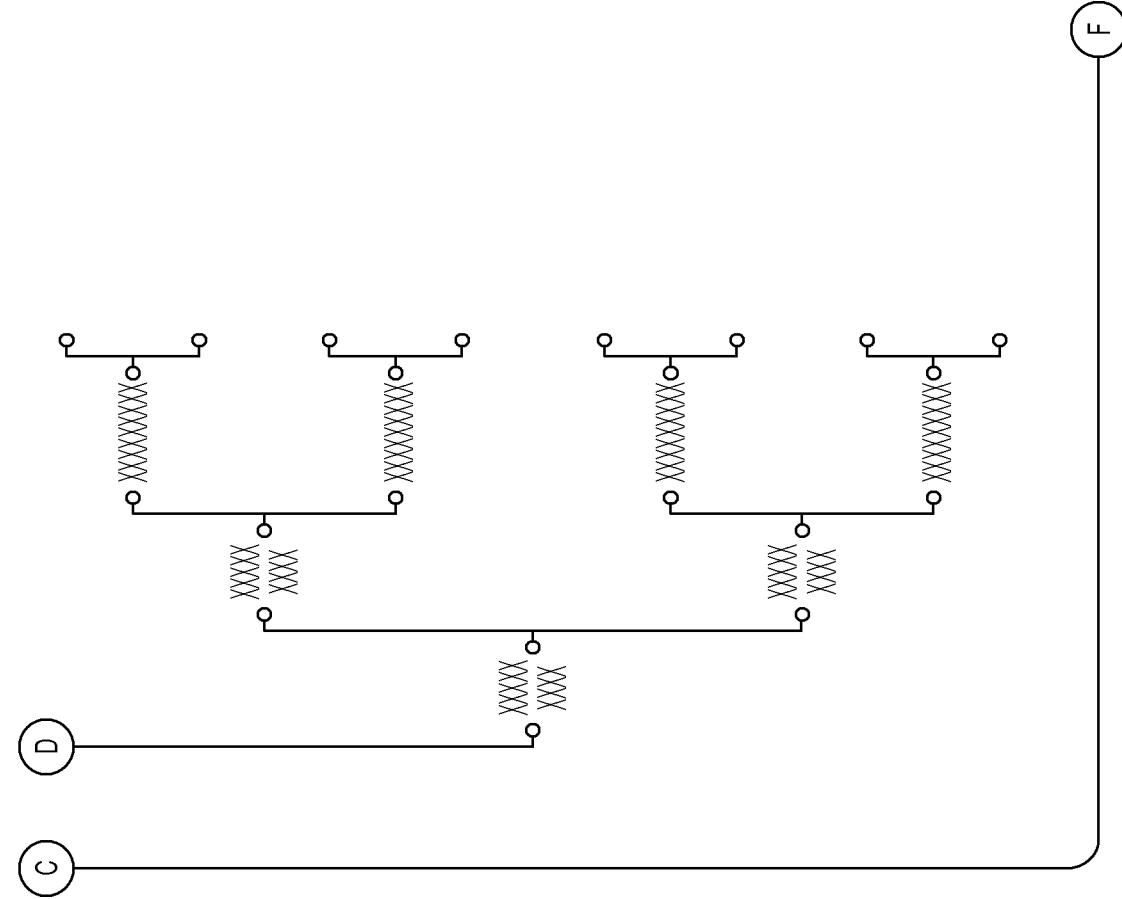
Figure 7:
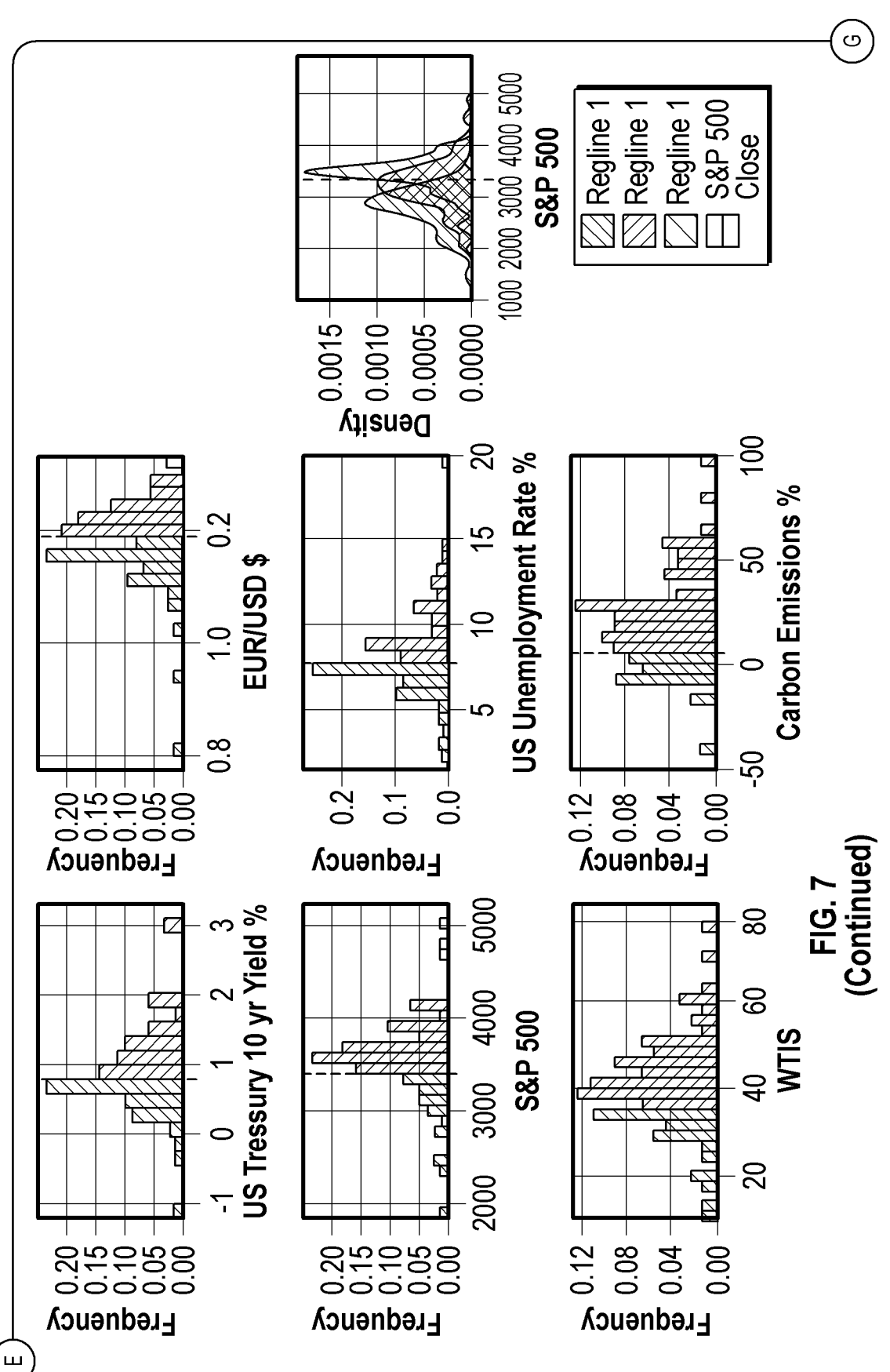

FIG. 7 is a data flow diagram showing data exchange between different hardware components 1000 of server 100. The example components 1000 include a data warehouse 1002, machine learning pipeline orchestration 1004, scenario generation platform 1008, and back-testing and validation system 1006. The hardware components 1000 exchange data using an API and populate the front-end interface 140 to update its visual elements.

Figure 7A:
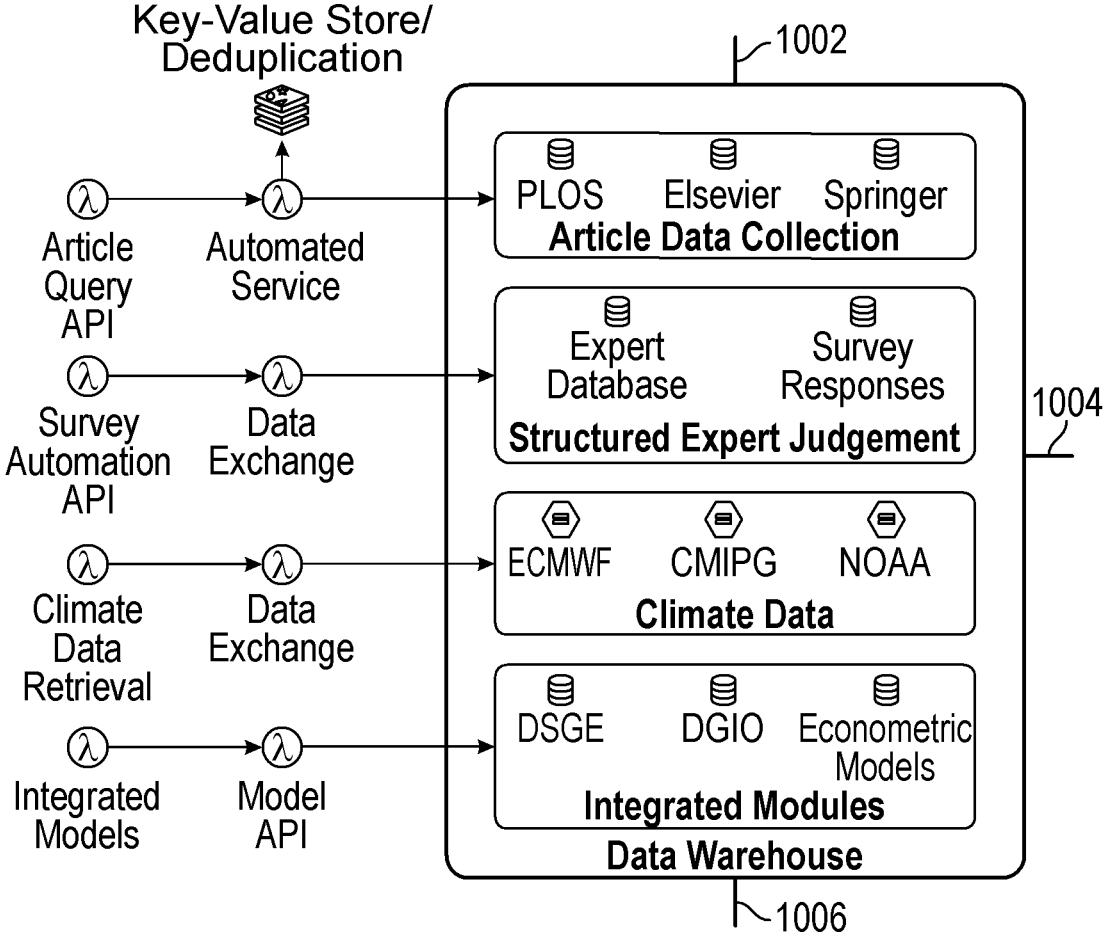
FIG. 7A shows an example data warehouse.

FIG. 7A shows the data warehouse 1002 with article data collection, structured expert judgement data, climate data and integrated models. The data warehouse 1002 with article data collection receives input from article query API and an automated service (for key value store and deduplication) to populate data sets. The data warehouse 1002 with structured expert judgement data receives input from survey automation API and data exchange services to populate data sets for expert database and survey response data. The data warehouse 1002 with climate data receives input from climate data retrieval and data exchange services to populate climate data sets. The data warehouse 1002 with integrated models receives input from model API and model services to populate climate data sets. The data warehouse 1002 exchanges data with the machine learning pipeline orchestration 1004 and the back-testing and validation system 1006 to update the interface 140 at client device 130.

Figure 7B:
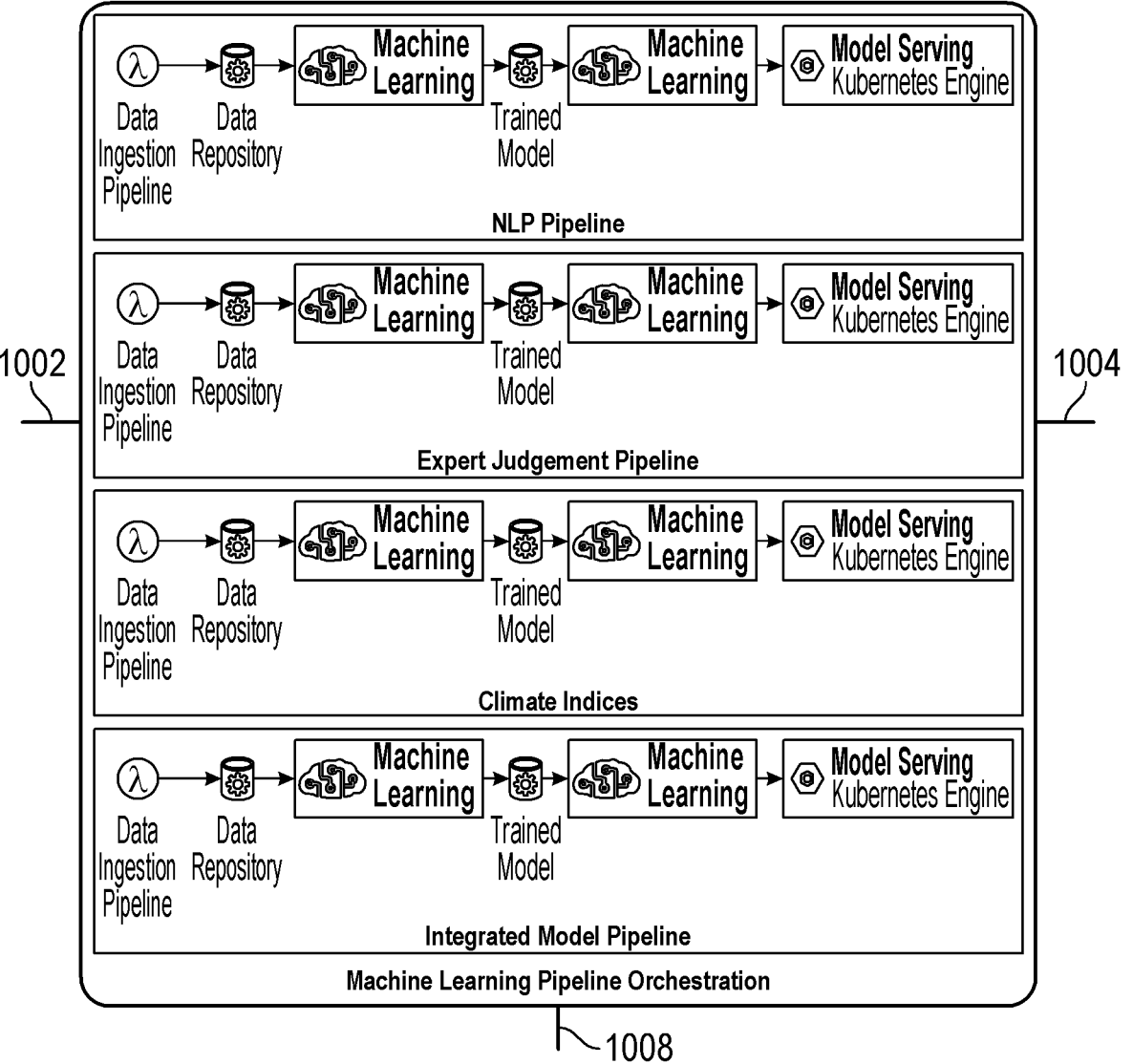
FIG. 7B shows an example machine learning pipeline orchestration component.

FIG. 7B shows the machine learning pipeline orchestration 1004 that can be used for the machine learning pipeline 160 of server 100, for example. For this example, the machine learning pipeline orchestration 1004 has an NLP pipeline 165, an expert judgement pipeline 170, climate indices 175, and an integrated model pipeline 185. Each pipeline can be implemented using a data ingestion pipeline, data repository, model training, trained models, model inference, and model serving. The machine learning pipeline orchestration 1004 exchanges data with the data warehouse 1002 and scenario generation platform 1008 to update the interface 140 at client device 130.

The machine learning pipeline orchestration 1004 has a natural language processing (NLP) pipeline 165, structured expert pipeline 170, indices 175 (e.g., climate indices), and an integrated model pipeline 185 to generate an ontology of risk from unstructured data and a knowledge graph with an accessible data structure of data elements and connections between the data elements. The processor 120 can respond to queries using the knowledge graph. The processor 120 uses the NLP pipeline 165 to extract information from unstructured text, classify the risk, the multitude of dimensions that define the risk, quantify the interconnectedness of risk factors, and return a structured, codified and accessible data structure (knowledge graph) that can be queried by a client application (e.g. interface 140) via API gateway 230.

Further details of the NLP pipeline 165 are provided herein in relation to FIGS. 19 to 27.

Embodiments described herein provide an ontology of climate related risk as a knowledge graph by extracting data from unstructured text. For example, the graph can be constructed from unstructured text in a large number of publications. The knowledge graph can be used to query and aggregate the impact, cost, magnitude and frequency of risk for different geographic locations in the world. The graph provides a historical view of data, a (near) present view of data, and a forward looking view of data. For example, the forward projections can be conditioned by a climate and economic scenario (e.g., transition scenario). To construct this knowledge graph, the server 100 uses a NLP pipeline 165 to extract information from unstructured text, classify the risk, the multitude of dimensions that define a risk, quantify the interconnectedness of risk factors, and return a structured, codified and accessible data structure that can be queried by a client application. The server 100 enables large-scale information extraction and classification of climate related risk.

The NLP pipeline 165 implements keyword extraction. The NLP pipeline 165 extracts relevant keywords from large amounts of text (e.g. scientific journal articles) by combining climate, economic, and financial domain knowledge from the structured expert pipeline 170 with NLP tools and big data analytics. For example, the NLP pipeline 165 can condense unstructured text from large amounts of articles into candidate words and phrases, which the structured expert pipeline 170 can refine to extract domain-specific keywords from. These keywords can be either single words or short phrases composed of consecutive words, which can be referred to as 'n-grams,' where n represents the word length.

The NLP pipeline 165 preprocesses the article data by removing punctuation, special characters, and common stop words. For example, NLP pipeline 165 preprocesses text data by removing common stop words including both English stop words from the nitk Python library stopwords.words( ) and the custom stop words listed in Table 6. Once preprocessed, the NLP pipeline 165 can lemmatize the article data by replacing each word with its basic syntactic form or lemma. Lemmatize can refer to process of sorting words by grouping variant forms of the same word. For each risk factor, the NLP pipeline 165 merges the relevant publications or articles into a single corpus. The NLP pipeline 165 compares the risk-specific corpus with a baseline corpus generated by merging up to a number (e.g., 4000) of randomly chosen articles from a pool or collection of queried publications, excluding those articles belonging to the corpus for the risk factor of interest. The NLP pipeline 165 then extracts a top number (e.g. 2000) of n-grams (n=1-5) using different ranking processes. For example, a ranking process can involve selecting a top number of n-grams with the highest pooled Term Frequency x Inverse Document Frequency (tf-idf) score to obtain the final n-grams for the risk factors.

Table 6 shows an example list of custom stop words:

| |
|---|
| aba |
| al |
| also |
| altimg |
| amazonaws |
| amsbsy |
| amsfonts |
| amsmath |
| amssymb |
| ax |
| co |
| com |
| content |
| de |
| documentclass |
| do |
| downsampled |
| east |
| et |
| et al |
| eu |
| fig |
| fx |
| gegin |
| gif |
| gr |
| grmzm |
| http |
| image |
| journal |
| jpeg |
| jpg |
| la |
| large |
| lrg |
| mathrsfs |
| new |
| oddsidemargin |
| org |
| pdf |
| pdty |
| pii |
| png |
| previously |
| prod |
| pt |
| qtl |
| result |
| rm |
| sci |
| setlength |
| show |
| shown |
| si |
| sml |
| spi |
| store |
| stripin |
| study |
| svg |
| thumbnail |
| ucs |
| upgreek |
| usepackage |
| using |
| wasysym |
| west |
| xml |
| yes |

The NLP pipeline 165 implements text network analysis. For example, the NLP pipeline 165 can employ a textnet method that enables relational analysis of meanings in text to explore the network structure between risk factors based on their shared keywords and phrases. This method enables relational analysis of meanings in text, which uses NLP and graph theory to detect communities in bipartite networks. A textnet represents a bipartite network of documents (i.e. risk factors) and terms (i.e. n-grams), for which links only exist between the two types of nodes (i.e. n-grams). The NLP pipeline 165 uses the tf-idf score to quantify the links between documents and terms to link risk factors to one another to create links between risk factors based on their shared use of n-grams.

For example, the NLP pipeline 165 can first process the queried articles to create a text corpus for each risk factor. A n-gram can only be considered as a potential link for a given risk factor if it meets the following conditions:

(i) the n-gram must occur at least once in every five articles that were queried for that risk factor (i.e., frequency per article (fpa)>=0.2) and (ii) the n-gram can have high relevance to at least one of the climate risk factors (i.e., the n-gram must be in the list of extracted keywords).

The NLP pipeline 165 extracts all n-grams (n=1~5), with a fpa>=0.2 from the processed text corpora for each risk factor (i.e. the first condition). The NLP pipeline 165 merges the extracted n-grams into a single list of relevant keywords, removing duplicates, and filtering out those not in the list of extracted keywords (i.e. the second condition). A frequency table (of both total frequency and fpa) of n-grams can be extracted for each of the risk factors. The n-grams in the table can be used for forming the connection and dependency between different risk factors as they may be relevant to more than one risk factor, the driver of the risk, the impact of the risk or connections between any or all of the above.

The NLP pipeline 165 creates a corpus and frequency tables for each risk factor, which represents the bipartite network of terms (n-grams) and documents (risk factors). The NLP pipeline 165 combines the n-grams into a series of repeating n-grams for each risk factor. For example, the repeating n-grams can be based on a repetition number of transformed fpa, which can be defined as the value of the original fpa multiplied by 10 and rounded to the nearest integer to eliminate the rare n-grams (e.g. fpa<0.5) and differentiate between low and high frequency n-grams. From this, a dataframe with columns can be created: a vector of risk factors and a vector of strings with repeating n-grams, where repetition numbers for each term can be proportional to their fpa in the original articles for the given risk factors The NLP pipeline 165 then converts this dataframe to a textnet corpus, from which textnets can be created to represent (i) the bipartite network of risk factors and keywords and (ii) the network of risk factors based on their shared keywords.

The n-grams are not only domain-relevant to that specific risk factor. Instead, these keywords and phrases might be relevant to more than one risk factor, the driver of the risk, the impact of the risk or even teleconnections between any or all of the above. Thus, the n-grams can be used to form the connection and dependency between different risk factors.

Figure 19:
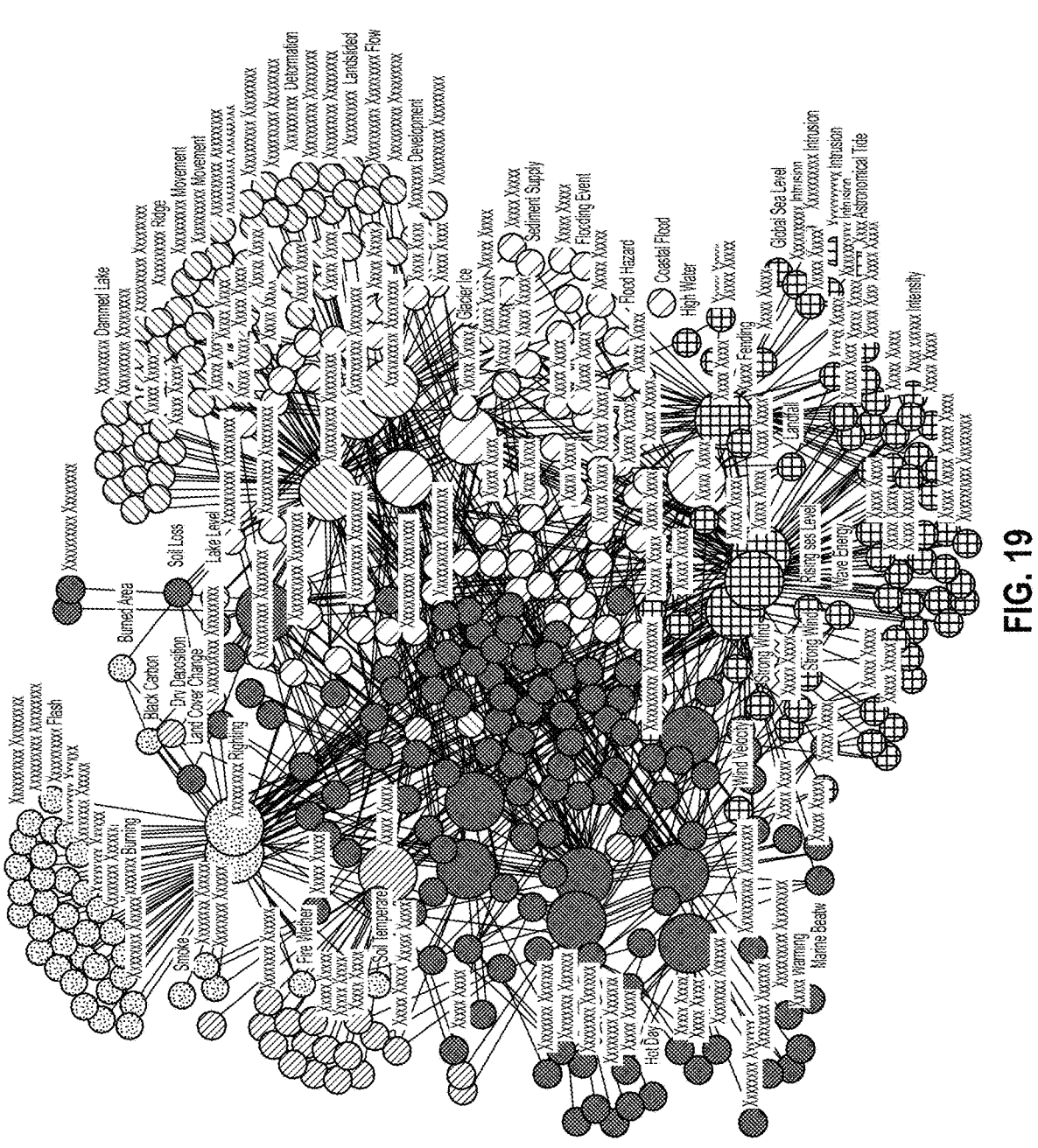
FIG. 19 is a view of an example interface with visual elements for risk factors and keywords identified through natural language processing and expert domain knowledge.

FIG. 19 is a view of an example network analysis interface with visual elements for risk factors and keywords identified through natural language processing and expert domain knowledge. In this example, the NLP pipeline 165 creates a textnet that links risk factors to keywords. The NLP pipeline 165 can tokenize the textnet corpus to handle individual words rather than phrases. Tokenization on phrases connected with "_" allows the NLP pipeline 165 to customize the keywords to the predetermined n-grams instead of using the default algorithm to search for n-grams.

The minimum number of documents can be specified to include all keywords. The network can be converted to an RF-KW network for a subset of risks specific to climate. As an illustrative example, the network can consist of 21 docs (the names of the risk factors), 394 terms (the number of keywords), and 1181 edges (the total number of links between risk factors and keywords). In FIG. 19, the large circles indicate climate risk factors and the small circles indicate keywords. Risk factors that are closely related to each other can be indicated using similar color and close proximity. Sublinear (logarithmic) scaling can be used for calculating tf-idf for edge weight.

FIG. 20 is a view of an example interface with visual elements representing a network of risk factors and keywords. In this example, the NLP pipeline 165 creates a textnet that links risk factors to one another, based on shared keywords. The minimum number of documents is specified (e.g. as a parameter configuration) such that each keyword was relevant to at least two risk factors (i.e. form at least one link in the network of risk factors). As an example, a resulting RF-RF network can consist of 21 docs (risk factors), 230 terms (keywords), and 1017 edges (links between risk factors and keywords). The NLP pipeline 165 can then project the bipartite network into a single-mode network of risk factors, connected through the keywords they share in common, where the edge weights between risk factors is the sum of the tf-idf for the overlapping keywords. In FIG. 20, the circles represent risk factors and line thickness represents strength of connections based on common keywords. By extracting strong connections, the overall network structure of how risk factors are related to one another is formed by the NLP pipeline 165 by extracting strong connections and formed clusters (e.g. related to increasing temperature, related to flooding, related in storms).

The NLP pipeline 165 extracts keywords that can partially show that various climate risk factors are connected to one another by common climate drivers and impacts. Many keywords are shared by several risk factors, which forms the links of a network of risk factors.

FIG. 21 is a view of an example process for NLP pipeline 165. The example components of the process for the NLP pipeline 165 shown are Sentence Boundary Detection (SBD), Part of Speech (POS) tagging, Dependency Parsing (DP), Named Entity Recognition (NER), Relation Extraction (RE), and Entity Linking (EL). This example pipeline process can be applied and expanded on any risk factors. The server 100 can respond to queries using the example pipeline process for different risk factors.

Risk-specific queries can be defined and used by the server 100 to extract raw texts from relevant publications. Following a preprocessing stage by the server 100, a custom tokenizer can slice the sentence strings into the smallest working unit of a list of tokens. The machine learning pipeline 160 can have a machine-learning (ML) sentence boundary detector (SBD) to slice the list of tokens into multiple lists, where each list represents a sentence. For each sentence, the NLP pipeline 165 predicts the part-of-speech tag (POS tag), dependency structure, and named entity for each token within the sentence. The NLP pipeline 165 uses a hybrid approach, referred to as Pattern Matching and Classification, to classify the preliminary relationship between different entities among the predefined set. After the NLP pipeline 165 filters out the irrelevant sentences, the server 100 uploads the extracted information (i.e. entities, POS tag, lemma, relationship, sentence, doc ID, metadata, etc.) to the graph database stored in the non-transitory memory 110.

The server 100 defines a query to traverse the knowledge graph (stored in memory 110) in an order based on a set of grammatical rules, for example, such that the query will only return entities associated with the value of interest. The results are collected and normalized through entity linking to resolve polysemy and synonym. The server 100 uploads the normalized results to memory 110 or gateway 230 (for data exchange). The results can be made available to clients directly through the interface 140 at client device 130 and via secure API gateway 230.

The NLP pipeline 165 implements preprocessing. After converting publications and articles to plaint texts, the NLP pipeline 165 removes URLs, special characters, headers, footnotes, style strings, and redundant whitespaces and replaces the missing characters with context-specific place-holders. The NLP pipeline 165 can replace derived or foreign characters with their English base characters, for example. The NLP pipeline 165 preprocessor is based on regular expression to detect these patterns to replace or remove the unwanted match results. The NLP pipeline 165 preprocessor can recognize reference during the process, which may be temporarily removed to improve the performance of the dependency parser (DP).

The NLP pipeline 165 implements a tokenizer. The NLP pipeline 165 tokenizer is modified from spaCy's tokenizer by adding more symbols into infixes (i.e. token delimiters), and re-tokenizing (splitting or merging) specific subsets of tokens that match predefined patterns to tune the granularity for further components processing.

FIG. 22 is a view of an example of tokenization and illustrates tokens of the tokenizer after processing raw text. The output is generated by server 100 by transforming text data received as input. The server 100 generates symbols for the data structures.

The NLP pipeline 165 implements sentence boundary detection (SBD). The NLP pipeline 165 SBD component can be from libraries based on the bidirectional long short-term memory neural network (Bi-LSTM) from the Universal Dependencies project, for example. The NLP pipeline 165 SBD outputs can be configured in CONLL-U format, which are parsed into a list of sentences by an example package—conllu.

The NLP pipeline 165 implements Part-of-speech tagging (POS tagging) or grammatical tagging, which classifies each token into a single grammatical form (e.g. Noun, Verb, Adjective, etc.) based on its meaning and context. The NLP pipeline 165 POS tagging consists of a linear layer with a softmax activation function on top of the token-to-vector layer from a transformer-based (RoBERTa) model trained on OntoNotes 5, a large scale dataset. The NLP pipeline 165 POS tagging accuracy rate can be tracked and validated. The list of all possible grammatical forms for the NLP pipeline 165 POS tagging is defined in Universal Dependencies (UD).

The NLP pipeline 165 implements a dependency parser, which takes a single sentence as input and uses rule-based or machine learning techniques to generate the directional grammatical tree for the sentence. The NLP pipeline 165 dependency parser recognizes each directional arc in a parse tree as a dependency relationship from its head (parent) to its target (child). The NLP pipeline 165 dependency can extract relations from the texts based on this dependency structure.

Figure 23:
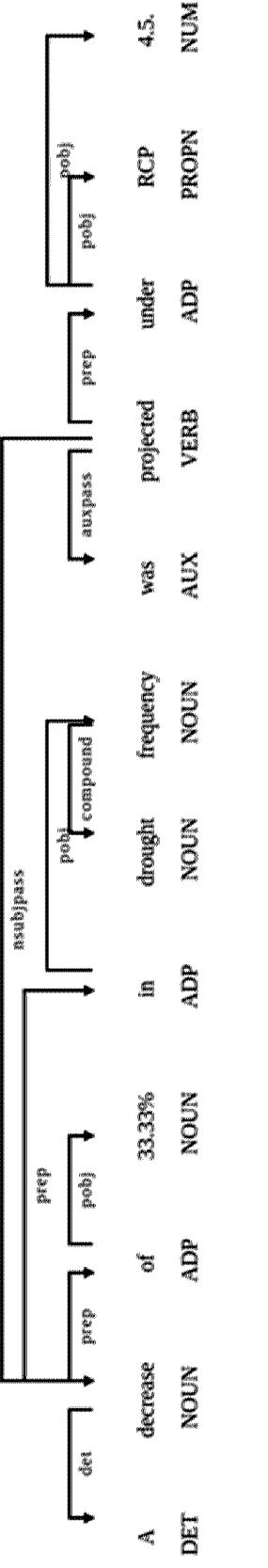
FIG. 23 is a view of an example of parts of speech tagging.

FIG. 23 is a view of an example of parts of speech tagging and dependency parsing. In this example sentence, the token 'a' is dependent on the token 'decrease' via the determiner (det) relationship. All tokens have a parent, except the root token. For example, the verb 'projected' is the root token of this sentence.

The NLP pipeline 165 implements Named Entity Recognition (NER), locating and classifying named entities in unstructured texts. The NLP pipeline 165 named entity recognizer can be implemented as a hybrid of the collection of pattern rules and pre-trained machine learning models to increase recall rate of the NER task. For example, the default spaCy's NER or the DeepPavlov's NER can be used as the first component of the NER system, and re-examine the texts with the predefined pattern rules to capture missing named entities.

Figure 24:
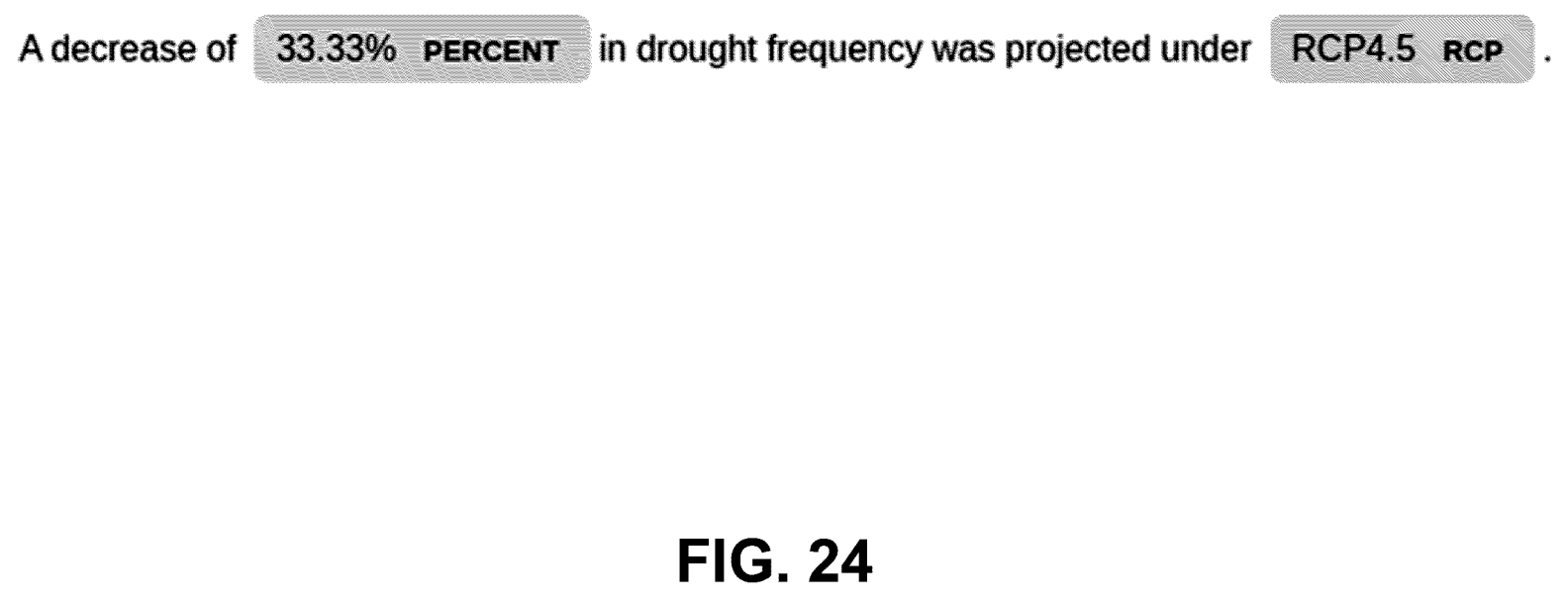

FIG. 24 is a view of an example of named entities within a sentence. In this example sentence, the NLP pipeline 165 named entity recognizer detected the boundaries of '33.33%' and 'RCP4.5' and classified them correctly to their entity types.

Table 7 shows the list of important entity types. The DIMENSION entities are the collection of keywords that users might be interested in, and the MENTION entities are the risk-specific keywords selected by the structured expert pipeline 170 from the list generated from the NLP pipeline 165 keyword extraction algorithm.

| Name | Example |
|------|---------|
| VALUE | 2.3 cm, 9.6 ha, 3° C., two inches, . . . |
| COST | $100,000, US $9999, 3000 dollars, . . . |
| TEMPORAL | 2050, industry revolution, January, 4 months, . . . |
| SPATIAL | Vancouver, Europe, South Asia, . . . |
| SCENARIO | IPCC A1R, RCP4.5, 2° C. world, . . . |
| DIMENSION | Death, loss, temperature, trend, anomaly, number, . . . |
| MENTION | Heat, heatwave, drought, hot, overheating, warming, . . . |
| RELATION | POS: increase, rise, positive, . . . |
| | NEG: decrease, drop, . . . |
| | NEU: define, occur, show, affect, . . . |
| | CMP: more, less, . . . |

For some tokens that cannot fully convey their meanings without their neighbors, the NLP pipeline 165 utilizes syntactic parsing and POS tagging to recognize the meaning of the tokens. For example, 'the number of deaths increased 123 in a week' will be expressed as the list of tokens, ["the", "number", "of", "deaths", "increases", "123", "in", "a", "week"]. The NLP pipeline 165 may only capture ["number". "123", "a week"] in the relation extraction phase and can utilize information from syntactic parsing and POS tagging to merge the associated tokens as a whole (i.e. ["the", "number", "of", "death", "increases", "123", "in", "a", "week"] ["the number of token", "increases", "123", "in", "a week"]) to establish comprehensive data points in the further steps.

The NLP pipeline 165 implements relation extraction, detecting and classifying the semantic relationships among a set of entities. The NLP pipeline 165 extracts relationships among different entities to build understanding of the target field and ontology construction. The NLP pipeline 165 relation extraction represents a valid relation by the name of a specific relation, associated with a tuple of entities.

Figure 25:
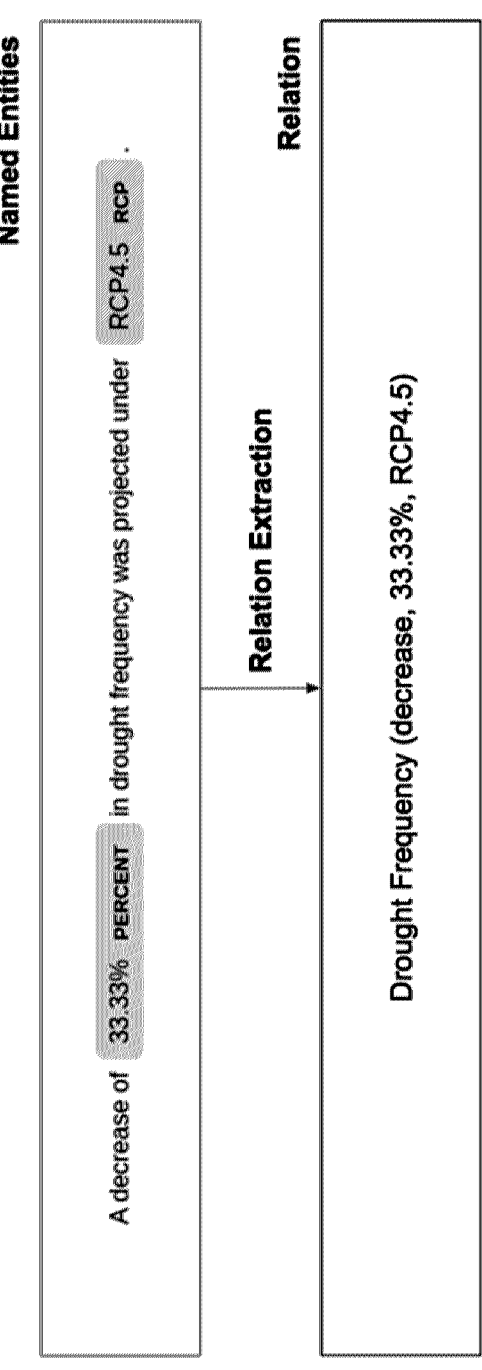
FIG. 25 is a view of an example of a semantic relation.

FIG. 25 is a view of an example of a semantic relation. In this example semantic relation, 'Drought Frequency' is the name of the relation, and ('decrease', '33.33%', 'RCP4.5') are the associated entities.

The NLP pipeline 165 adopts two different approaches, deep learning classification and pattern matching, for relation extraction depending on the amount of the labelled data for the risk factor. Given a climate risk factor, if the labelled dataset is relatively balanced and has a size of more than 2000, the NLP pipeline 165 will prioritize classification. The NLP pipeline 165 will adopt pattern matching for relation extraction for most of the risk factors.

The NLP pipeline 165 can adopt the deep learning classification approach for relation extraction, which takes each sentence as a single input, inserting 2 unused tokens as anchors at the start and the end position of each entity of interest. The NLP pipeline 165 inputs the token vectors of the modified sentence to a model for classifying the relationship among the "anchored" entities. An illustrative example can be based on the architecture of the bioBERT model, a transformer-based neural network used for the biomedical field. The NLP pipeline 165 deep learning classification approach achieves fair accuracy. The NLP pipeline 165 example can use the deep learning classification approach for the risk factor of sea level rise to generate a sample ontological structure. Other types of risk factors can be used, and different learning approaches.

Figure 26:
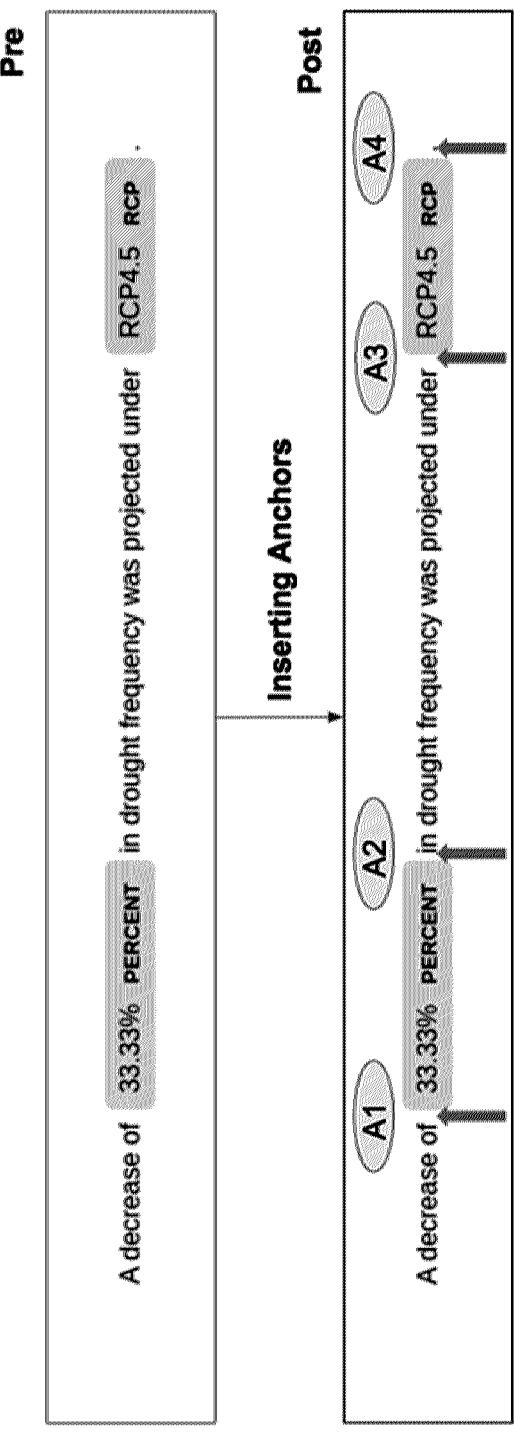
FIG. 26 is a view of an example of a modified sentence including multiple anchors.

FIG. 26 is a view of an example of a modified sentence including multiple anchors. This figure is an illustrative example of the deep learning classification approach for relation extraction.

The NLP pipeline 165 can adopt a pattern matching approach for relation extraction, which is based on similar relationships being mapped to similar types of text representation or grammatical patterns. The NLP pipeline 165 can use the high accuracy information obtained from POS tags, dependency relation, etc. to build a list of rules for any given general relationships. The NLP pipeline 165 can find patterns and mappings to these general relationships and use these relations to further link the relevant entities with the keywords in the sentences. The NLP pipeline 165 can select keywords for a risk factor ("MENTION" keywords) from the list generated by the NLP pipeline 165 keyword extraction process, or climate scientists can recommend the keywords.

Table 8 shows the general relationship between entities for the example sentence: "An increase of 33% and 66% in extreme drought frequency was projected under RCP 4.5 and RCP 8.5, reported by IPCC."

| Relation type | Example |
|---------------|---------|
| VERB_X | {"SUBJ": "An increase" , "PRED": "was projected"} |
| CONJ_X | {"TOKEN": "33%", "CC": "and", "CONJ": "66%"}, {"TOKEN": "RCP 4.5", "CC": "and", "CONJ": "RCP 8.5"} |
| MOD_PREP | {"MODIFIED": "An increase", "PREP": "of", "MODIFIER": "33%"}, {"MODIFIED": "An increase", "PREP": "in", "MODIFIER": "drought frequency"}, {"MODIFIED": "reported", "PREP": "by", "MODIFIER": "IPCC"} |
| MOD_MOD | {"MODIFIED": "was projected", "MODIFIER": "reported"} |
| MOD_ADJ | {"MODIFIED": "drought frequency", "MODIFIER": "extreme"} |

Table 9 shows examples of the rules for pattern matching.

There exists a directional path in parse tree between e1 and e2 less than certain length
The path between e1 and e2 should not cross clause-like structures
The path should contain at least some verbs belonging to the selected keywords The server 100 uploads the extracted general relationship (Table 8) and all information associated with the included tokens, sentences and documents to the graph database stored in the non-transitory memory 110. The hierarchy of the data model includes four types of vertices: document, sentence, relation, token. Each vertex type is associated with different kinds of properties, and some of the direct edges linking from one vertex to another also have their own kind of property. The server 100 uses the topological structure of these vertices, edges and their associated properties as a basis to further extract higher-level relationships among entities. For example, Table 11 lists six essential patterns to form the query on the graph, so that the server 100 can extract relevant values and its associated entities including spatial, temporal, scenario, predicate dimensions with high precision.

Figure 27:
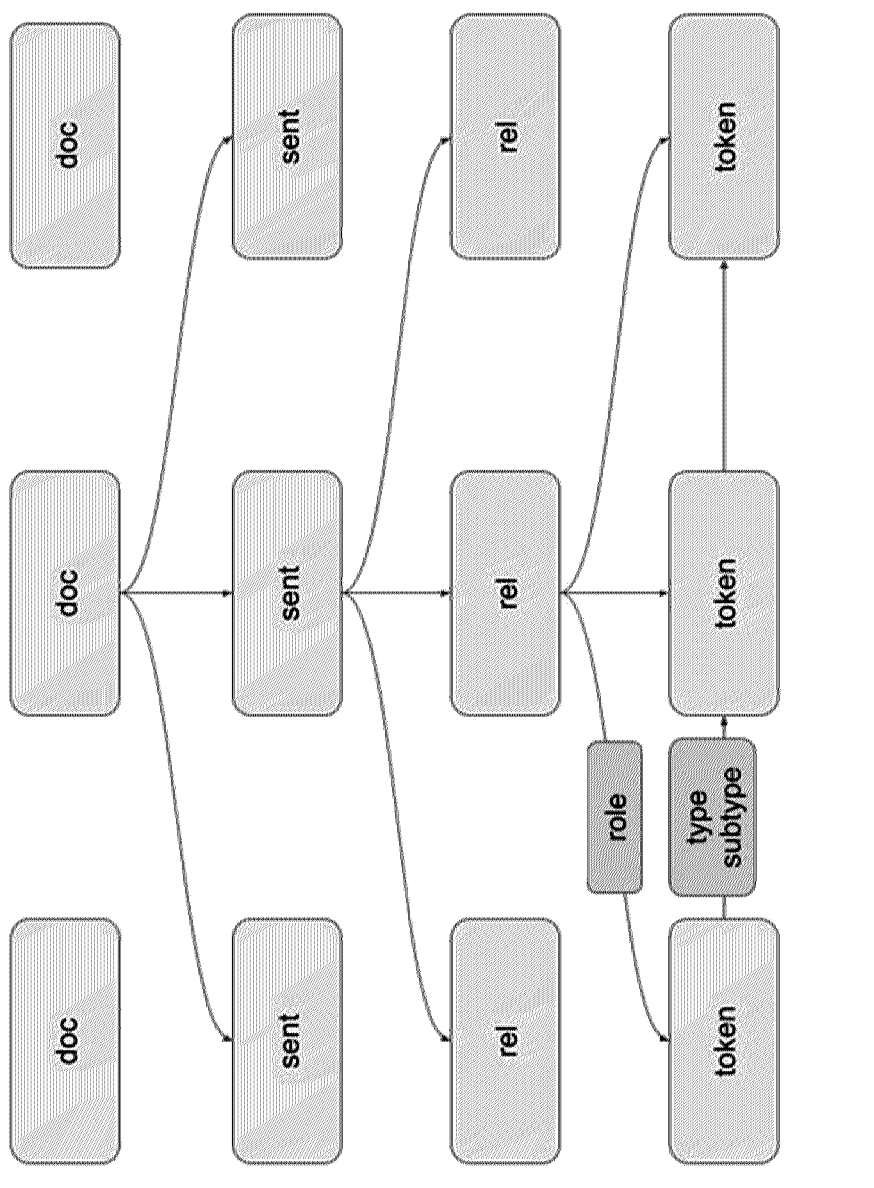
FIG. 27 is a view of an example of knowledge graph or hierarchical data model.

FIG. 27 is a view of an example of knowledge graph or hierarchical data model that can be stored in non-transitory memory 110, and queried or updated by server 10 for data exchange.

Table 10 shows the associated properties for each vertex type and edge type.

| Name | Type | Properties |
|---|---|---|
| doc | Vertex | node: doc<br>ID: Elasticsearch article ID<br>TITLE<br>AUTHOR<br>DOI<br>FROM: Publisher<br>SOURCE: Journal |
| sent | Vertex | node: sent<br>text |
| rel | Vertex | node: rel<br>type: MOD, VERB, CONJ<br>subtype: PREP, ADJ, MOD, X |
| token | Vertex | i: token position in sentence<br>text<br>pos: pos tagging<br>dep: dependency relation<br>ent: entity type<br>lemma: original form (eg.<br>deaths –> death, died –> die) |
| doc –> sent | Edge | |
| sent –> rel | Edge | |
| rel –> token | Edge | role: semantic role label (eg. MODIFIER,<br>PREP, MODIFIED for the relation<br>'MOD_PREP') |
| token –> token | Edge | Associated relation between tokens<br>type: MOD, VERB, CONJ<br>subtype: PREP, ADJ, MOD, X |

Table 11 shows essential patterns for extracting value on the knowledge graph.

| Name | Pattern |
|---|---|
| 1 | nummod |
| 2 | DIM <–nsubj- PRED -attr–> VAL |
| 3 | DIM <–SUBJ- PRED -MODIFIER–> VAL |
| 4 | MOD_PREP(DIM, of, VAL) |
| 5 | MOD_PREP(VAL, of, DIM) |
| 6 | CONJ |

The NLP pipeline 165 can build a set of linking rules for entities to automatically correctly assign a unique ID for each entity to avoid confusion from synonyms, an entity having different textual representations (e.g. a bike and a bicycle) and polysemies, identical textual representations representing different entities (e.g. 'I hurt my arms' vs.

'Country A sold weapons to Country B). The NLP pipeline 165 can also adopt a classification model to predict whether two given entities are identical or not.

Embodiments described herein combine NLP with community detection and network analysis, to use keyword-generated links to obtain a high level view of the connectedness among risk factors. The server 100 enables generation of a knowledge graph of the interrelatedness of various risk factors from a massive amount of unstructured data in articles. Embodiments described herein combine NLP, expert domain knowledge, and network analysis to obtain high level insights from large amounts of detailed and unstructured data.

Embodiments described herein combine NLP with community detection and network analysis, to generate a model of connectedness among risk factors. The server 100 uses the knowledge graph of the interrelatedness of various risk factors for scenario generation platform 1008 and scenarios sets.

The scenario generation platform 1008 can generate output results using scenario engine 180 of server 100 and scenario sets populated with data from the knowledge graph of risk factors.

Figure 7C:
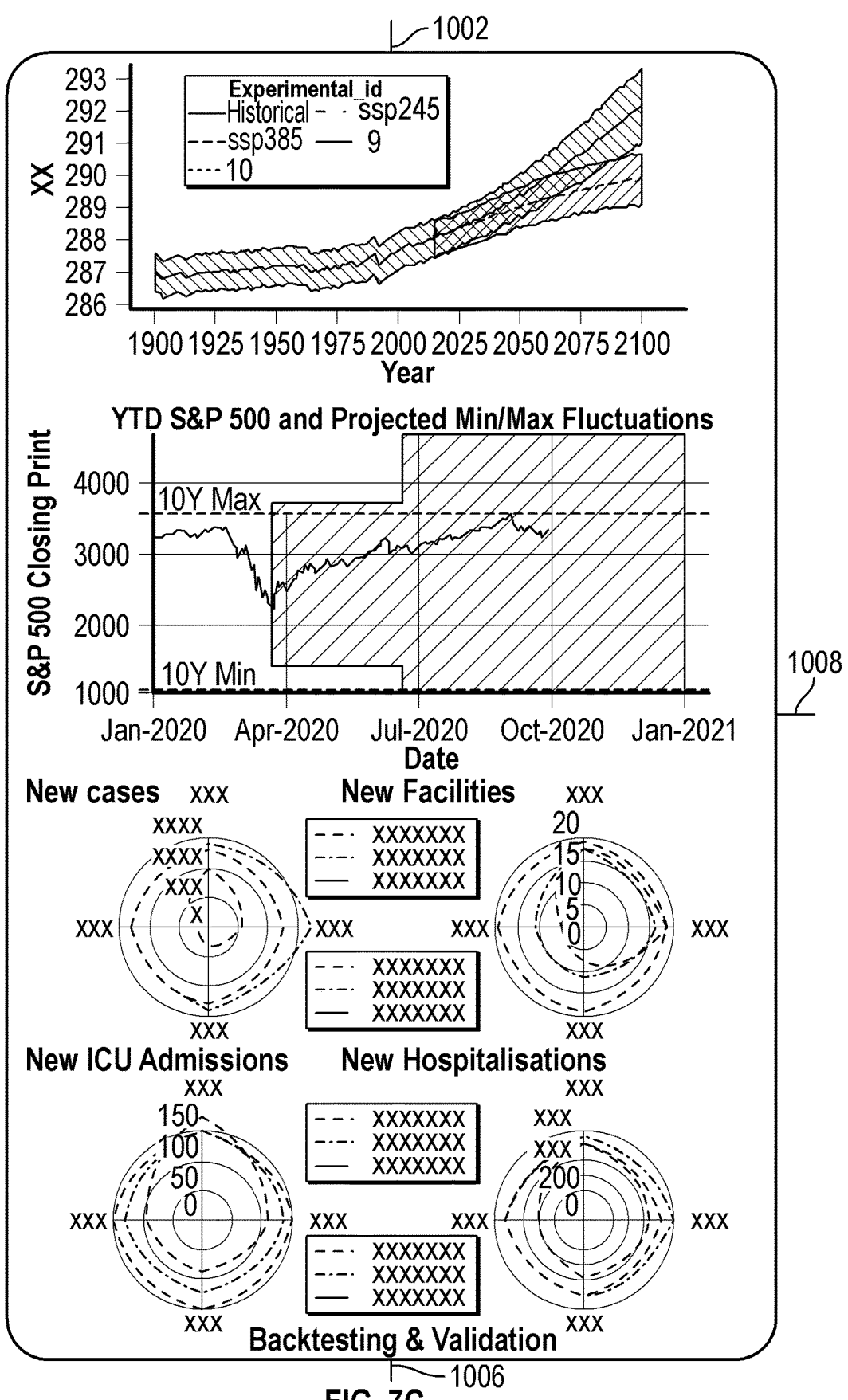
FIG. 7C shows an example back-testing and validation system.

Referring to FIG. 7C, there is shown the back-testing and validation system 1006. The back-testing and validation system 1006 compute testing output data using data from the scenario generation platform 1008 and the scenario sets. The back-testing and validation system 1006 exchanges data with the data warehouse 1002 and scenario generation platform 1008 to update the interface 140 at client device 130. The back-testing and validation system 1006 validates and tests the output data from the scenario generation platform 1008.

Figure 7D:
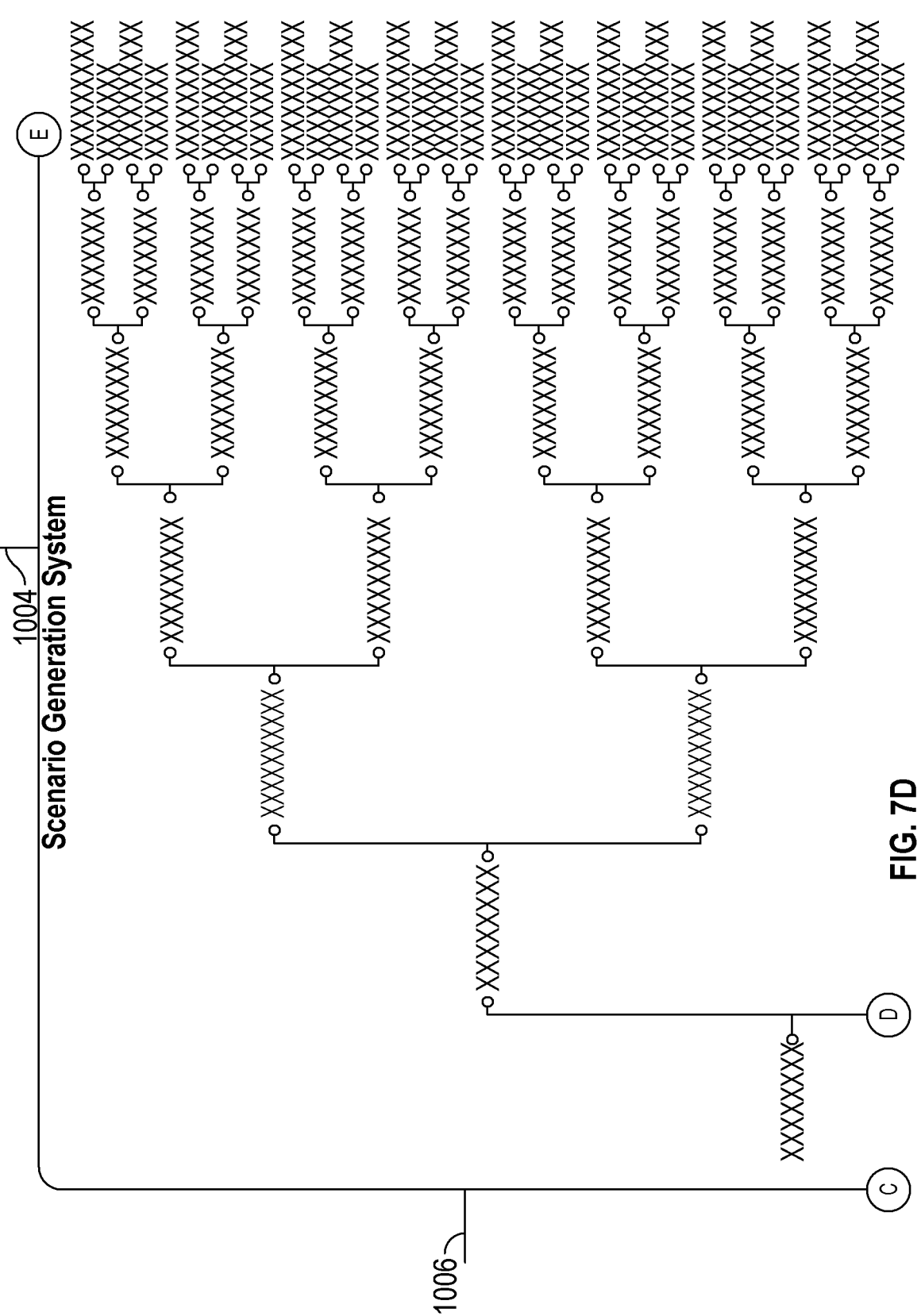
FIG. 7D shows an example scenario generation platform.
Figure 7D:
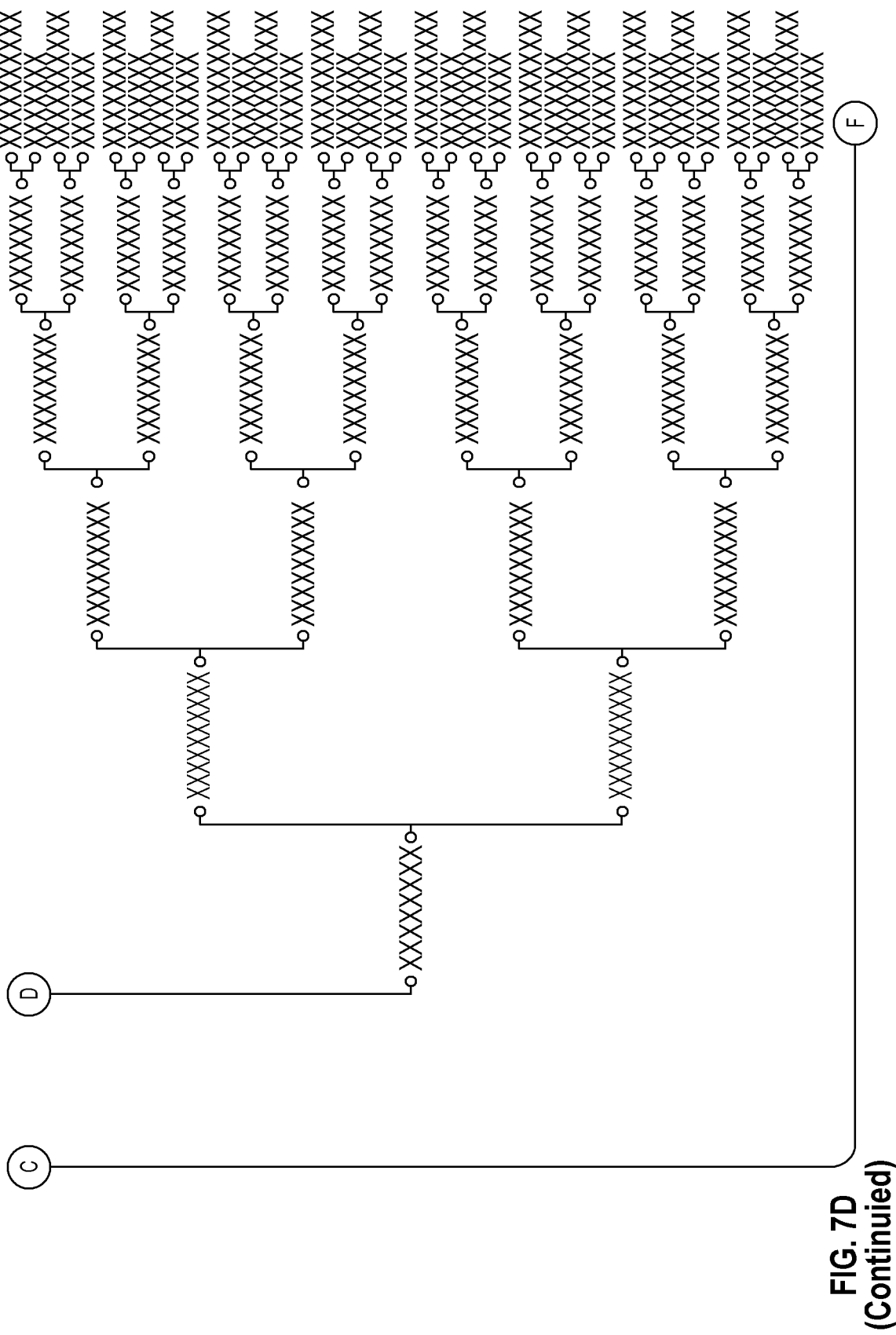
Figure 7D:
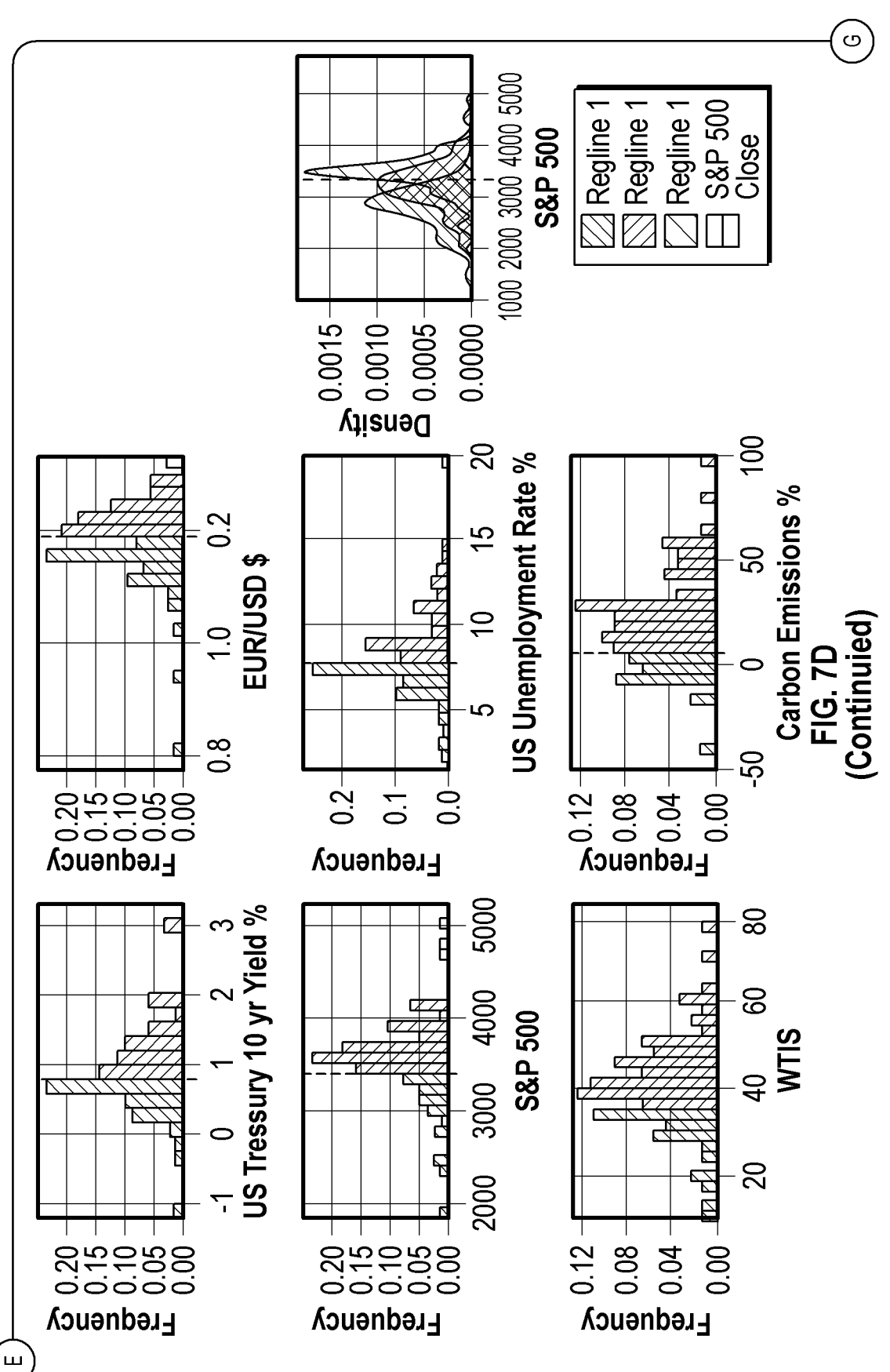

FIG. 7D shows the scenario generation platform 1008 that can be used for scenario engine 180 of server 100, for example. The scenario generation platform 1008 computes scenario sets and risk factor data. The scenario generation platform 1008 exchanges data with back-testing and validation system 1006 and machine learning pipeline orchestration 1004 to update the interface 140 at client device 130. The scenario generation platform 1008 computes distribution data 1020 for scenario generation. The distribution data 1020 can be from expert pipeline 170.

The hardware components 1000 of FIG. 7 exchange data using an API and populate the interface 140 to update its visual elements.

FIG. 8 shows illustrative example data components 1100 that can be populated using hardware components 1000. Different data sources 1100 can be ingested using an API Data Exchange 1104 and transformed by the hardware components of FIG. 1 to generate or update knowledge graphs stored in memory 110, for example. Different data sources 1100 can be ingested and transformed by the hardware components 1000 of FIG. 7 using an API Data Exchange 1104. The API Data Exchange 1104 can provide data to update a front-end interface 1106 with different visual elements that change based on data and commands. In some embodiments, the front-end interface 1106 corresponds to interface 140 of user device 130 of FIG. 1.

Figure 9:
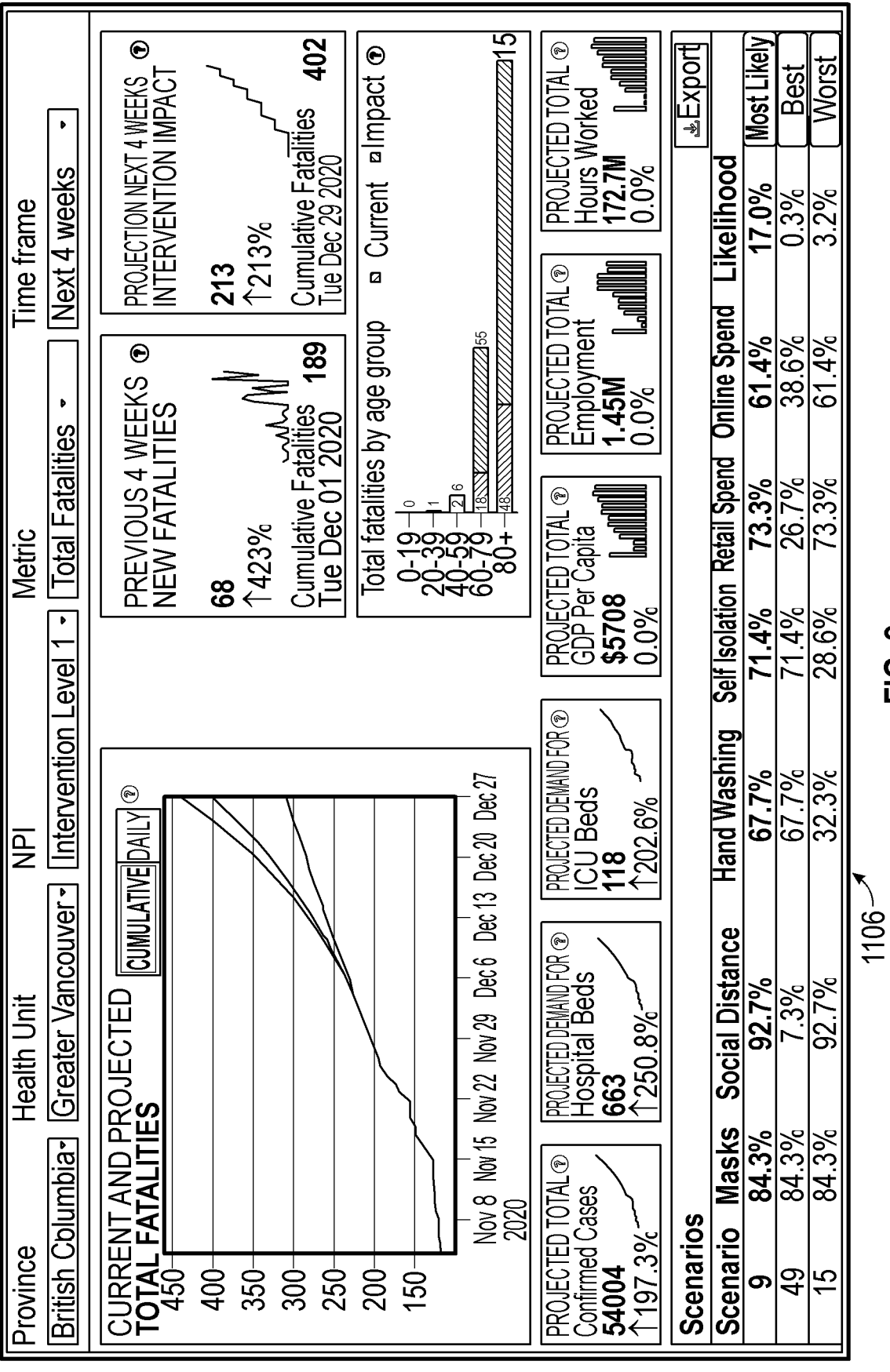
FIG. 9 shows an example front-end interface.

FIG. 9 shows an example front-end interface 1106 that corresponds to interface 140 of user device 130 of FIG. 1. As noted, example risk factors relate to pandemic risk factors. The visual elements can correspond to data for pandemic risk factors.

The server 100 of FIG. 1 can store computer risk models for pandemic models including epidemiological models, economics models, distance models, and so on. The server 100 can use API gateway to receive data from different data sources, including model data 190, risk data 220, vector parameters 200, and state parameters 210. The server 100 can receive input data from model data 190, risk data 220, vector parameters 200, and state parameters 210 to populate the computer risk models, nodes, and the scenario sets.

The hardware server 100 populates the causal graph of nodes with values (estimates) for the risk factors using computed distributions of values for pandemic risk factors. The server 100 can used structured expert judgement data and an expert pipeline 170 to collect data for computing distributions for pandemic risk factors. In some embodiments, the hardware server 100 populates the causal graph of nodes by computing the frequency distribution of possible values for the climate risk factor at different points in time using machine learning pipeline 160 and expert pipeline 170 to collect the possible values representing estimates of future uncertain values. In some examples, the risk factors also include climate risk factors as they can impact a pandemic. The expert pipeline 170 processes structured expert judgement data to update the knowledge graph of risk factors and topics.

In some embodiments, the hardware server 100 populates the causal graph of nodes using extremes of the distributions and a weight of the distributions from data collected by the expert pipeline 170. In some embodiments, the hardware server 100 computes the forward-frequency distribution of possible values for the risk factor collected by structured expert pipeline 170 for the time horizon to extract upward and downward extreme values, and likelihoods of upward and downward movement from the forward-frequency distribution. The hardware server 100 can filter outlier data using the structured expert pipeline 170 before computing the forward-frequency distribution for the pandemic risk factors. That way, the extreme values are more likely to be accurate representations and not outliers or noisy data.

In some embodiments, the hardware server 100 computes output using values for the risk factor stored in the knowledge graph, which may be updated with data collected by structured expert pipeline 170. The hardware server 100 computes the time horizon to extract upward and downward extreme values, and likelihoods of upward and downward movement from the forward-frequency distribution, for example.

In some embodiments, the hardware server 100 continuously populates the knowledge graph or causal graph of nodes by re-computing the frequency distribution of possible values for the pandemic risk factors at different points in time by continuously collecting data using the machine learning pipeline 160, NLP pipeline 165, and the structured expert pipeline 170.

The server 100 can generate visual elements, decisions and policies for interface 140 relating to the pandemic risk factors based on computations by scenario engine 180 with input from different data sources. For example, model data 190 and risk data 220 can include community and distancing model data from camera feeds, video input and video files. For example, vector parameters 200 can include epidemiological vector parameters (transmission rate, duration care facility, duration illness, illness probabilities, measures, effects) and economic vector parameters (household expenditure, income consumption, unemployment benefit uptake, imported input restrictions, shutdown, timing, labour productivity, export demand, wage subsidy update, government programs). For example, state parameters 210 can include epidemiological state parameters (current state infected, hospital, death, recovered, geographic regions) and economic state parameters (time required to reopen, labour force, demographics, geographic controls). The server 100 uses the data to populate the computer risk models, nodes, and the scenario sets.

Figure 10:
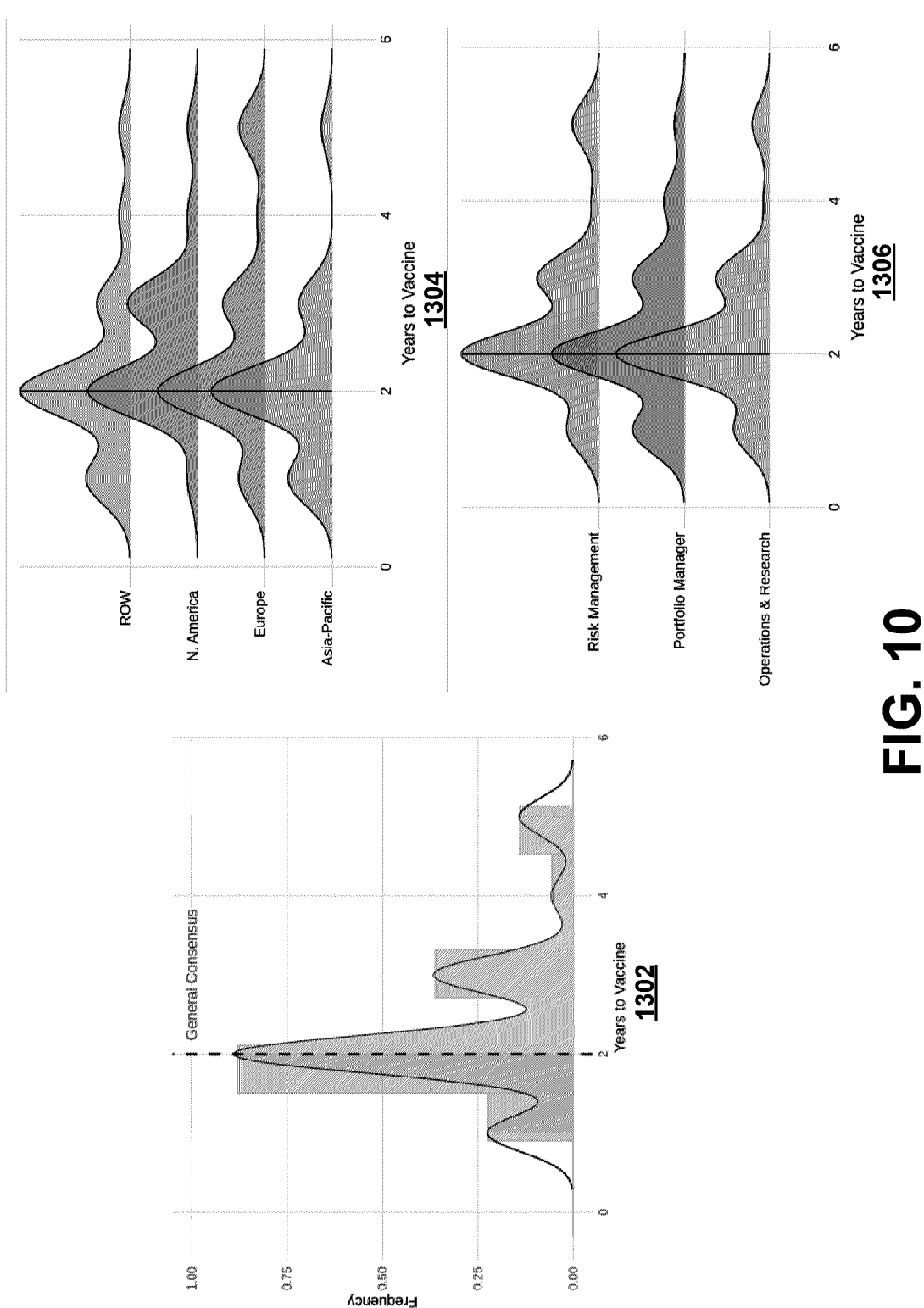
FIG. 10 is a view of example components of a climate risk hierarchy.

FIG. 10 are graphs 1302, 1304, 1306 of distributions for pandemic data collected by the structured expert pipeline 170 to derive values corresponding to perspectives on the path to a vaccine, the financial impacts of a pandemic on the global economy and the impact of climate change on a pandemic. The interface 140 can be used by respondents to provide input on views on how climate change will influence future global pandemics, the likely time to a vaccine being available in their respective regions, and how the current situation will impact the global economy over a future period of time. There is radical uncertainty regarding the time to a vaccine and its likely effect on key financial benchmarks and the input can be used to derive estimates for risk factors. Financial benchmarks can indicate low trends.

The graphs 1302, 1304, 1306 show probability distributions from data captured using survey fields of interface 140. The server 100 can compute the frequency distribution of possible values for different pandemic risk factors captured by the interface 140 and structured expert pipeline 170. The values captured by the interface 140 can map to different points in time to add time to the values of the nodes. The structured expert pipeline 170 collects pandemic data as estimates of future uncertainty for the pandemic risk factors. For example, the structured expert pipeline 170 can use interface 140 to poll for estimates of future uncertainty for individual risk factors.

FIG. 11 shows an example table 1400 of scenario data that can correspond to nodes of the causal graph and corresponding values computer by server 100. The scenario data can also be generated using data from the knowledge graphs stored in memory 110, for example.

Figure 12:
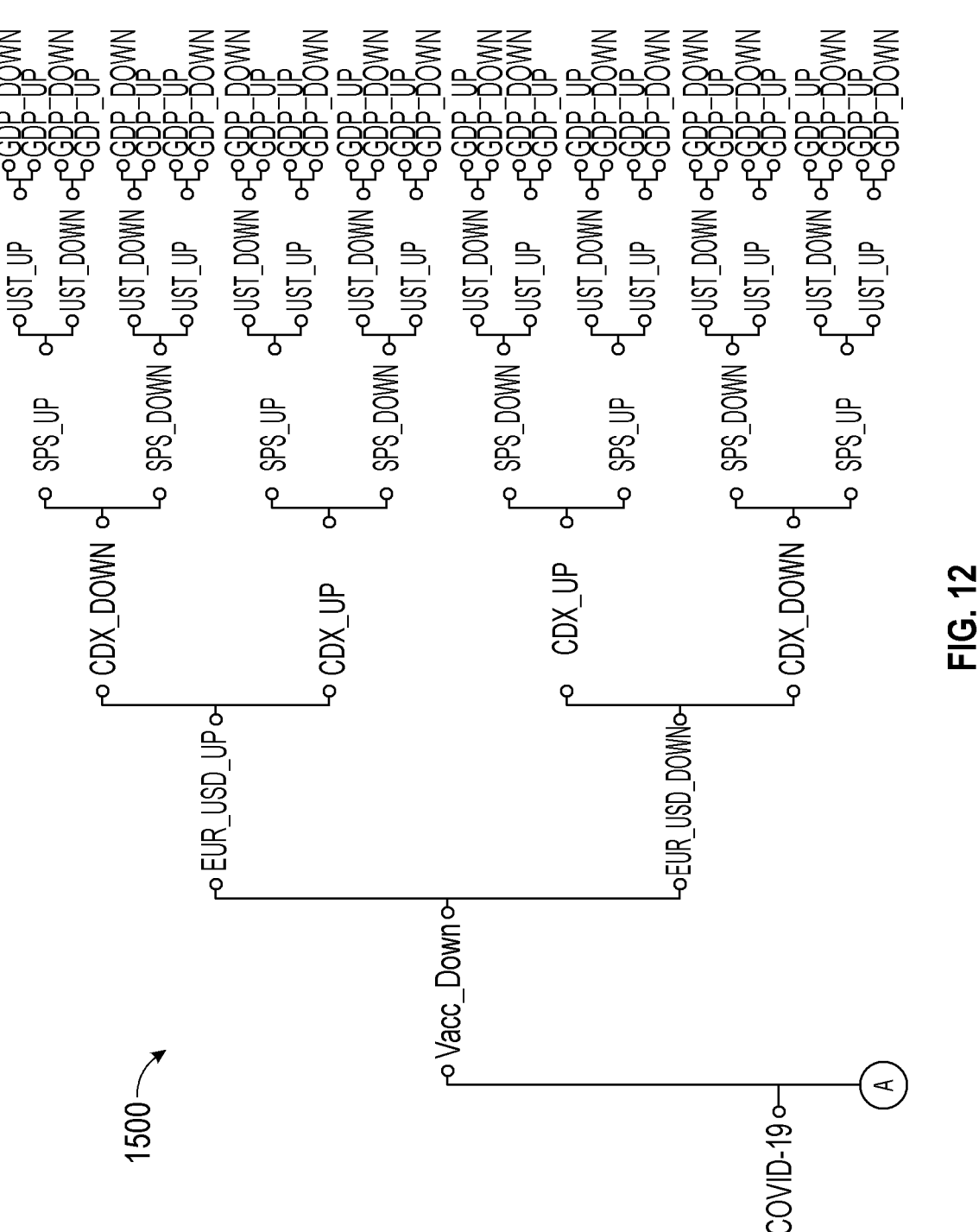
FIG. 12 show an example scenario tree of scenario sets.
Figure 12:
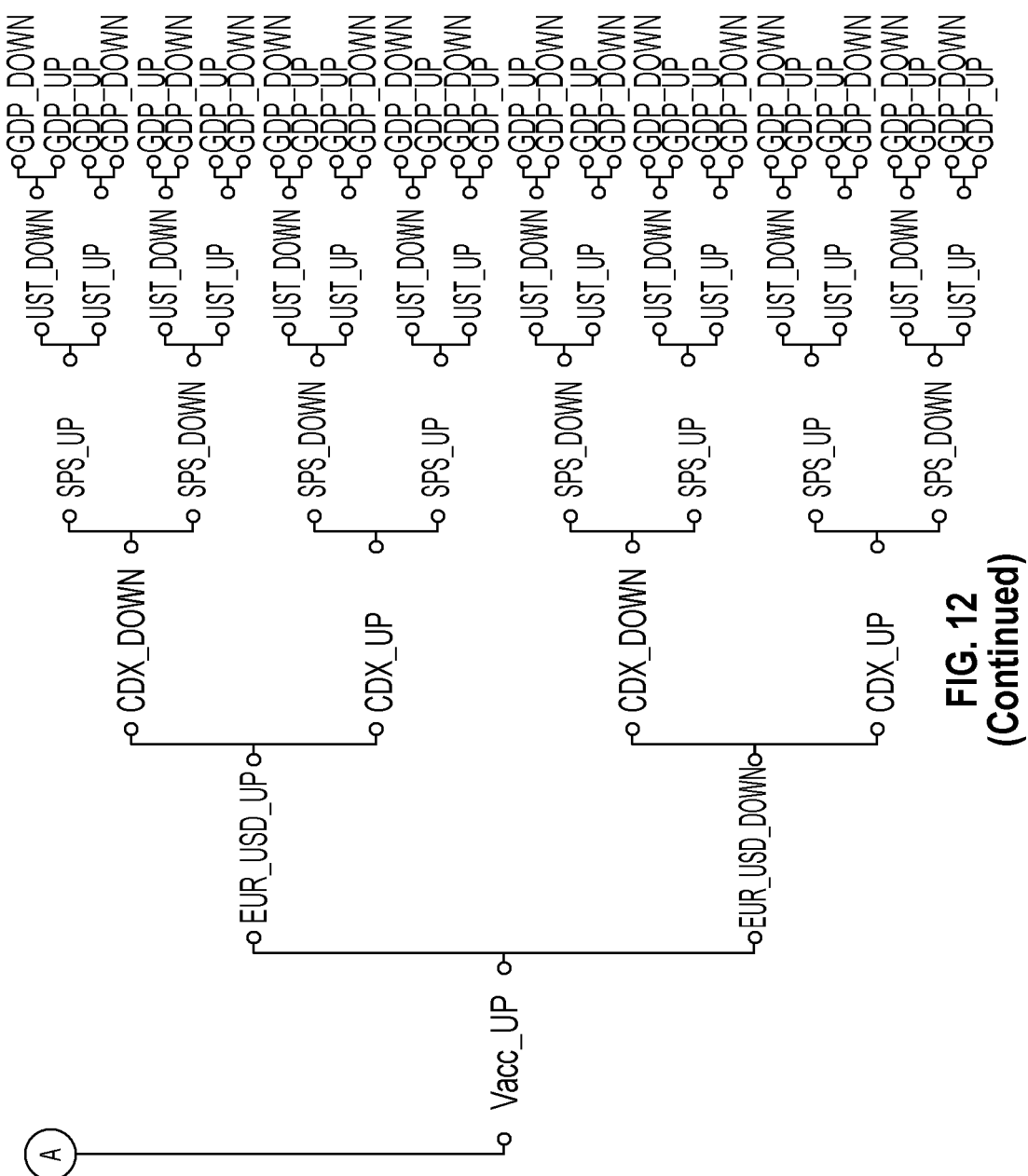

FIG. 12 show an example scenario tree 1500 of scenario sets corresponding to the table 1400 of FIG. 11 as an illustrative example of visual elements that can be generated and displayed at interface 140. The nodes of the scenario tree 1500 can be linked to other nodes by encodings to define edges of the scenario tree 1500.

In this example, a graph 1302 shows expert data for time to a vaccine viewed globally. Another graph 1304 shows expert data for time to a vaccine viewed regionally and a further graph 1306 shows expert data for time to a vaccine viewed by sector. These are examples of expert data and visual elements for interface 140.

The expert data can be derived from the knowledge graph. The server 100 can compute expert data using the risk factors and concepts from the knowledge graph. As noted, the NLP pipeline can updated the knowledge graph by processing articles.

Figure 13:
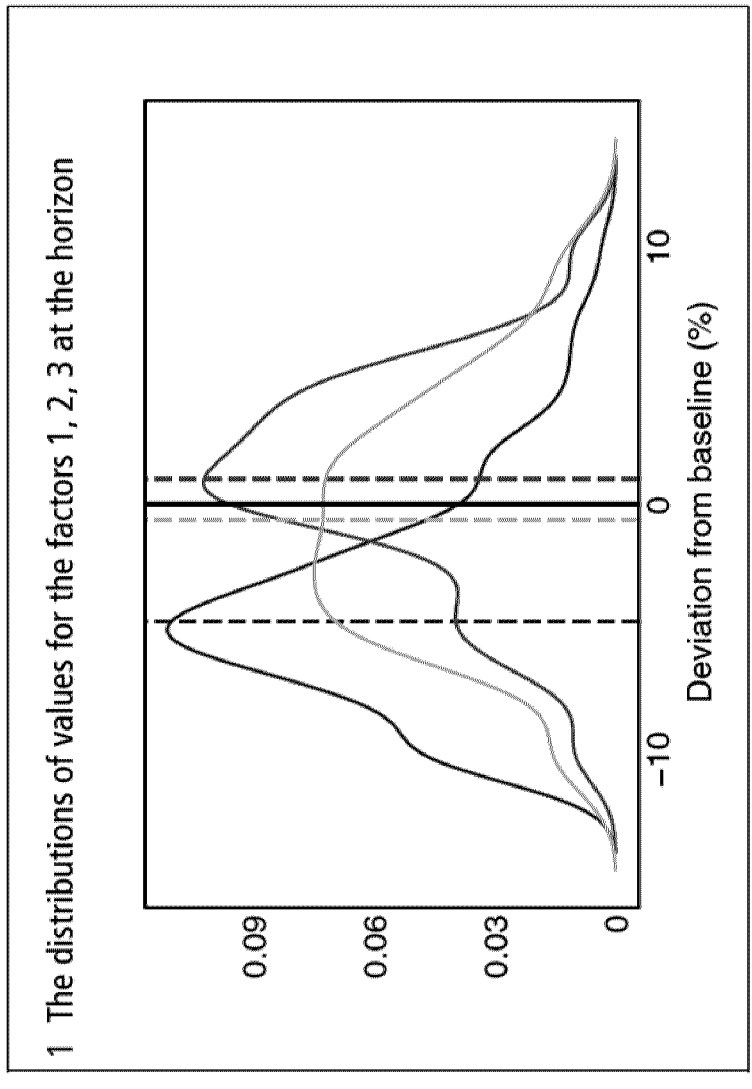
FIG. 13 shows an example graph of distribution values for different factors over a time horizon.

The expert data can represent the collective wisdom of articles or people worldwide who are experts and otherwise involved in understanding and influencing the future values of these factors. The data can extract their views on the subject to obtain a distribution of possible outcomes that would span the range of possibilities. The data can map to a discrete set of possible scenarios for combinations of these factors, so that the precise nature of these distributions is less important than their ability to capture extremes. These distributions give estimates of values which are needed to be able to develop scenarios which combine all factors that are material to the issue at hand. Namely, the possible range of Upside and Downside movements in the factors and their likelihood of occurrence. FIG. 13 shows an example graph of distribution values for different factors over a time horizon. Further details on scenario seta for an example climate change setting are provided in "Generating scenarios algorithmically" risk.net June 2020 the entire contents of which is hereby incorporated by reference and attached hereto.

Figure 14:
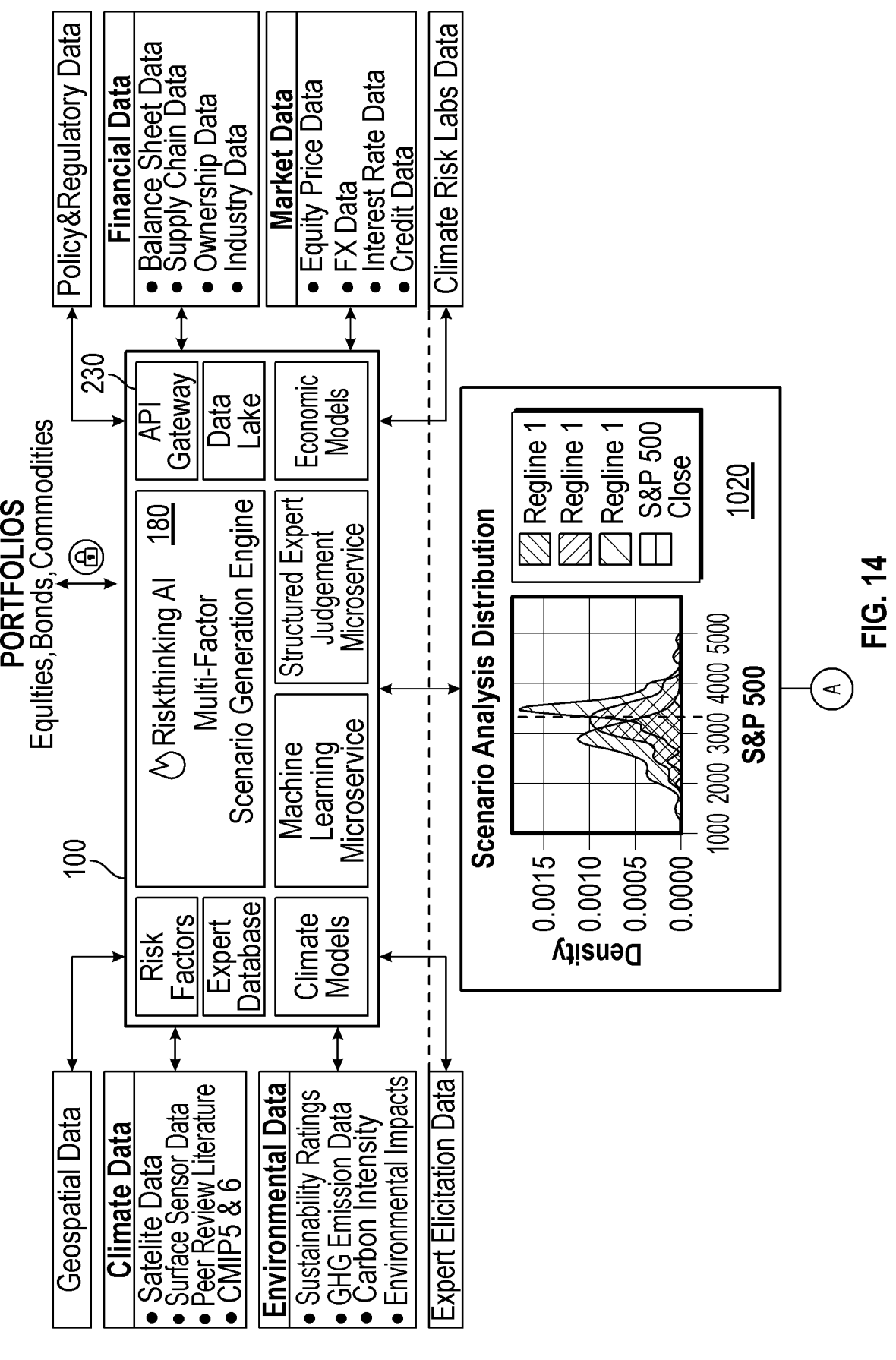
FIG. 14 is a view of an example of the system with servers and hardware components for climate risk factors.
Figure 14:
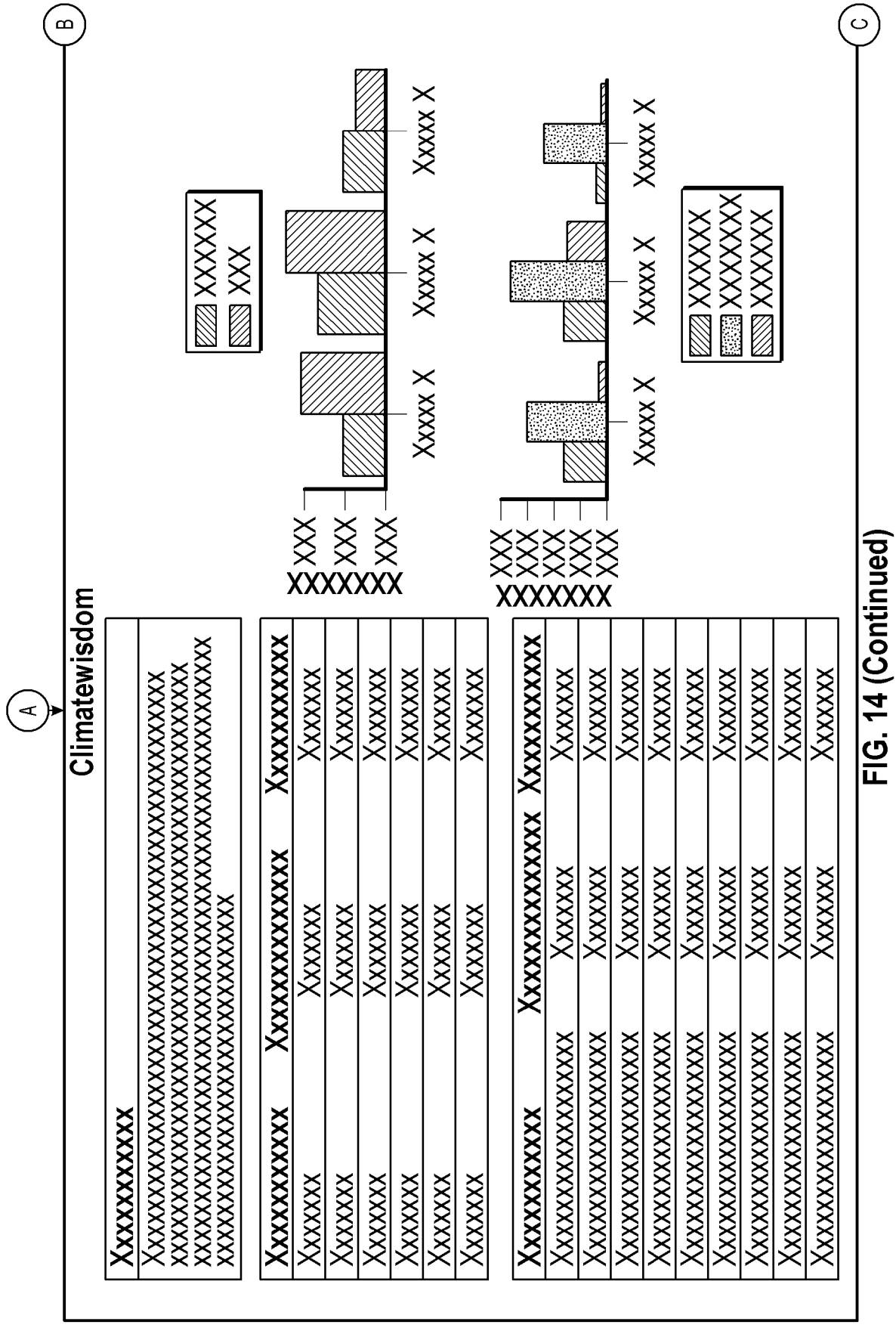
Figure 14:
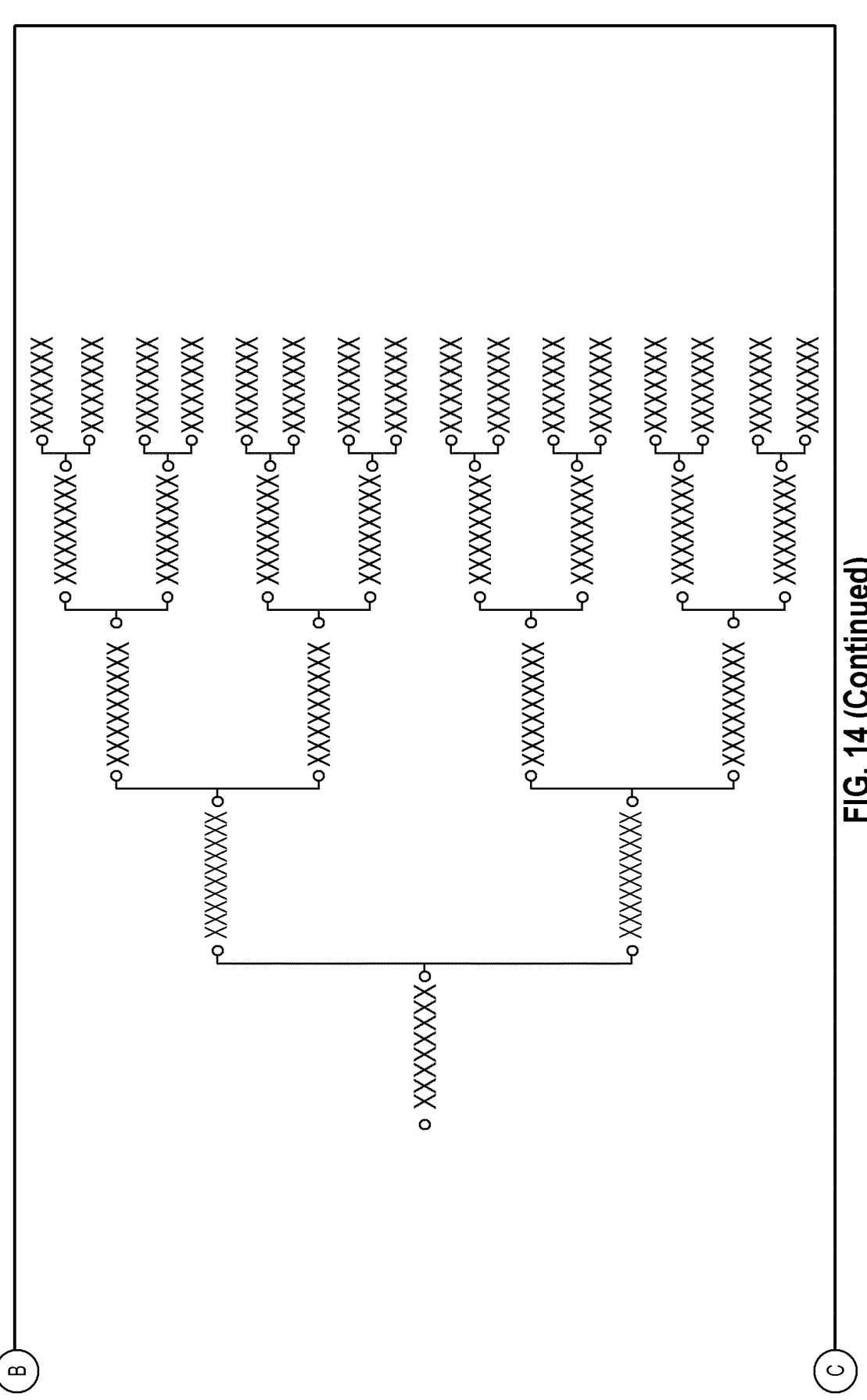

FIG. 14 is a view of an example of the system with server 100 and hardware components configured for climate risk factors. In this example diagram, server 100 couples to different data sources (regulatory data, financial data, market data, research data, climate data, environmental data) via API gateway 230 to capture climate data for scenario generation engine 180. The API gateway 230 can store collected data at a data lake, for example. The server 100 continuously captures data to compute scenario data using scenario generation engine 180. The server 100 also has expert system and machine learning processes as described herein. The scenario generation engine 180 outputs scenario distribution data 1020 for updating and populating interface 140 with visual elements for the climate computations.

Figure 15:
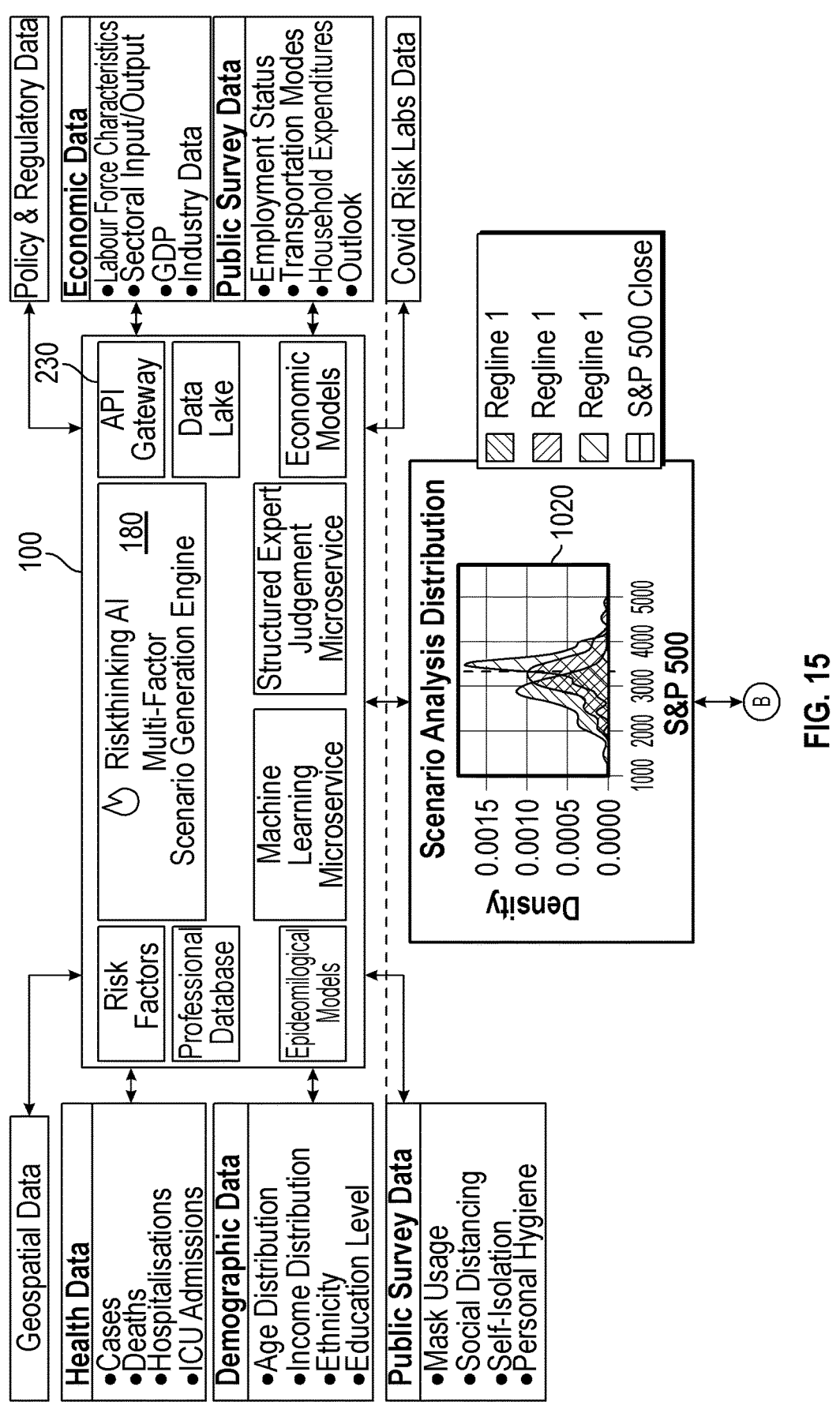
FIG. 15 is a view of an example of the system with servers and hardware components for pandemic risk factors.
Figure 15:
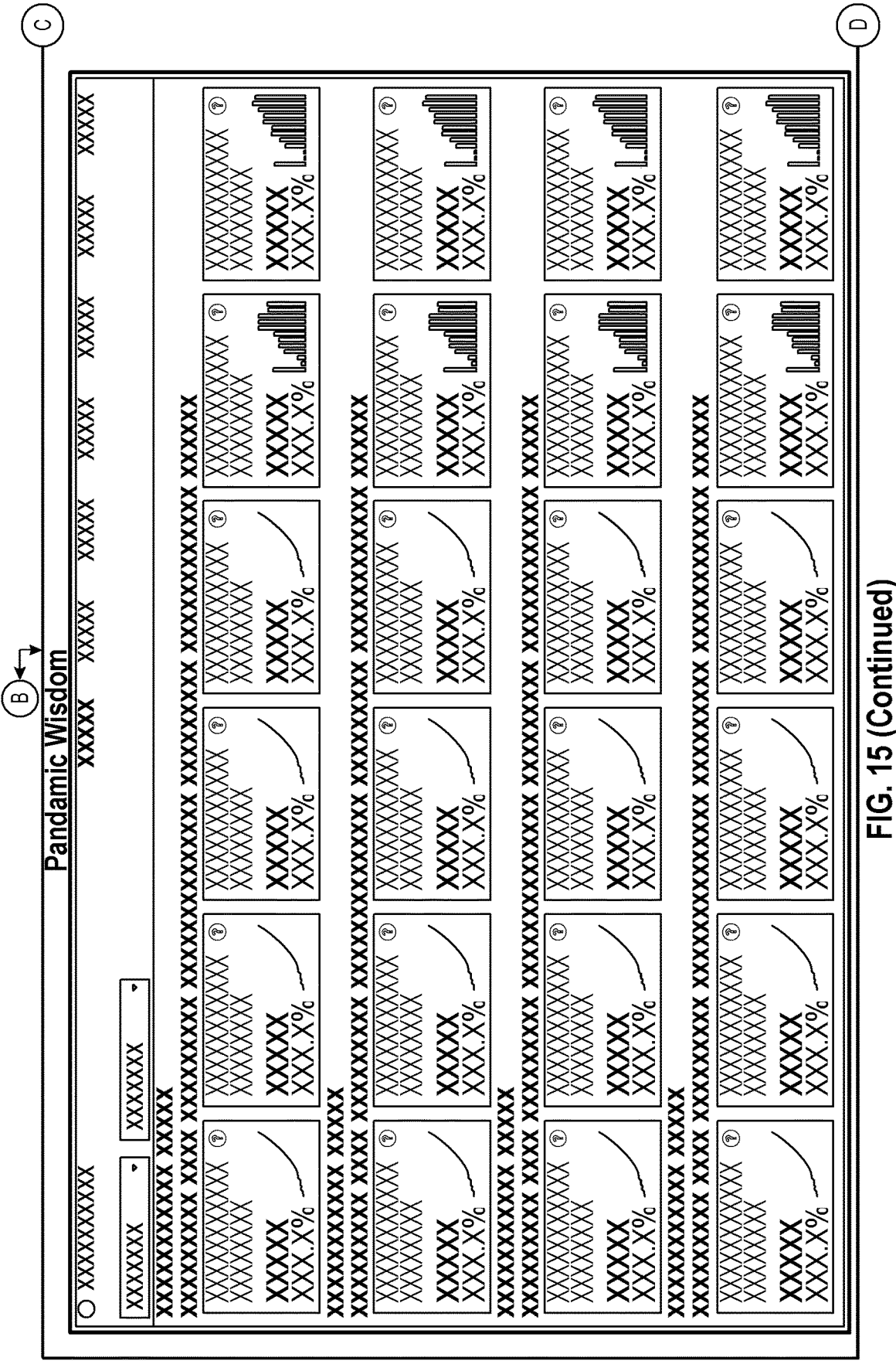
Figure 15:
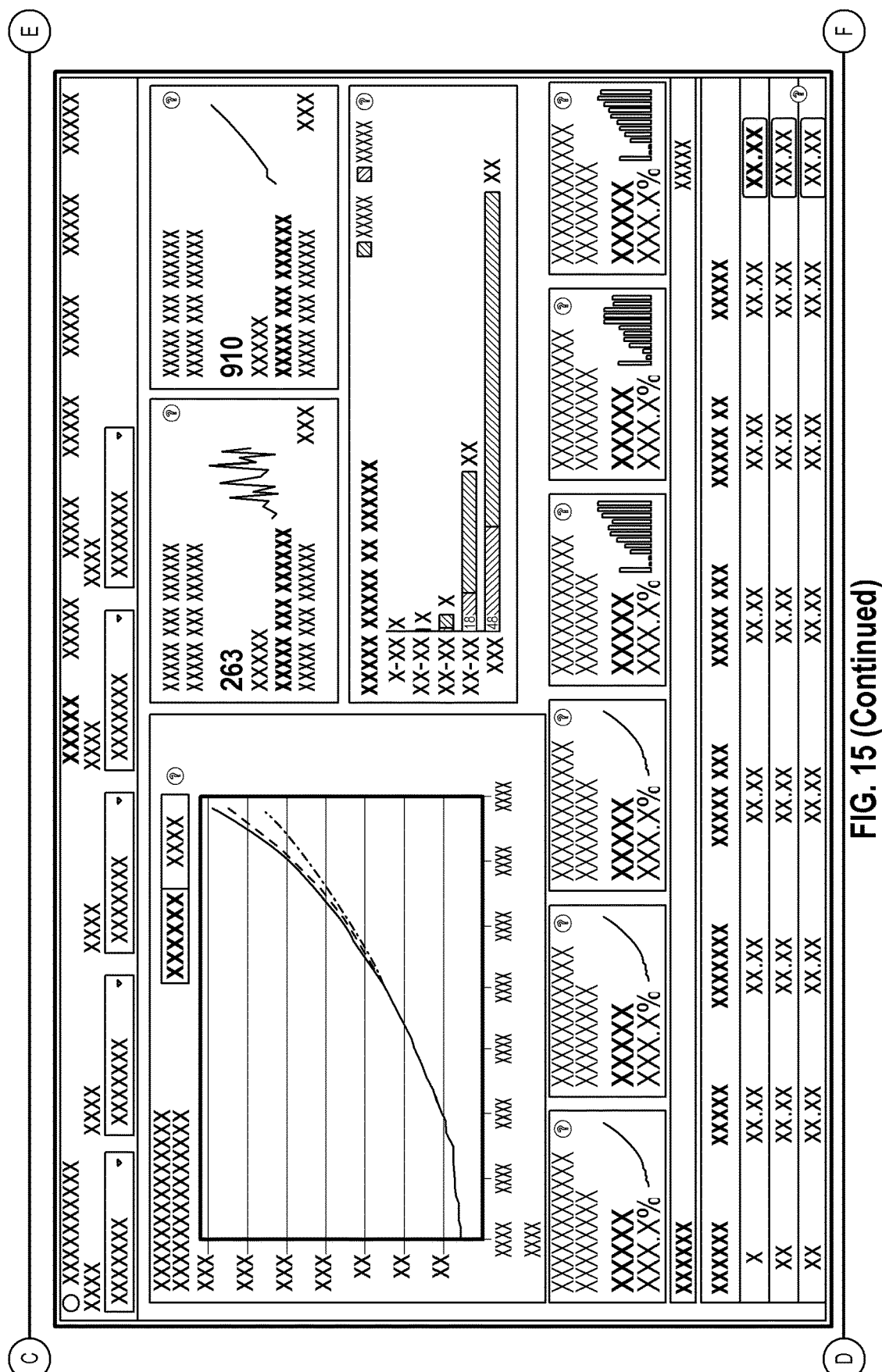
Figure 15:
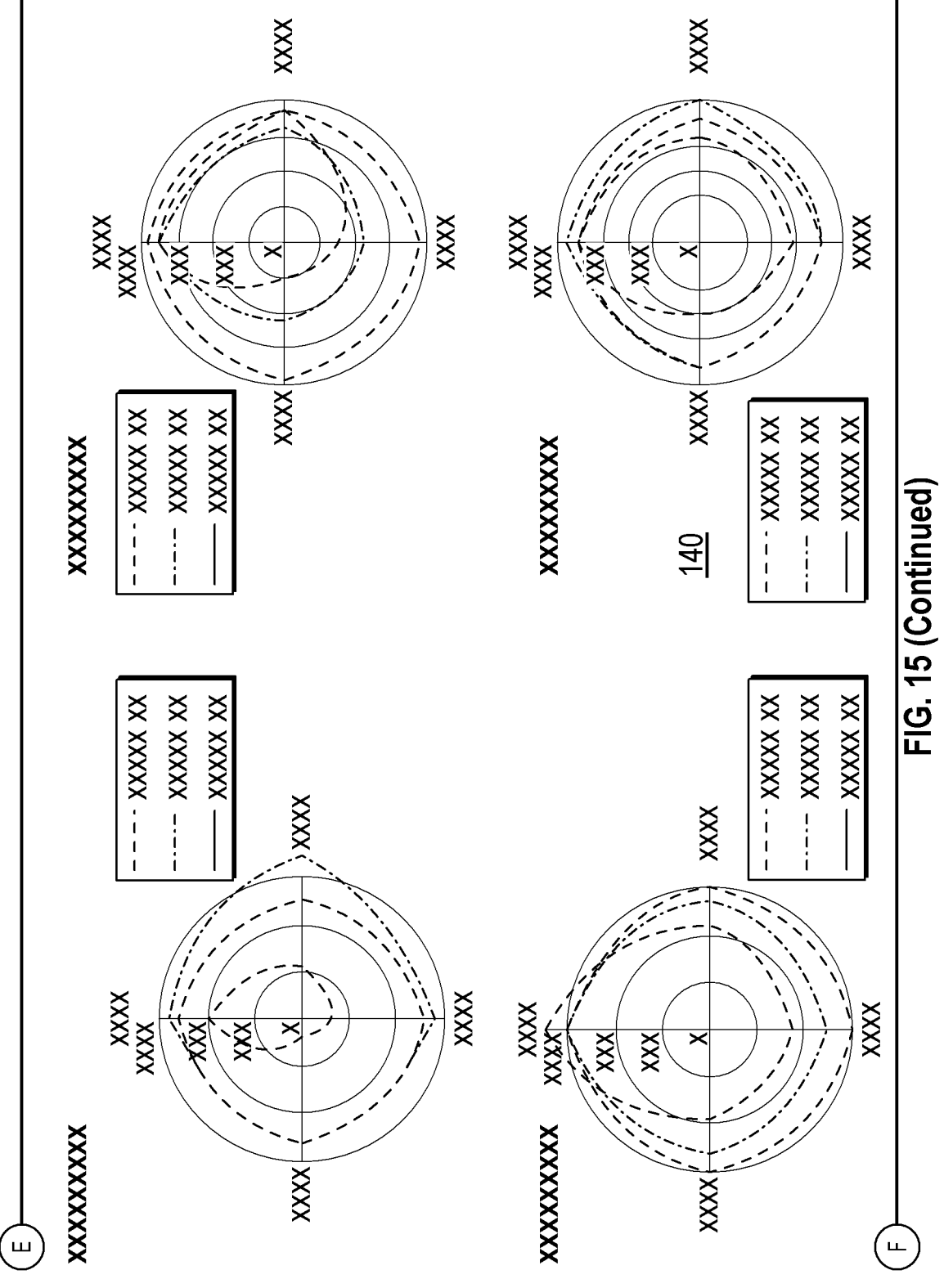

FIG. 15 is a view of an example of the system with server 100 and hardware components configured for pandemic risk factors. In this example diagram, server 100 couples to different data sources (regulatory data, economic data, survey data, research data, health data, demographic data) via API gateway 230 to capture pandemic data for scenario generation engine 180. The API gateway 230 can store collected data at a data lake, for example. The server 100 continuously captures data to compute scenario data using scenario generation engine 180. The server 100 also has expert system and machine learning processes as described herein. The scenario generation engine 180 outputs scenario distribution data 1020 for updating and populating interface 140 with visual elements for the pandemic computations.

By combining the information in the forward distributions with scenario trees the server 100 can compute both scenarios for the combinations of factors as well as estimates of the likelihood of these scenarios occurring. Four example values—up and down ranges for the factors as well the likelihoods of the up and down movements are all we need to complete the data required to evaluate the tree.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Figure 16:
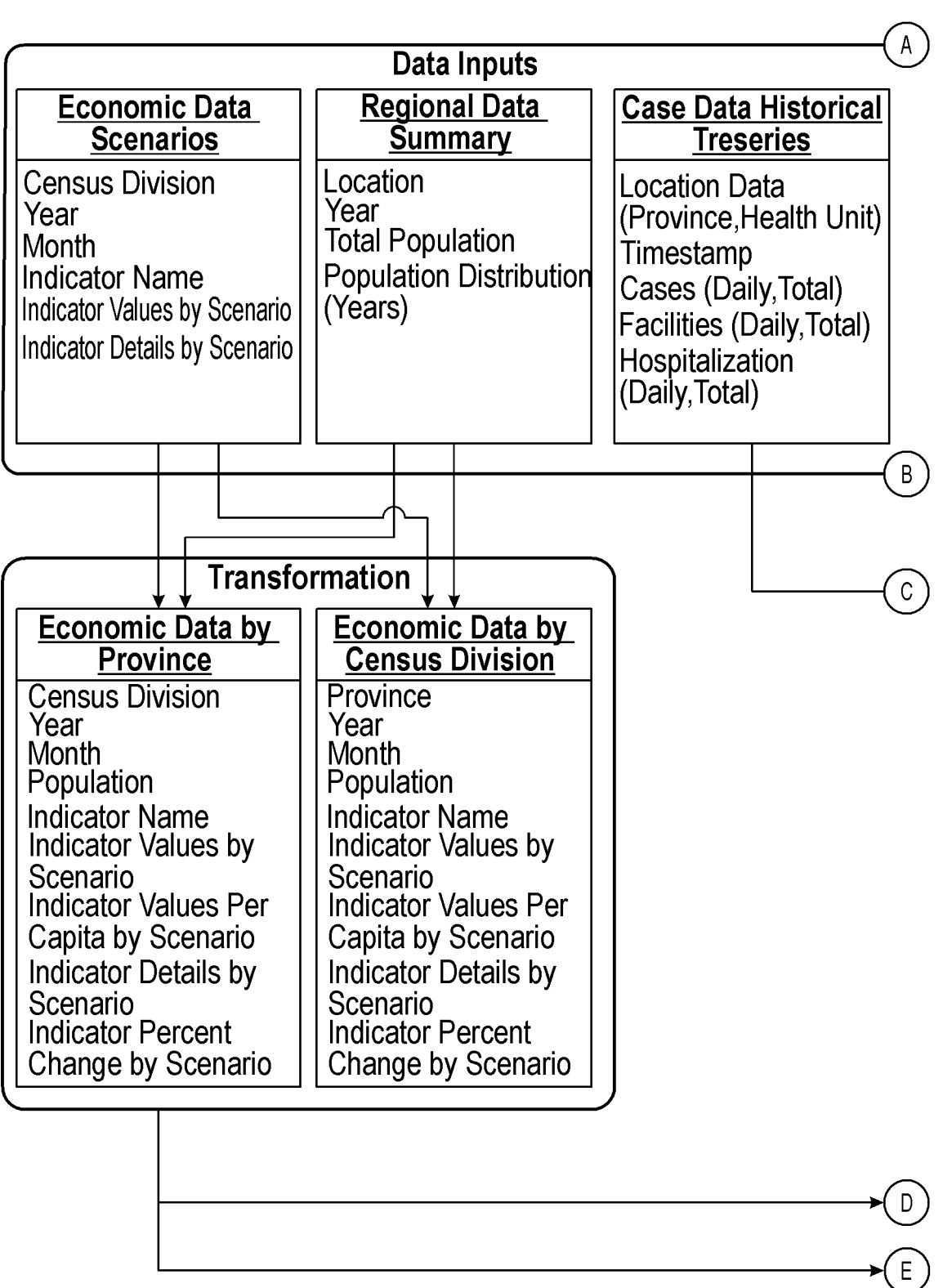
FIG. 16 is a view of an example server system model to extract, transfer and load data.
Figure 16:
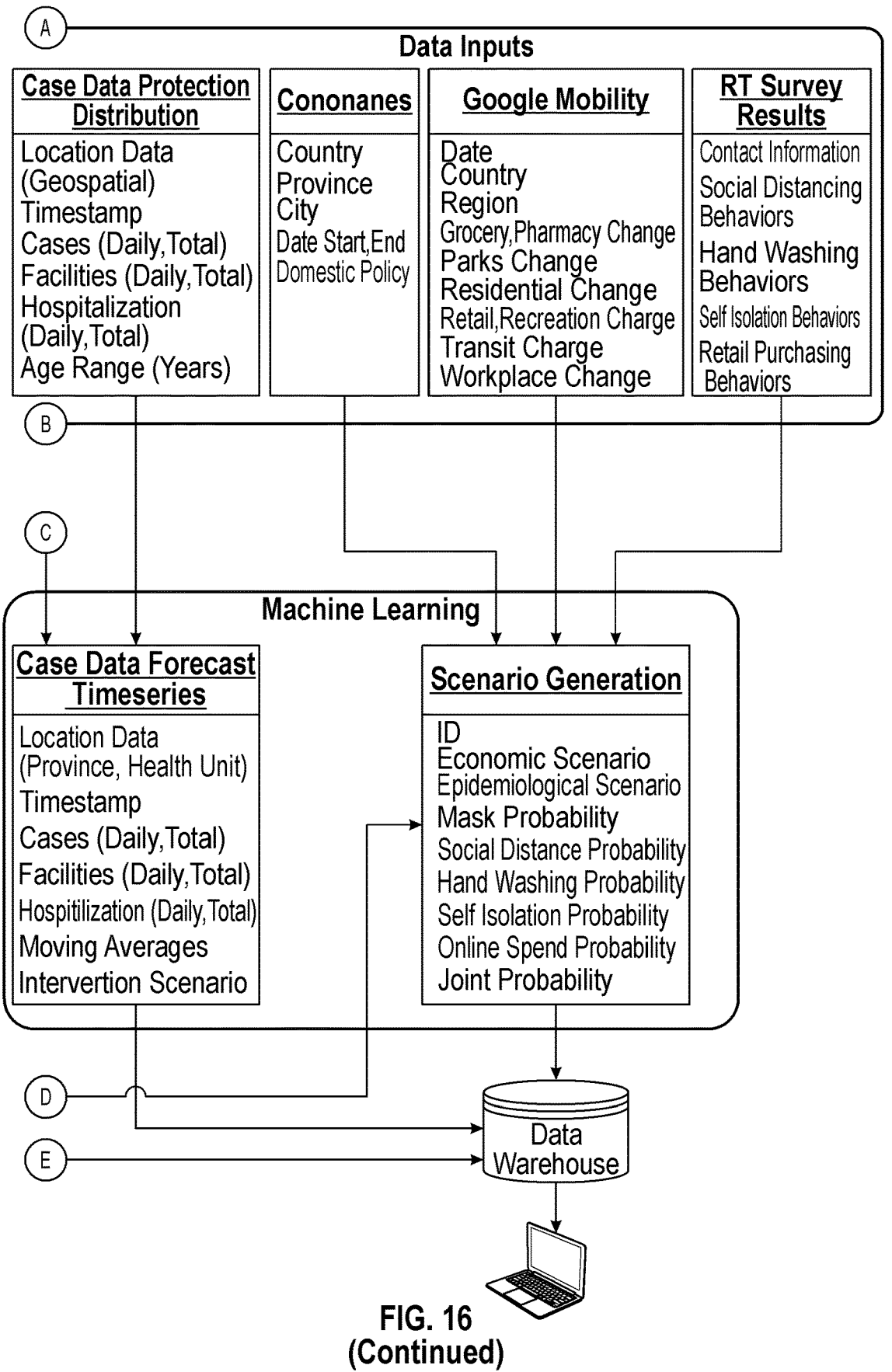

FIG. 16 is a view of an example server system model to extract, transfer and load data.

Figure 17:
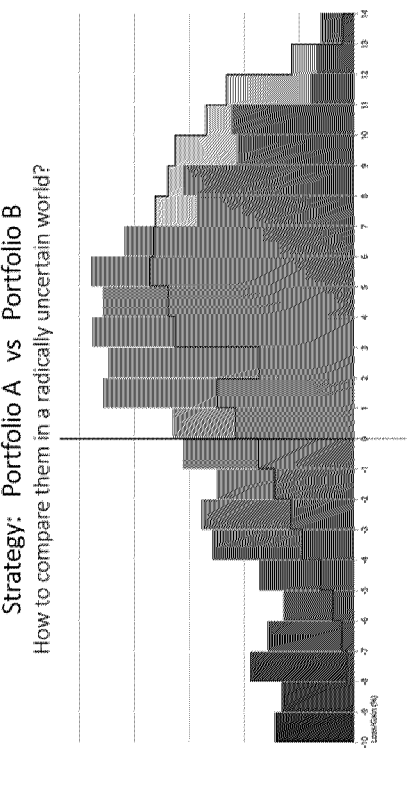
FIG. 17 is a view of an example interface.
Figure 18:
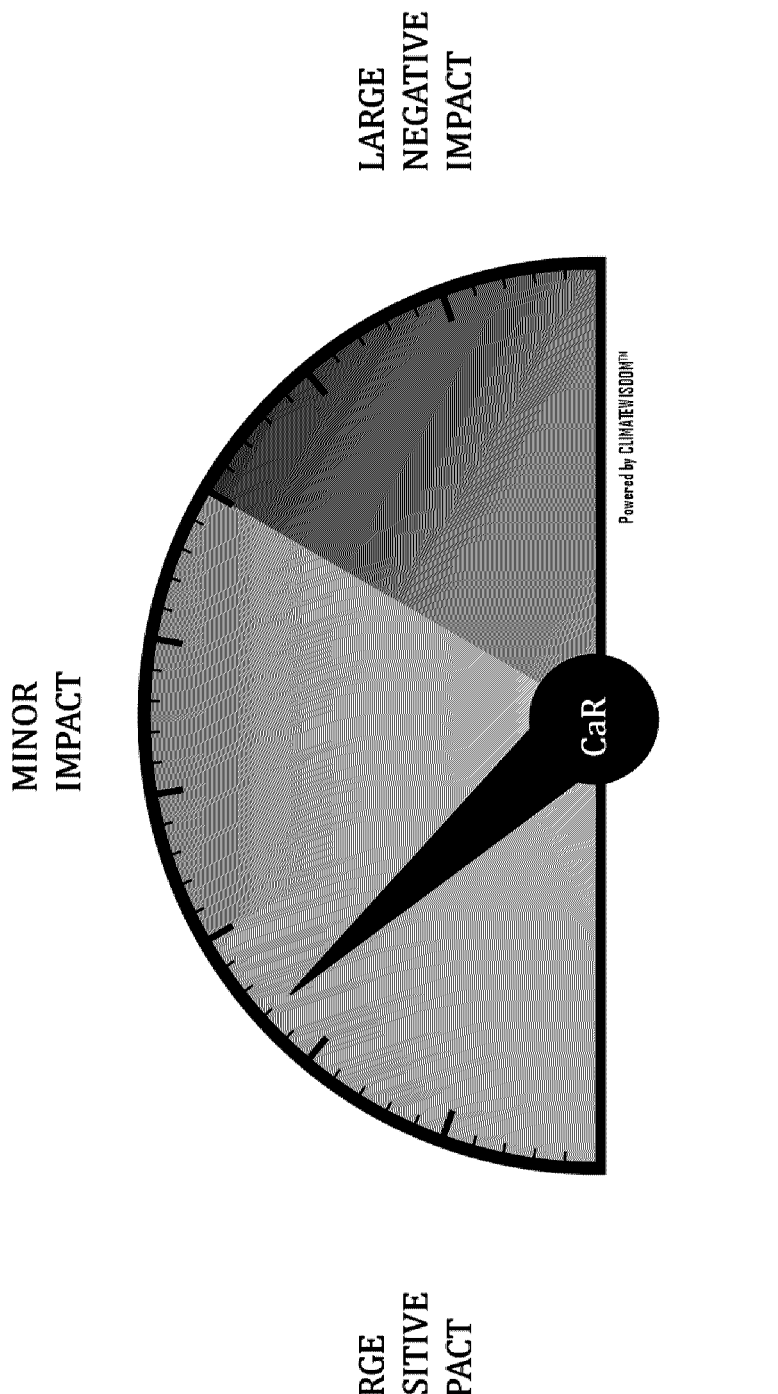
FIG. 18 is a view of another example interface.

FIGS. 17 and 18 are views of example interfaces.

The server 100 can implement a computer process for generating integrated climate risk data by processing climate data using the taxonomy to map climate data to climate transition scenarios, climate regions, climate modulators, climate elements and climate risks. The server 100 can implement an automated rating mechanism for processing data from a variety of different sources using a consistent taxonomy. The integrated climate data can be used for scenario generation to measure the financial impact of climate change, uniformly, at some horizon, on different business units across geographies or climate regions. A business unit can operate in multiple regions and the data can be mapped to those regions.

The server 100 can implement a computer process for generating integrated climate risk data to generate a set of climate stress scenarios to measure or estimate impact on a business unit. The output data can be used to generate visualizations that aggregate gains and losses and forms a distribution of the gains (Upside) and losses (Downside).

Embodiments described herein provide a computer process for generating integrated climate risk data rating metrics. As noted, an example metric can be referred to as CaR, the Climate-risk adjusted Return. CaR is computed by dividing the Upside by the Downside as a measure of the risk-adjusted upside. Embodiments described herein can be used to generate visualizations of bar graphs for the distribution of the gains (Upside) and losses (Downside). FIG. 17 is a view of example interface with visualizations of bar graphs for the distribution of the gains (Upside) and losses (Downside). The Upside can be given by an area covered by a first section of bars and the Downside can be given by an area covered by another section of bars.

A CaR of less that one implies a likely financial impact on profitability under these stresses. FIG. 18 is a view of example interface with visualizations of a gauge representing the spectrum of possible gains or losses to climate stress. In this example, there is a section for material positive impact, a section for non-material impact, and a section for minor impact.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the description, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The following discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

Embodiments relate to processes implements by a computing device having at least one processor, a data storage device (including volatile memory or non-volatile memory or other data storage elements or a combination thereof), and at least one communication interface. The computing device components may be connected in various ways including directly coupled, indirectly coupled via a network, and distributed over a wide geographic area and connected via a network (which may be referred to as "cloud computing").

An example computing device includes at least one processor, memory, at least one I/O interface, and at least one network interface. A processor may be, for example, any type of microprocessor or microcontroller, a digital signal processing (DSP) processor, an integrated circuit, a field programmable gate array (FPGA), a reconfigurable processor, a programmable read-only memory (PROM), or any combination thereof. Memory may include a suitable combination of any type of computer memory that is located either internally or externally.

Each I/O interface enables computing device to interconnect with one or more input devices, such as a keyboard, mouse, camera, touch screen and a microphone, or with one or more output devices such as a display screen and a speaker. Each network interface enables computing device to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A computer system for computer models for risk factors and scenario generation to query and aggregate impact, cost, magnitude and frequency of risk for different geographic locations:

non-transitory memory storing a risk model comprising a causal graph of nodes for risk factors and a knowledge graph defining an extracted relationship of the nodes, each node corresponding to a risk factor and storing a quantitative uncertainty value derived for the risk factor for a time horizon, the causal graph having edges connecting the nodes to create scenario paths for the risk model, the knowledge graph of the nodes defining a network structure of the risk factors and n-grams with links between nodes having weight values based on shared use of n-grams by risk factors corresponding to the nodes, the n-grams being domain specific keywords;

a hardware processor with a communication path to the non-transitory memory to:

generate integrated risk data structures using a natural language processing pipeline to extract information from unstructured text, classify risk and a plurality of risk dimensions to define the risk, quantify interconnectedness of risk factors for the associated link values, and return structured, codified and accessible data structures, wherein the integrated risk data structures map multiple risk factors to geographic space and time;

populate the knowledge graph and the causal graph of nodes in the memory by computing values for the risk factor for the time horizon using the integrated climate risk data structures;

generate multifactor scenario sets using the scenario paths for the climate model to compute the likelihood of different scenario paths for the climate model;

generate risk metrics for stress tests using the multifactor scenario sets and the knowledge graph;

transmit at least a portion of the risk metrics and the multifactor scenario sets in response to queries by a client application; and store the integrated risk data structures and the multifactor scenario sets in the non-transitory memory;

a computer device with a hardware processor having the client application to transmit queries to the hardware processor and an interface to generate visual elements at least in part corresponding to the multifactor scenario sets and the risk metrics received in response to the queries.

2. The system of claim 1 wherein the hardware processor, for each risk factor, merges relevant text data into a risk-specific corpus for the risk factor to populate the knowledge graph in memory, wherein the hardware processor, for each risk factor, creates a link between a node for the risk factor and a respective n-gram extracted from the risk-specific corpus for the risk factor based on a frequency rate for the n-gram and a relevance rate to the respective risk factor determined by keyword extraction, wherein an expert pipeline refines candidate keywords to generate the n-grams as the domain-specific keywords.

3. The system of claim 1 wherein the hardware processor generates the knowledge graph by computing a bipartite network of risk factors and n-grams, and projecting the bipartite network into a single mode network of risk factors connected by edges corresponding to shared n-grams, wherein the hardware processor computes edge weights between risk factors based on the tf-idf for overlapping keywords.

4. The system of claim 1 wherein the knowledge graph of the nodes defining the network structure of the risk factors and the n-grams having a set of links between nodes to indicate that a respective n-gram is relevant to a plurality of risk factors to form a connection and dependency between the plurality of risk factors.

5. The system of claim 1 wherein the hardware processor extracts the n-grams using a highest pooled score to generate a set of n-grams for each risk factor to populate the knowledge graph in memory.

6. The system of claim 1 wherein the hardware processor processes the unstructured text to replace each word with a syntactic form lemma to populate the knowledge graph in memory.

7. The system of claim 1 wherein the hardware processor computes the associated values of the links in the knowledge graph using term frequency-inverse document frequency (tf-idf) score to link the risk factors based on shard use of n-grams.

8. The system of claim 1 wherein the hardware processor preprocesses the unstructured text to remove removing punctuation, special characters, and some common stop-words.

9. The system of claim 1 wherein the hardware processor continuously populates the knowledge graph of nodes by re-computing the nodes, the links, and the weight values by processing additional text data using the natural language processing pipeline.

10. The system of claim 1 wherein the hardware processor defines risk-specific queries to extract raw text data from relevant articles, processes the raw text data to generate a list of tokens and predict a named entity for each token, detect and classify relationships between different entities, and defines a query to traverse the knowledge graph in an order based on a set of rules, so that only entities associated with a value of interest will be returned, wherein the hardware processor assigns a unique identifier for each entity.

11. The system of claim 1 wherein each node stores the quantitative uncertainty value derived by a forward-frequency distribution of possible values for the corresponding risk factor for the time horizon, wherein the hardware processor populates the causal graph of nodes by computing the forward-frequency distribution of possible values for the risk factor for the time horizon.

12. The system of claim 1 wherein the hardware processor populates the causal graph of nodes using extremes values of the distributions and a weight of the distributions above and below accepted values.

13. The system of claim 1 wherein the hardware processor generates the causal graph having forward edges connecting the nodes to create the scenario paths for the risk model.

14. The system of claim 1 wherein the hardware processor identifies macro risk factors in response to a request and generates the causal graph of nodes for the risk factors using the identified macro risk factors and dependencies between the risk factors.

15. The system of claim 1 wherein the hardware processor continuously populates the causal graph of nodes by re-computing the frequency distribution of possible values for the risk factor at different points in time by continuously collecting data using the machine learning system and the expert judgement system.

16. The system of claim 1 wherein the hardware processor computes the forward-frequency distribution of possible values for the risk factor for the time horizon to extract upward and downward extreme values, and likelihoods of upward and downward movement from the forward-frequency distribution.

17. The system of claim 1 wherein the hardware processor wherein the hardware processor filters outlier data using the structured expert judgement system before computing the forward-frequency distribution.

18. The system of claim 1 wherein the hardware processor populates the causal graph of nodes by computing the frequency distribution of possible values for the risk factor at different points in time using machine learning and structured expert judgement data to collect the possible values representing estimates of future uncertain values.

19. The system of claim 1 wherein the hardware processor generates the multifactor scenario sets using the scenario paths for the risk model and generates scenario values using the frequency distribution of possible values for the risk factors.

20. A computer method for computer models for risk factors and scenario generation to query and aggregate impact, cost, magnitude and frequency of risk for different geographic locations, the method comprising:

storing, in non-transitory memory, a risk model comprising a causal graph of nodes for risk factors and a knowledge graph defining an extracted relationship of the nodes, each node corresponding to a risk factor and storing a quantitative uncertainty value derived for the risk factor for a time horizon, the causal graph having edges connecting the nodes to create scenario paths for the risk model, the knowledge graph of the nodes defining a network structure of the risk factors and n-grams with links between nodes having weight values based on shared use of n-grams by risk factors corresponding to the nodes, the n-grams being domain specific keywords;

generating, using a hardware processor with a communication path to the non-transitory memory, integrated risk data structures using a natural language processing pipeline to extract information from unstructured text, classify risk and a plurality of risk dimensions to define the risk, quantify interconnectedness of risk factors for the associated link values, and return structured, codified and accessible data structures, wherein the integrated risk data structures map multiple risk factors to geographic space and time;

populating the knowledge graph and the causal graph of nodes in the memory by computing values for the risk factor for the time horizon using the integrated climate risk data structures;

generating multifactor scenario sets using the scenario paths for the climate model to compute the likelihood of different scenario paths for the climate model;

generating risk metrics for stress tests using the multifactor scenario sets and the knowledge graph;

transmitting, by the hardware processor, at least a portion of the risk metrics and the multifactor scenario sets in response to queries by a client application; and storing the integrated risk data structures and the multifactor scenario sets in the non-transitory memory.

\* \* \* \* \*